US006876994B2

(12) United States Patent
Ishikawa et al.

(10) Patent No.: US 6,876,994 B2
(45) Date of Patent: Apr. 5, 2005

(54) DATA ACQUISITION APPARATUS AND METHOD

(75) Inventors: Yoshiaki Ishikawa, Tokyo-to (JP); Takashi Kodera, Hirakata (JP); Osamu Kando, Neyagawa (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 483 days.

(21) Appl. No.: 09/867,150

(22) Filed: May 29, 2001

(65) Prior Publication Data

US 2002/0049730 A1 Apr. 25, 2002

(30) Foreign Application Priority Data

May 30, 2000 (JP) .......................... 2000-160994
Jul. 11, 2000 (JP) .......................... 2000-209407

(51) Int. Cl.[7] ............................................. G06F 17/30
(52) U.S. Cl. .................................. 707/1; 705/1
(58) Field of Search ................... 707/1, 102, 100, 707/104.1, 10; 709/231, 200, 201, 217; 705/1

(56) References Cited

U.S. PATENT DOCUMENTS

| 5,802,303 | A | * | 9/1998 | Yamaguchi | 709/224 |
| 6,105,016 | A | * | 8/2000 | Martin | 707/1 |
| 6,243,738 | B1 | * | 6/2001 | Hayles et al. | 709/203 |
| 6,453,316 | B1 | * | 9/2002 | Karibe et al. | 707/8 |
| 6,519,568 | B1 | * | 2/2003 | Harvey et al. | 705/1 |

* cited by examiner

Primary Examiner—Greta Robinson

(57) ABSTRACT

A data acquisition apparatus including: a data acquiring unit 507 which receives data acquisition conditions, and when transmitted data includes pieces of data that satisfy any request conditions, extracts the pieces of data from the transmitted data; a data acquisition request receiving unit 501 which receives requests to acquire data from a plurality of applications, together with conditions specifying the data; and a request condition setting scheduling unit 113 which exercises a control to start data acquisitions by scheduling the data acquisitions for all the received requests to generate a queue of the requests, and setting corresponding conditions in the data acquiring unit 507 in accordance with the queue.

30 Claims, 40 Drawing Sheets

FIG. 2

| DATA ACQUISITION CONDITION | PRIORITY LEVEL |
|---|---|
| request1 | 1 |
| request8 | 3 |
| request3 | 1 |
| request6 | 2 |
| request7 | 3 |
| request4 | 2 |
| request5 | 2 |
| request2 | 1 |
| — | — |
| — | — |

FIG. 4

| DATA ACQUISITION CONDITION | PRIORITY LEVEL |
|---|---|
| request1 | 1 |
| request2 | 1 |
| request3 | 1 |
| request4 | 2 |
| request5 | 2 |
| request6 | 2 |
| request7 | 3 |
| request8 | 3 |
| — | — |
| — | — |

FIG. 7

| DATA ACQUISITION CONDITION | EXECUTION STATE INFORMATION | TIME-OUT TIME | TIME-OUT CANCELLATION TIME |
|---|---|---|---|
| request1 | IN EXECUTION | 1999/4/1 1:00:10 | 1999/4/1 1:00:30 |
| request2 | IN EXECUTION | 1999/4/1 1:00:20 | 1999/4/1 1:00:50 |
| request3 | IN EXECUTION | 1999/4/1 1:00:30 | 1999/4/1 1:01:10 |
| request4 | WAITING | 1999/4/1 1:00:10 | 1999/4/1 1:00:30 |
| request5 | WAITING | 1999/4/1 1:00:20 | 1999/4/1 1:00:50 |
| request6 | WAITING | 1999/4/1 1:00:20 | 1999/4/1 1:00:50 |
| request7 | IN EXECUTION | 1999/4/1 1:00:30 | 1999/4/1 1:01:10 |
| request8 | IN EXECUTION | 1999/4/1 1:00:30 | 1999/4/1 1:01:10 |
| — | — | — | — |
| — | — | — | — |

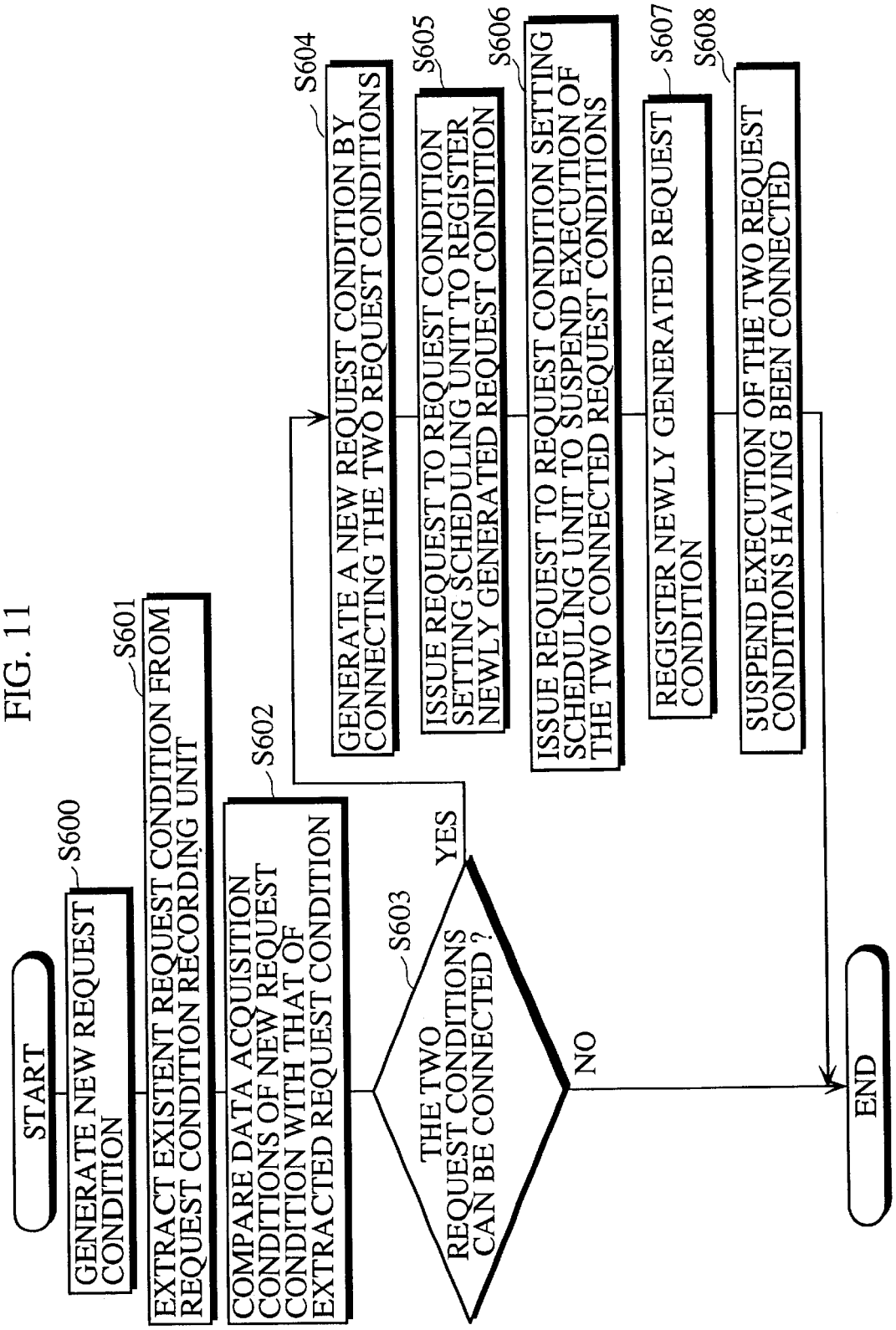

FIG. 12

| REQUEST IDENTIFICATION INFORMATION 1101 | DATA ACQUISITION CONDITION 1110 | REQUEST GENERATION TIME 1102 | EXECUTION STATE INFORMATION 1111 | POST-CONNECTION REQUEST IDENTIFICATION INFORMATION 1104 | DATA ACQUISITION DECISION INFORMATION 1112, 1113 |
|---|---|---|---|---|---|
| 0x0001 | request1 | 1999/4/1 1:00:00 | IN EXECUTION | — | DATA NOT ACQUIRED |
| 0x0002 | request2 | 1999/4/1 1:00:10 | IN EXECUTION | — | DATA NOT ACQUIRED |
| 0x0003 | request3 | 1999/4/1 1:00:20 | IN EXECUTION | — | DATA ACQUIRED |
| 0x0004 | request4 | 1999/4/1 1:00:30 | SUSPENDING | 0x0001 | DATA ACQUIRED |
| 0x0005 | request5 | 1999/4/1 1:00:18 | SUSPENDING | 0x0001 | DATA NOT ACQUIRED |
| 0x0006 | request6 | 1999/4/1 1:00:26 | EXECUTABLE | — | DATA NOT ACQUIRED |
| 0x0007 | request7 | 1999/4/1 1:00:40 | EXECUTABLE | — | DATA NOT ACQUIRED |
| 0x0008 | request8 | 1999/4/1 1:00:50 | SUSPENDING | 0x0001 | DATA NOT ACQUIRED |
| — | — | — | — | — | — |
| — | — | — | — | — | — |

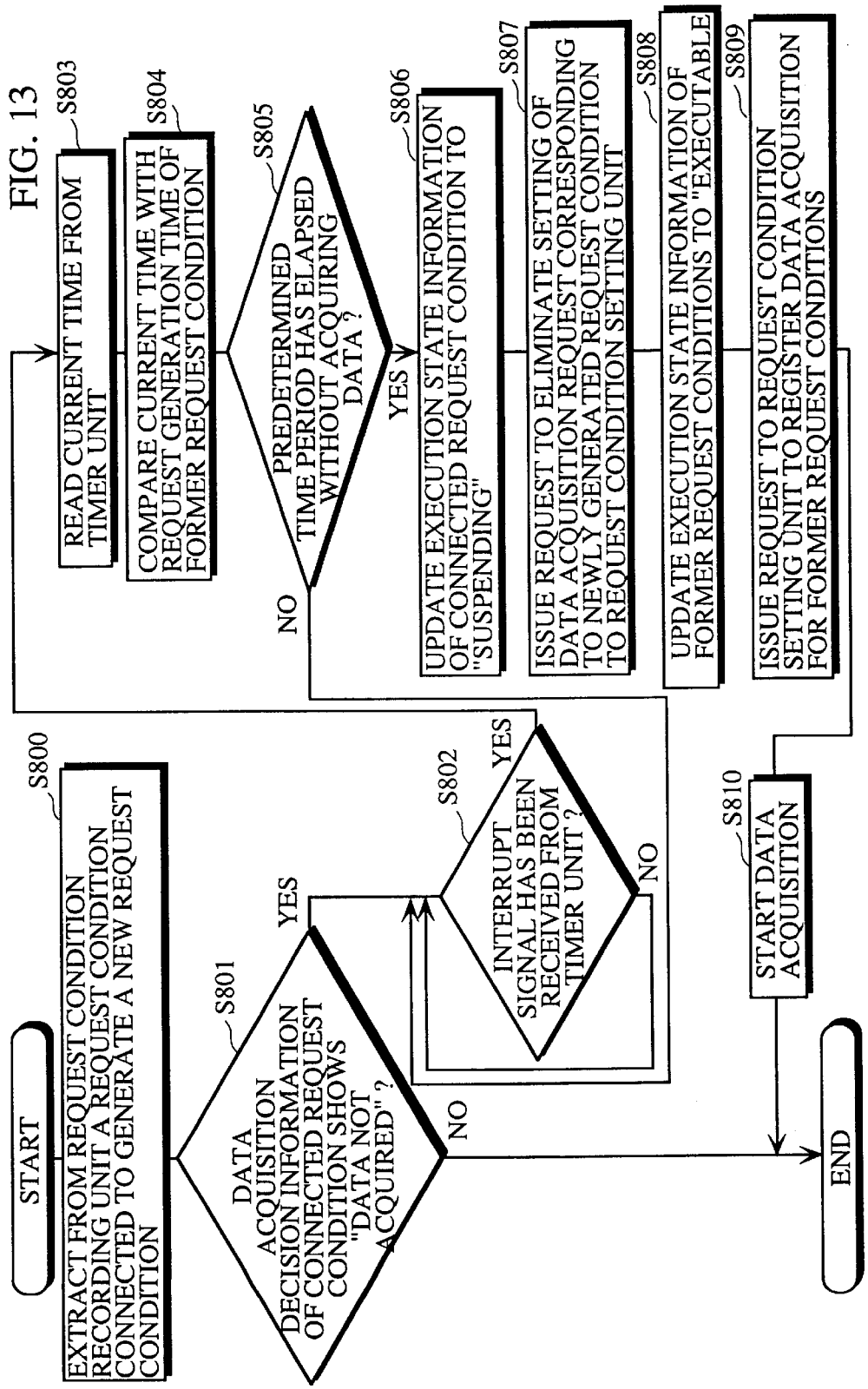

FIG. 15

| DATA ACQUISITION CONDITION 1201 | DATA ACQUISITION MONITORING STATE INFORMATION 1202 |
|---|---|
| request1 | PERPETUAL MONITORING ACQUISITION |
| request2 | INTERMITTENT MONITORING ACQUISITION |
| request3 | NON-MONITORING ACQUISITION |
| request4 | NON-MONITORING ACQUISITION |
| request5 | PERPETUAL MONITORING ACQUISITION |
| request6 | PERPETUAL MONITORING ACQUISITION |
| request7 | INTERMITTENT MONITORING ACQUISITION |
| request8 | NON-MONITORING ACQUISITION |
| — | — |
| — | — |

| PERPETUAL MONITORING ACQUISITION | INTERMITTENT MONITORING ACQUISITION | NON-MONITORING ACQUISITION |
|---|---|---|
| request1 | request2 | request3 |
| request5 | request7 | request4 |
| request6 | — | request8 |
| — | — | — |
| — | — | — |

FIG. 18

| DATA ACQUISITION CONDITION 1201 | DATA ACQUISITION MONITORING STATE INFORMATION 1102 | EXECUTION STATE INFORMATION 1202 | TIME-OUT CANCELLATION TIME 1106 |
|---|---|---|---|
| request1 | NON-MONITORING ACQUISITION | IN EXECUTION | 1999/4/1 1:00:30 |
| request2 | NON-MONITORING ACQUISITION | WAITING | 1999/4/1 1:00:50 |
| request3 | NON-MONITORING ACQUISITION | IN EXECUTION | 1999/4/1 1:01:10 |
| request4 | PERPETUAL MONITORING ACQUISITION | SUSPENDING | 1999/4/1 1:00:30 |
| request5 | INTERMITTENT MONITORING ACQUISITION | WAITING | 1999/4/1 1:00:50 |
| request6 | NON-MONITORING ACQUISITION | EXECUTABLE | 1999/4/1 1:00:50 |
| request7 | PERPETUAL MONITORING ACQUISITION | EXECUTABLE | 1999/4/1 1:01:10 |
| request8 | NON-MONITORING ACQUISITION | SUSPENDING | 1999/4/1 1:01:10 |
| — | — | — | — |
| — | — | — | — |

FIG. 20

| DATA ACQUISITION CONDITION 1201 | DATA ACQUISITION MONITORING STATE INFORMATION 1102 | EXECUTION STATE INFORMATION 1202 | DATA ACQUISITION DECISION INFORMATION 1104 | PRIORITY LEVEL 1103 |
|---|---|---|---|---|
| request1 | NON-MONITORING ACQUISITION | IN EXECUTION | DATA ACQUIRED | 1 |
| request2 | NON-MONITORING ACQUISITION | WAITING | DATA ACQUIRED | 2 |
| request3 | NON-MONITORING ACQUISITION | IN EXECUTION | DATA ACQUIRED | 3 |
| request4 | PERPETUAL MONITORING ACQUISITION | SUSPENDING | DATA NOT ACQUIRED | 1 |
| request5 | INTERMITTENT MONITORING ACQUISITION | WAITING | DATA ACQUIRED | 1 |
| request6 | NON-MONITORING ACQUISITION | EXECUTABLE | DATA ACQUIRED | 2 |
| request7 | PERPETUAL MONITORING ACQUISITION | EXECUTABLE | DATA NOT ACQUIRED | 2 |
| request8 | NON-MONITORING ACQUISITION | SUSPENDING | DATA ACQUIRED | 3 |
| — | — | — | — | — |
| — | — | — | — | — |

FIG. 26

| REQUEST IDENTIFICATION INFORMATION | DATA ACQUISITION CONDITION | DATA ACQUISITION MONITORING STATE INFORMATION | EXECUTION STATE INFORMATION | DATA ACQUISITION DECISION INFORMATION | PRIORITY LEVEL | VERSION INFORMATION | VERSION UPDATE DECISION INFORMATION | VERSION UPDATE NUMBER INFORMATION |
|---|---|---|---|---|---|---|---|---|
| 0x0001 | request1 | NON-MONITORING ACQUISITION | IN EXECUTION | DATA NOT ACQUIRED | 1 | 1 | UPDATED | 1 |
| 0x0002 | request2 | NON-MONITORING ACQUISITION | WAITING | DATA NOT ACQUIRED | 2 | 2 | UPDATED | 2 |
| 0x0003 | request3 | NON-MONITORING ACQUISITION | IN EXECUTION | DATA ACQUIRED | 3 | 3 | UPDATED | 3 |
| 0x0004 | request4 | PERPETUAL MONITORING ACQUISITION | SUSPENDING | DATA ACQUIRED | 1 | 0 | NOT UPDATED | 0 |
| 0x0005 | request5 | PERPETUAL MONITORING ACQUISITION | WAITING | DATA NOT ACQUIRED | 1 | 15 | UPDATED | 15 |
| 0x0006 | request6 | NON-MONITORING ACQUISITION | EXECUTABLE | DATA NOT ACQUIRED | 2 | 0 | UPDATED | 16 |
| 0x0007 | request7 | NON-MONITORING ACQUISITION | EXECUTABLE | DATA NOT ACQUIRED | 2 | 0 | NOT UPDATED | 0 |
| 0x0008 | request8 | NON-MONITORING ACQUISITION | SUSPENDING | DATA NOT ACQUIRED | 3 | 2 | UPDATED | 18 |
| — | — | | — | | — | — | — | — |
| — | — | | — | | — | — | — | — |

FIG. 33

| ACQUISITION CONDITION | SETTING INFORMATION | ORDER VALUE |
|---|---|---|
| ACQUISITION CONDITION 1 | VALID | 5 |
| ACQUISITION CONDITION 2 | VALID | 4 |
| ACQUISITION CONDITION 3 | VALID | 3 |
| ACQUISITION CONDITION 4 | INVALID | 2 |
| ACQUISITION CONDITION 5 | INVALID | 1 |
| ACQUISITION CONDITION 6 | INVALID | 0 |
| — | — | — |
| — | — | — |

FIG. 34

| ACQUISITION CONDITION | SETTING INFORMATION | ORDER VALUE |
|---|---|---|
| ACQUISITION CONDITION 1 | INVALID | 0 |
| ACQUISITION CONDITION 2 | VALID | 5 |
| ACQUISITION CONDITION 3 | VALID | 4 |
| ACQUISITION CONDITION 4 | VALID | 0 |
| ACQUISITION CONDITION 5 | INVALID | 2 |
| ACQUISITION CONDITION 6 | INVALID | 1 |
| — | — | — |
| — | — | — |

DATA ACQUISITION APPARATUS AND METHOD

BACKGROUND OF THE INVENTION (1) Field of the Invention

The present invention relates to an apparatus that acquires data satisfying certain conditions from transmitted data streams. More particularly, the present invention relates to a data acquisition apparatus that acquires lots of data efficiently with limited hardware resources.

(2) Description of Related Art

Data acquisition apparatuses such as digital broadcast receivers are required to extract pieces of data that satisfy certain conditions, with limited hardware resources and time, from broadcast data transmitted from a transmitting station.

FIG. 28 is a functional block diagram showing the construction of a conventional data acquisition apparatus. The data acquisition apparatus 500 includes: a data acquisition request receiving unit 501 which corresponds to hardware and software portions of a digital broadcast receiver, the portions performing basic processes concerning data reception such as broadcast data receiving, demultiplexing, decoding, and filtering, and receives data acquisition requests from various types of application programs (hereinafter simply referred to as "applications") that are provided to achieve various functions of the receivers; a data acquisition request setting unit 509 which converts the received requests into parameters suitable for a data acquiring unit 507 and sets the parameters in the data acquiring unit 507; the data acquiring unit 507 which extracts data that satisfies the set data acquisition requests, from broadcast data; and a data transmitting unit 508 which transmits the data acquired by the data acquiring unit 507 to the applications that have requested the acquired data.

FIG. 29 is a flowchart showing the procedure of data acquisition by the conventional data acquisition apparatus 500 shown in FIG. 28.

The data acquisition request receiving unit 501 receives from an application a data acquisition request requesting to acquire data such as a certain piece of broadcast program information or control information, and sends the received data acquisition request to the data acquisition request setting unit 509 (step S100). The data acquisition request setting unit 509 converts the received request into a parameter suitable for the data acquiring unit 507 and sets the parameters in the data acquiring unit 507 (step S101). The data acquiring unit 507 starts a data acquisition corresponding to the set parameter (step S102). For example, the data acquiring unit 507 monitors whether the broadcast data includes a piece of program information that satisfies a certain condition.

The data acquiring unit 507 judges whether target data has been acquired (step S103). When it is judged negatively, the data acquiring unit 507 repeats this judgement until it is judged positively. When it is judged positively in step S103, the data acquiring unit 507 sends the data to the data transmitting unit 508, and the data transmitting unit 508 transmits the data to the application that has requested the data (step S104).

As described above, conventional data acquisition apparatuses faithfully execute each data acquisition request transmitted from the applications.

In such conventional data acquisition apparatuses, however, once a data acquisition for a data acquisition request is started, a certain hardware resource is kept occupied unless the data acquisition is canceled explicitly. As a result, when a plurality of data acquisition requests are transmitted from a plurality of applications at a time, or when a data acquisition for a piece of data that is transmitted with a low frequency is started, very inefficient data acquisitions (with low data acquisition rates) are performed.

Though each application may be programmed beforehand so as not to generate a wasteful time in consideration of the internal processing procedure or timing with which data acquisition requests are generated, it is difficult to design the system in consideration of impact of the applications on each other (a conflict between two or more data acquisition requests issued at the same time). The above problem remains unsolved.

SUMMARY OF THE INVENTION

It is therefore an object of the present invention to provide a data acquisition apparatus that acquires a lot of data efficiently with limited hardware resources in accordance with a plurality of data acquisition requests issued from applications.

The above object is fulfilled by a data acquisition apparatus for acquiring data from a transmitted data stream in accordance with requests received from a plurality of data processing apparatuses, the data acquisition apparatus comprising: a request receiving means for receiving a plurality of requests to acquire data, from the plurality of data processing apparatuses; a condition generating means for generating a plurality of conditions corresponding to the received requests; a scheduling means for generating a queue of the plurality of conditions and scheduling a start and a stop of acquisition of each of one or more pieces of data that satisfy any of the plurality of conditions, by setting, according to the generated queue, one or more conditions corresponding to the one or more pieces of data in a data extracting means and eliminating the one or more conditions from the data extracting means; the data extracting means for extracting from the data stream the one or more pieces of data; and an outputting means for outputting the one or more pieces of data extracted by the data extracting means to data processing apparatuses that has sent requests to acquire the one or more pieces of data, among the plurality of data processing apparatuses.

With the above construction, the data acquisitions are first scheduled by the scheduling means of the data acquisition apparatus that receives the data stream including data to be acquired, and then executed in accordance with the data acquisition requests transmitted from a plurality of data processing apparatuses. This achieves efficient data acquisitions with limited hardware resources. It is also possible for each data processing apparatus to issue a data acquisition request at any desired time without considering a conflict with other data acquisition requests issued from other data processing apparatuses at the same time.

In the above data acquisition apparatus, the request receiving means may further receive a priority level for data acquisition together with each request, and the scheduling means generates the queue so that a request with a high priority level is preferentially executed to acquire data.

With the above construction, it is possible to solve a problem that a data acquisition with a high priority level is delayed because of a continued execution of a data acquisition with a low priority level.

In the above data acquisition apparatus, the request receiving means may further receive together with each request a piece of monitoring state information that specifies a data acquisition state, and the scheduling means (a) sets a condition storing a common scheduling-object request is secured. This enables various function means to communicate with each other via the storage region.

In the above data acquisition apparatus, the request receiving means may further receive together with each request a piece of header information that indicates a request type, the condition generating means receives from the request receiving means the piece of header information together with each request, generates a condition corresponding to each received request, records each generated condition and each received piece of header information in the recording means in correspondence with each other, and the scheduling means allows data acquisitions to end by eliminating conditions corresponding to the data acquisitions from the data extracting means in accordance with pieces of header information corresponding to the conditions which are recorded in the recording means.

With the above construction, it is possible to control the data acquisition depending on the type of the data acquisition request. For example, it is possible to stop a data acquisition corresponding to an earlier data acquisition request when two or more data acquisition requests of the same type are issued at the same time. This prevents a wasteful data acquisition from being continued.

The above data acquisition apparatus may further comprise a timer means for providing a current time, wherein the in the data extracting means so that a data acquisition is continuously performed when the scheduling means receives a request with a piece of monitoring state information that specifies a perpetual monitoring acquisition, (b) sets and eliminates a condition in and from the data extracting means so that a data acquisition is performed at regular intervals when the scheduling means receives a request with a piece of monitoring state information that specifies an intermittent monitoring acquisition, and (c) sets and eliminates a condition in and from the data extracting means so that a data acquisition is performed only once when the scheduling means receives a request with a piece of monitoring state information that specifies a non-monitoring acquisition.

With the above construction, it is possible to perform a minute, efficient data acquisition depending on the characteristics (repeatability, frequency, band, etc.) and state to be monitored (frequency, urgency, etc.) of transmitted data.

The above data acquisition apparatus may further comprise a recording means for temporarily recording the plurality of conditions, wherein the condition generating means records the generated conditions in the recording means, and the scheduling means generates the queue by reading the generated conditions from the recording means, rearranging the read conditions, and recording the rearranged conditions in the recording means.

With the above construction, a storage region for condition generating means generates, after receiving a request from the request receiving means, (a) a condition corresponding to the received request and (b) a piece of condition generation time information which indicates a time when the condition is generated, records each generated condition and each generated piece of condition generation time information in the recording means in correspondence with each other, and the scheduling means calculates an elapse time for each condition by comparing the current time with the time indicated by each piece of condition generation time information recorded in the recording means, and performs the scheduling in accordance with the elapse time.

With the above construction, the data acquisition is controlled based on the time elapsed since the issuance of the data acquisition request. This prevents a malfunction that a data acquisition for a data acquisition request remains unexecuted for a long time.

In the above data acquisition apparatus, the condition generating means may generate, after receiving a request from the request receiving means, a condition corresponding to the received request, compares the newly generated condition with an existent condition that has been recorded in the recording means to judge whether the two conditions can be connected, and when judging that the two conditions can be connected, generates a new condition by connecting the two conditions and records the newly generated condition in the recording means, and the scheduling means reads the newly generated condition from the recording means and puts the newly generated condition into the queue then starts a data acquisition by setting the newly generated condition in the data extracting means, and ends a data acquisition for the existent condition by eliminating the existent condition from the data extracting means.

In the above data acquisition apparatus, the condition generating means may generate, after receiving a request from the request receiving means, (a) a condition corresponding to the received request and (b) a piece of identification information used for identifying the generated condition, and after generating a new condition by connection, generates using the piece of identification information a piece of connection information that shows correspondence between the newly generated condition and the two conditions connected to generated the new condition, and records the piece of connection information and the condition corresponding to the piece of identification information and the received request in the recording means in correspondence with each other, and the scheduling means identifies the newly generated condition and the two conditions connected to generate the new condition, by referring to the identification information and the connection information, and controls the start and end of each data acquisition corresponding to the identified conditions.

In the above data acquisition apparatus, the condition generating means, when the two conditions have a portion in common, may judge that the two conditions can be connected, and generates a new condition that is composed of the common portion.

With the above construction, a plurality of conditions are connected into one condition that satisfies the plurality of conditions simultaneously. This decreases the number of conditions to be set in the data acquiring means, making it possible to effectively use hardware resources.

The above data acquisition apparatus may further comprise a timer means for providing a current time, wherein the scheduling means, after starting a data acquisition, generates a time-out time by adding a predetermined time period to a time when the scheduling means started the data acquisition, and records the time-out time and a condition corresponding to the data acquisition in the recording means in correspondence with each other, and when the time-out time is reached by the current time, ends the data acquisition by eliminating the corresponding condition from the data extracting means, and at the same time, generates a time-out cancellation time by adding another predetermined time period to a time when the data acquisition ended, records the time-out cancellation time and the condition in the recording means in correspondence with each other, and when the time-out cancellation time is reached by the current time, puts the condition into the queue, and starts the data acquisition by setting the condition in the data extracting means.

With the above construction, when an object piece of data is not transmitted, the data acquisition is suspended for a certain time period then restarted. This prevents a wasteful occupation of a hardware resource.

In the above data acquisition apparatus, the data extracting means may output, for each condition that is set in the data extracting means, a piece of data acquisition information that shows whether data has been acquired or not, and the scheduling means generates for each condition recorded in the recording means a piece of data acquisition decision information that shows whether data has been acquired, in accordance with the piece of data acquisition information, and records each generated piece of data acquisition decision information and the condition corresponding to the piece of data acquisition decision information in the recording means in correspondence with each other, and performs the scheduling in accordance with generated pieces of data acquisition decision information.

The above construction provides an efficient data acquisition that depends on whether an object piece of data has been acquired or not.

The above data acquisition apparatus may further comprise a timer means for providing a current time, wherein the condition generating means generates, after receiving a request from the request receiving means, (a) a condition corresponding to the received request and (b) a piece of condition generation time information which indicates a time when the condition is generated, records each generated condition and each generated piece of condition generation time information in the recording means in correspondence with each other, and the scheduling means judges whether the recording means stores conditions for which data has not been acquired after expiration of a predetermined time interval since generation of the conditions by comparing the current time with the time indicated by each piece of condition generation time information recorded in the recording means and referring to each piece of data acquisition decision information recorded in the recording means, and performs the scheduling in accordance with a result of the judgement.

The above construction prevents a malfunction that a hardware resource is kept occupied wastefully due to failure in acquiring data that is caused by no transmission of an object piece of data.

In the above data acquisition apparatus, the condition generating means may generate, after receiving a request from the request receiving means, a condition corresponding to the received request, compares the newly generated condition with an existent condition that has been recorded in the recording means to judge whether the two conditions can be connected, and when judging that the two conditions can be connected, generates a new condition by connecting the two conditions and records the newly generated condition in the recording means, and the scheduling means reads the newly generated condition from the recording means and puts the newly generated condition into the queue then starts a data acquisition by setting the newly generated condition in the data extracting means, ends a data acquisition for the existent condition by eliminating the existent condition from the data extracting means, ends the data acquisition for the newly generated condition by eliminating the newly generated condition from the data extracting means when it is judged that data has not been acquired for the newly generated condition after expiration of a predetermined time interval since reception of the request, and reads the existent condition from the recording means, puts the newly generated condition and the existent condition into the queue then starts a data acquisition by setting the existent condition in the data extracting means.

With the above construction, even if a data acquisition for a data acquisition condition made by connecting a plurality of conditions is not successful, the former data acquisition state is restored.

In the above fdata acquisition apparatus, the request receiving means may further receive together with each request (a) a piece of monitoring state information that specifies a data acquisition state, (b) a priority level for data acquisition, and (c) a piece of identification information used for identifying the request, the condition generating means receives from the request receiving means the piece of monitoring state information and the piece of identification information together with each request, generates a condition corresponding to each received request, records each generated condition and each received pieces of monitoring state information and identification information in the recording means in correspondence with each other, the data extracting means refers to header information included in the data stream and extracts and outputs (a1) a piece of identification information corresponding to a piece of data included in the data stream and (b1) a piece of version information that indicates a version of the piece of data, the scheduling means refers to the pieces of identification information and version information output by the data extracting means and generates for each condition recorded in the recording means (a2) a piece of data acquisition decision information that indicates whether a corresponding piece of data has been acquired or not, (b2) a piece of version update number information that indicates the number of version updates of a corresponding piece of data, and records the generated pieces of data acquisition decision information and version update number information in the recording means, and when the queue includes a plurality of conditions for each of which (i) the piece of monitoring state information specifies a non-monitoring acquisition, (ii) the same priority level is assigned, and (iii) the piece of data acquisition decision information has the same contents, starts a data acquisition by preferentially setting in the data extracting means a condition among the plurality of conditions in the queue that corresponds to a piece of version update number information recorded in the recording means indicating the largest number of version updates.

With the above construction, a data acquisition corresponding to a piece of data whose contents are updated frequently is preferentially executed. This provides an efficient data acquisition that acquires lots of contents.

The above object is also fulfilled by a data acquisition apparatus for acquiring data from a transmitted data stream in accordance with requests received from a plurality of data processing apparatuses, the data acquisition apparatus comprising: a condition acquiring means for acquiring a plurality of conditions corresponding to the requests from the plurality of data processing apparatuses; a table holding means for holding a table that shows relationships between (a) the plurality of conditions, (b) pieces of setting information which each show whether a condition is "set" or "not set" in the data extracting means, and (c) order values which show an order in which the plurality of conditions have been acquired and are each initialized to a value indicating that a corresponding condition was most recently acquired when the corresponding condition is eliminated from the data extracting means; a scheduling means for, each time the condition acquiring means acquires a new condition, writing a set of (a1) the new condition, (b1) a piece of setting information corresponding to the new condition, which each show whether a condition is "set" or "not set" in the data extracting means, and (c1) an order value indicating that the new condition was most recently acquired, and controlling setting of conditions in a data extracting means by referring to the setting information and the order values recorded in the table; the data extracting means for extracting from the data stream one or more pieces of data that satisfy any of the plurality of conditions; and an outputting means for outputting the one or more pieces of data extracted by the data extracting means to data processing apparatuses that has sent requests to acquire the one or more pieces of data, among the plurality of data processing apparatuses.

With the above construction, it is possible to receive more acquisition conditions than the number of acquisition conditions for which data can be actually extracted and monitored at the same time.

In the above data acquisition apparatus, the scheduling means may further include: a setting judging means for judging whether a condition can newly be set in the data extracting means by judging whether the number of conditions that correspond to pieces of setting information showing "set" is less than an upper limit of the number of conditions that can be set in the data extracting means; and a setting controlling means for, when the setting judging means judges that a condition can newly be set, setting the determined condition in the data extracting means, and when the setting judging means judges that a condition can not newly be set, selecting among conditions that correspond to pieces of setting information showing "set" a condition to be deleted from the data extracting means, deleting the selected condition from the data extracting means, and setting the determined condition in the data extracting means.

With the above construction, an acquisition condition for which data has not been extracted or monitored is preferentially given an opportunity of acquiring data.

In the above data acquisition apparatus, the determining means may determine, among conditions that correspond to pieces of setting information showing "not set", a condition that is indicated by a corresponding order value in the table to have been least recently acquired, as a condition to be newly set in the data extracting means, and when the setting judging means judges that a condition can not newly be set, the setting controlling means selects, among conditions that correspond to pieces of setting information showing "set", a condition that is indicated by a corresponding order value in the table to have been least recently acquired, and deletes the selected condition from the data extracting means.

With the above construction, data acquisitions are performed in the order of issuance of the corresponding acquisition conditions by the data processing apparatuses. This enables to respond to the requests from the data processing apparatuses at proper intervals.

In the above data acquisition apparatus, the determining means may determine, among conditions that correspond to pieces of setting information showing "not set", a condition that is indicated by a corresponding order value in the table to have been most recently acquired, as a condition to be newly set in the data extracting means, and when the setting judging means judges that a condition can not newly be set, the setting controlling means selects, among conditions that correspond to pieces of setting information showing "set", a condition that is indicated by a corresponding order value in the table to have been least recently acquired, and deletes the selected condition from the data extracting means.

With the above construction, a data acquisition for a newly requested acquisition condition by a data processing apparatus is preferentially executed. This speeds up the responce to requests from a certain data processing apparatus.

The above data acquisition apparatus may further comprise a rearrangement requesting means for sending a rearrangement request that requests the scheduling means to rearrange conditions set in the data extracting means in accordance with an instruction from any of the plurality of data processing apparatuses, wherein the scheduling means, when receiving the rearrangement request from the rearrangement requesting means, controls rearrangement of the conditions set in the data extracting means by referring to the setting information and the order values recorded in the table.

With the above construction, it is possible to provide timing with which acquisition conditions are rearranged in accordance with a request from a data processing apparatus. This enables all data acquisition conditions to be used for automatically scheduling the data extraction and monitoring.

In the above data acquisition apparatus, the data extracting means, when successfully extracting a piece of data that satisfies one of the plurality of conditions, notifies the scheduling means of the condition satisfied by the successfully extracted piece of data, and the scheduling means, when receiving the notification, controls rearrangement of the conditions set in the data extracting means by referring to the setting information and the order values recorded in the table.

With the above construction, it is possible to provide timing with which acquisition conditions are rearranged when a data acquisition has been successful. This enables all data acquisition conditions to be used for automatically scheduling the data extraction and monitoring, without the necessity of receiving an acquisition condition rearrangement request from a data processing apparatus.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows a list of the request conditions generated by the request condition generating unit;

FIG. 4 shows the request conditions after they are scheduled by the request condition setting scheduling unit;

FIG. 7 shows a list of request conditions to which various types of management information have been attached by the request condition setting scheduling unit;

FIG. 11 is a flowchart showing the procedure of connecting request conditions;

FIG. 12 shows a list of request conditions to which various kinds of management information are attached by the request condition setting scheduling unit;

FIG. 13 is a flowchart showing the procedure of dividing a data acquisition request that has been generated by connecting a plurality of data acquisition requests;

FIG. 15 shows a list of request conditions generated by the request condition generating unit;

FIG. 16 shows how data is acquired in accordance with the monitoring state specified by the data acquisition monitoring state information;

FIG. 18 shows a list of request conditions to which various types of management information are attached by the request condition setting scheduling unit;

FIG. 20 shows a list of request conditions to which various types of management information are attached by the request condition setting scheduling unit 123

FIG. 26 shows a list of request conditions to which various kinds of management information have been attached by the request condition setting scheduling unit;

FIG. 33 shows an example of the table stored in the acquisition condition storing unit 202 that stores a plurality of sets of an acquisition condition, setting information, and an order value;

FIG. 34 shows the contents of the table shown in FIG. 33 after it is updated due to the execution of the above steps by the acquisition condition setting scheduling unit 204;

DESCRIPTION OF THE PREFERRED EMBODIMENTS

<Embodiment 1>

Figure 1:
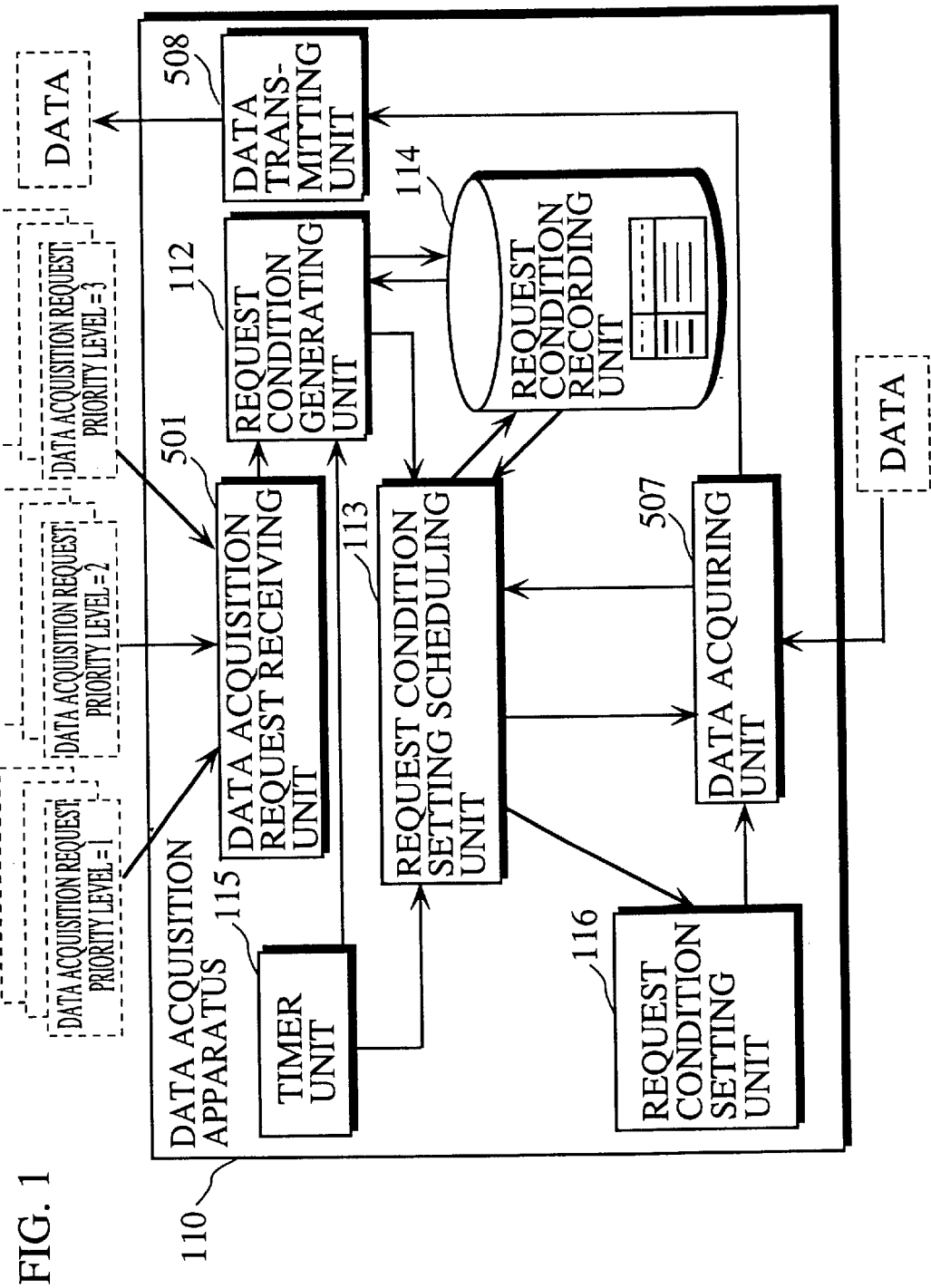
FIG. 1 is a functional block diagram showing the construction of a data acquisition apparatus as Embodiment 1 of the present invention.
Figure 28:
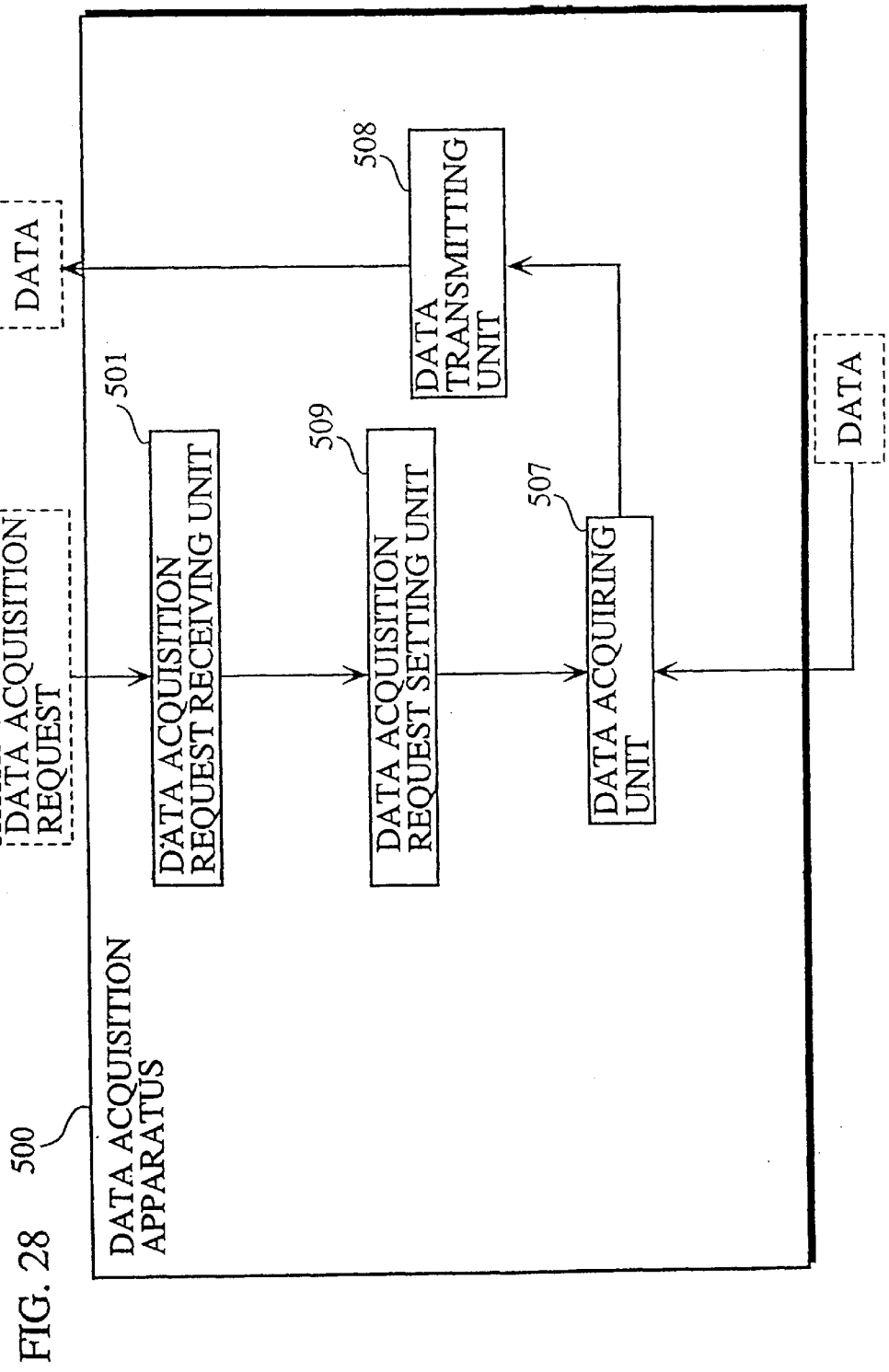
FIG. 28 is a functional block diagram showing the construction of a conventional data acquisition apparatus.
Figure 29:
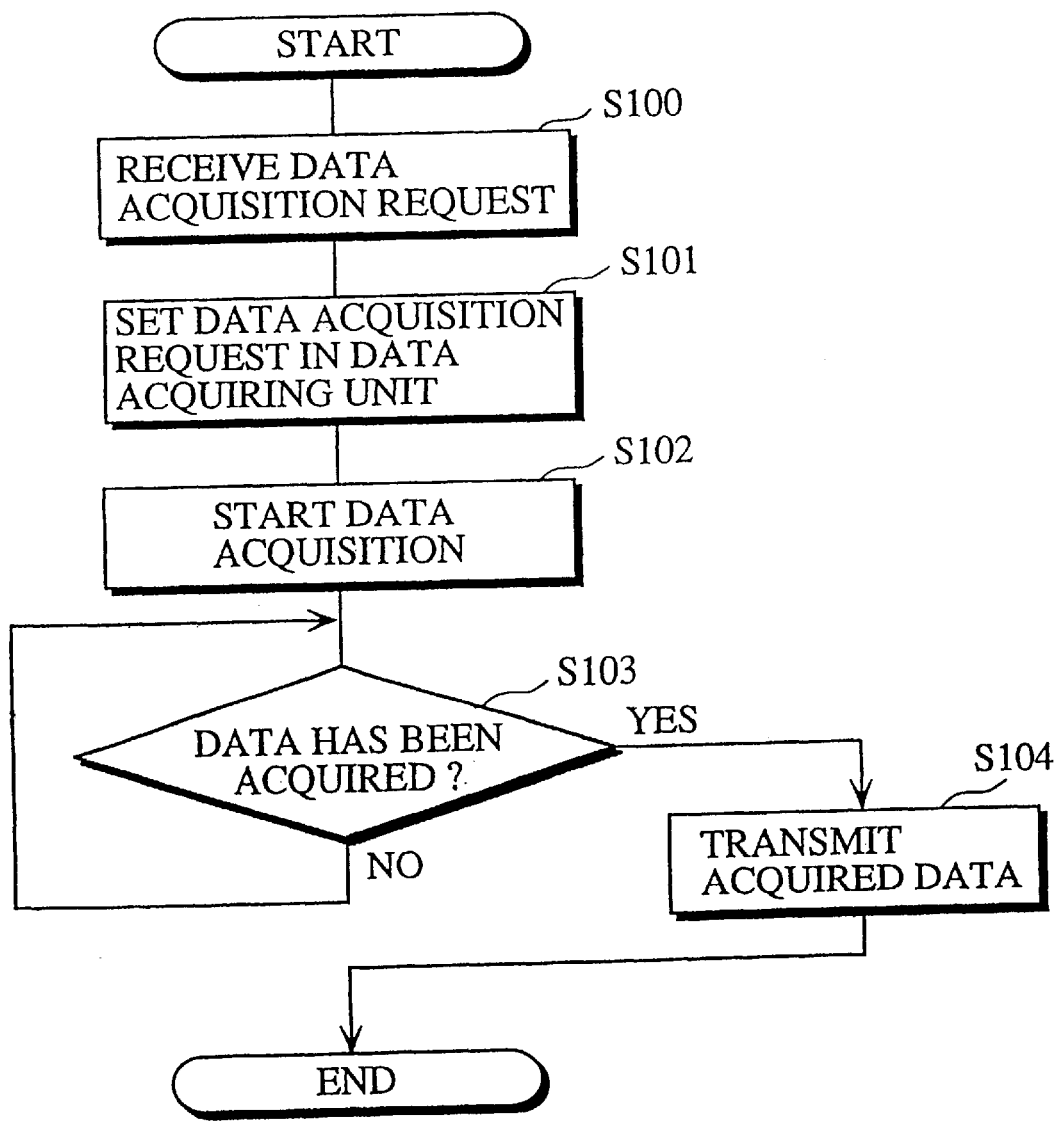
FIG. 29 is a flowchart showing the procedure of data acquisition by the conventional data acquisition apparatus.

FIG. 1 is a functional block diagram showing the construction of a data acquisition apparatus 110 as Embodiment 1 of the present invention. The data acquisition apparatus 110 has a feature of scheduling data acquisition requests issued from a plurality of data processing apparatuses in accordance with the priority levels. It should be noted here that the data processing apparatuses include software applications, hereinafter simply referred to as "applications". More specifically, the data acquisition apparatus 110 corresponds to hardware and software portions of a digital broadcast receiver which perform basic processes concerning data reception, such as broadcast data receiving, demultiplexing, decoding, and filtering. The data acquisition apparatus 110 includes a data acquisition request receiving unit 501, a request condition generating unit 112, a request condition setting scheduling unit 113, a request condition recording unit 114, a timer unit 115, a request condition setting unit 116, a data acquiring unit 507, and a data transmitting unit 508. Of these, the same units as those included in the data acquisition apparatus 500 shown in FIG. 28 are assigned with the same numbers.

It is supposed in the present embodiment that each application requests a data acquisition by issuing a data acquisition request, which includes header information and information specifying data to be acquired, to the data acquisition apparatus 110 (the data acquisition request receiving unit 501), together with a priority level for the data acquisition.

More particularly, the data acquisition request is, for example, information, such as a table ID or a table section number, that specifies one of various broadcast program information tables or a section of the tables that are included in the transport stream (TS) transmitted from a broadcasting station. The broadcast program information tables include: NIT (Network Information Table) that associates information related to transmission paths, such as modulation frequencies, with broadcast programs; EIT (Event Information Table) that shows information related to the broadcast programs, such as program names, broadcasting dates, and contents; and SDT (Service Description Table) that shows information related to channels, such as channel names and broadcaster names. All of these tables have the section-format-based data structure which is defined in the MPEG-2 System standard.

In the present embodiment, the priority levels "1", "2", and "3", in descending order of priority, are used.

The data acquisition request receiving unit 501 is an input interface for the data acquisition apparatus 110, and receives a pair of a data acquisition request and a priority level from each application and sends the contents of them to the request condition generating unit 112. When receiving a group of pairs of a data acquisition request and a priority level from one or more applications, the data acquisition request receiving unit 501 sends the group to the request condition generating unit 112 as it is.

The request condition generating unit 112 generates a request condition for each pair of a data acquisition request and a priority level received from the data acquisition request receiving unit 501, where the request condition shows the contents of the pair. The request condition generating unit 112 sends the request condition to the request condition setting scheduling unit 113 and stores the request condition in the request condition recording unit 114.

Here, each "request condition" corresponds to a data acquisition request the data acquisition apparatus 110 schedules and manages. In the present embodiment, each request condition includes at least a data acquisition condition and a priority level, where the data acquisition condition is a condition used to specify a piece of acquisition target data.

FIG. 2 shows a list of the request conditions generated by the request condition generating unit 112. In the present example, 8 request conditions are shown in the list in the order of generation of the data acquisition requests. Each request condition 1101 includes a data acquisition condition 1102 and a priority level 1103.

The request condition recording unit 114, achieved by a flash memory or the like, is a rewritable storage apparatus for storing the request conditions 1101.

The timer unit 115, achieved by a calendar timer, a preset counter or the like, outputs the current time, and outputs, once or repeatedly, (1) a notification that a preset time has been reached and (2) an interrupt signal.

The data acquiring unit 507 is a TS decoder that extracts a certain TS packet based on the PID (Packet ID) or the like from the transport stream, and decodes the extracted TS packet to an elementary stream. In the present embodiment, the data acquiring unit 507 can simultaneously process (wait and receive) up to 20 data acquisition requests. More particularly, the data acquiring unit 507 receives up to 20 request conditions set by the request condition setting unit 116, and acquires data in accordance with the set request conditions. The data acquiring unit 507 also sends to the request condition setting scheduling unit 113 a piece of data acquisition information which indicates whether a piece of data corresponding to a request condition has been acquired. The data acquiring unit 507 sends the acquired data to the data transmitting unit 508.

It should be noted here that the data acquiring unit 507 continues an attempt to acquire a piece of data once a corresponding request condition is set by the request condition setting unit 116 until the set request condition is eliminated by the request condition setting scheduling unit 113.

The request condition setting unit 116 receives a request condition from the request condition setting scheduling unit 113, and sets the received request condition in the data acquiring unit 507. More specifically, the request condition setting unit 116 converts a scheduled request condition sent from the request condition setting scheduling unit 113 into a dedicated parameter (e.g., PID) that can be recognized by the data acquiring unit 507, and sets the parameter in the data acquiring unit 507.

The data transmitting unit 508 receives from the data acquiring unit 507 the data it acquires, identifies an application that has issued the corresponding data acquisition request by referring to the request condition or the like recorded in the request condition recording unit 114, and sends the data to the identified application.

The request condition setting scheduling unit 113, achieved by a CPU or a ROM storing a control program, communicates with other components and controls the scheduling of the data acquisition in accordance with the request conditions generated by the request condition generating unit 112. For this purpose, the request condition setting scheduling unit 113 (a) monitors and manages the data acquisition states (divided into "executable", "in execution", "waiting", and "suspended") for each request condition using the request condition recording unit 114, (b) schedules the newly generated request conditions at regular intervals in accordance with the notification received from the timer unit 115 and the priority, and (c) reads "executable" request conditions that satisfy a certain condition from the request condition recording unit 114 and sends the read request conditions to the request condition setting unit 116.

Figure 3:
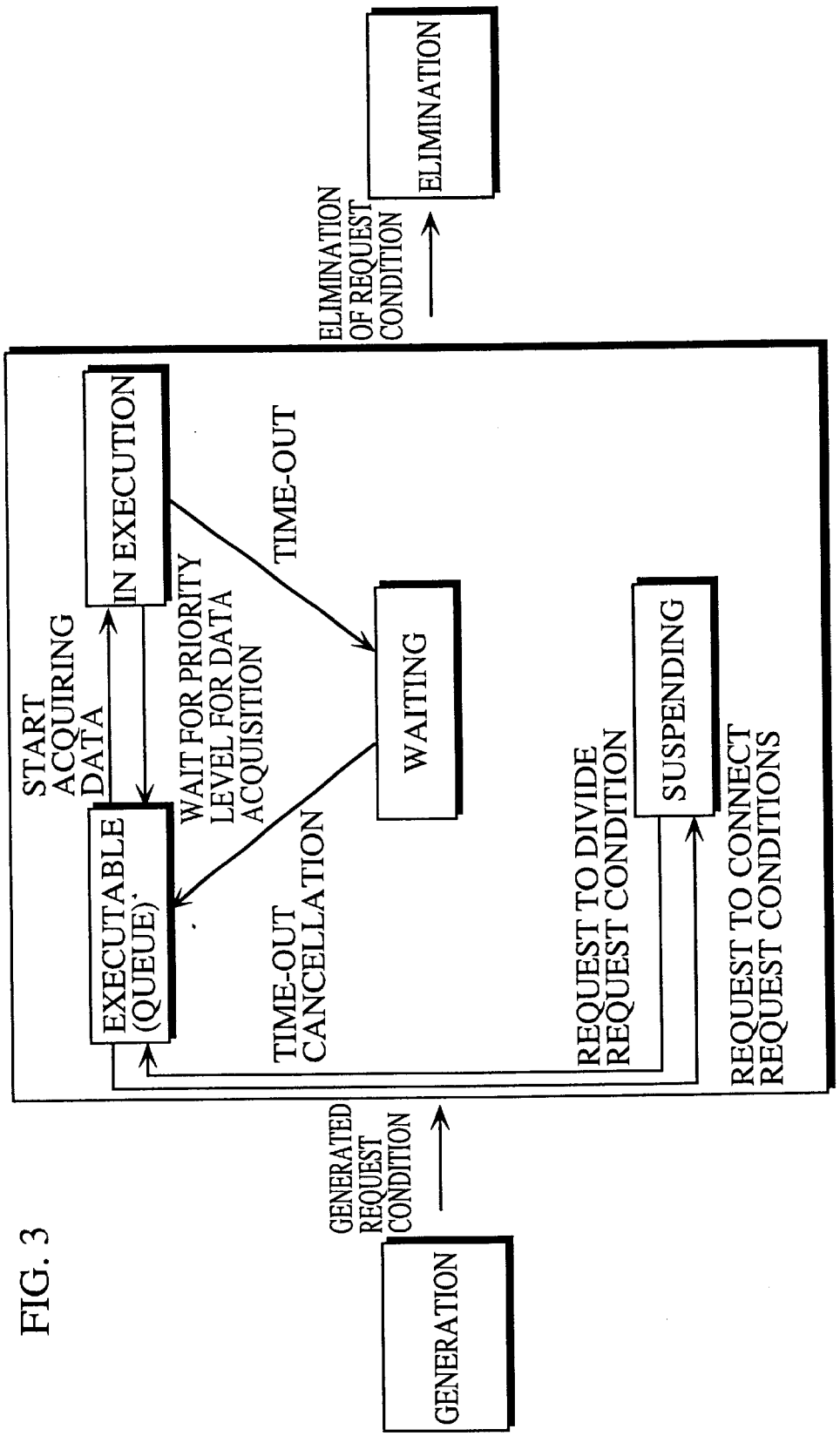
FIG. 3 shows transition of the data acquisition states for each request condition.

FIG. 3 shows transition of the request condition states, that is to say, transition of the data acquisition states (execution states) in the data acquisition apparatus 110 that occurs in correspondence to each request condition. Here, the "in execution" state indicates a state in which the request condition is set in the data acquiring unit 507 (a state in which the target data is acquired without fail when it is transmitted), the "executable" state indicates a state in which the request condition is in a queue before it is set in the data acquiring unit 507, the "waiting" state indicates a state in which the request condition had been set in the data acquiring unit 507 but the setting has been eliminated temporarily after a certain time period had passed from the start of the setting, and the "suspended" state indicates a state in which the request condition is eliminated temporarily from the setting in the data acquiring unit 507 due to a cause such as combination of request conditions that will be described later.

The transition of all states except for the generation of request conditions by the request condition generating unit 112 is performed under control of the request condition setting scheduling unit 113. More particularly, the request condition setting scheduling unit 113 controls the transition of the states as follows. When the number of request conditions in the "in execution" state is less than 20, the request condition setting scheduling unit 113 reads in order from the queue as many request conditions in the "executable" state as required to provide 20 request conditions in the "in execution" state and changes the execution state of the read request conditions to "in execution". When a predetermined time interval elapses without acquiring a piece of data corresponding to a request condition in the "in execution" state, the request condition setting scheduling unit 113 changes the execution state of the request condition to "waiting". When a predetermined time interval further elapses from this point of time, the request condition setting scheduling unit 113 changes the execution state of the request condition to "executable". When a request condition having a higher priority level than the "in execution" request conditions is entered, the request condition setting scheduling unit 113 changes a request condition in the "in execution" state to the "executable" state. Either when a piece of data corresponding to an "in execution" request condition is acquired or when an explicit elimination instruction is issued from another application, the request condition setting scheduling unit 113 eliminates the request condition from the request condition recording unit 114 ("eliminated state").

FIG. 4 shows the request conditions shown in FIG. 2 after they are scheduled by the request condition setting scheduling unit 113, i.e., after they are reordered in accordance with the priority. In this example, request conditions are arranged in order from top, starting with one having the highest priority level. The request condition setting scheduling unit 113 reads a request condition in the "executable" state and having the highest priority level from the request condition recording unit 114, and starts the data acquisition (changes to the "in execution" state) by notifying the request condition setting unit 116 of the reading of the request condition.

Now, the operation of the data acquisition apparatus 110 having the above-described construction will be described.

Figure 5:
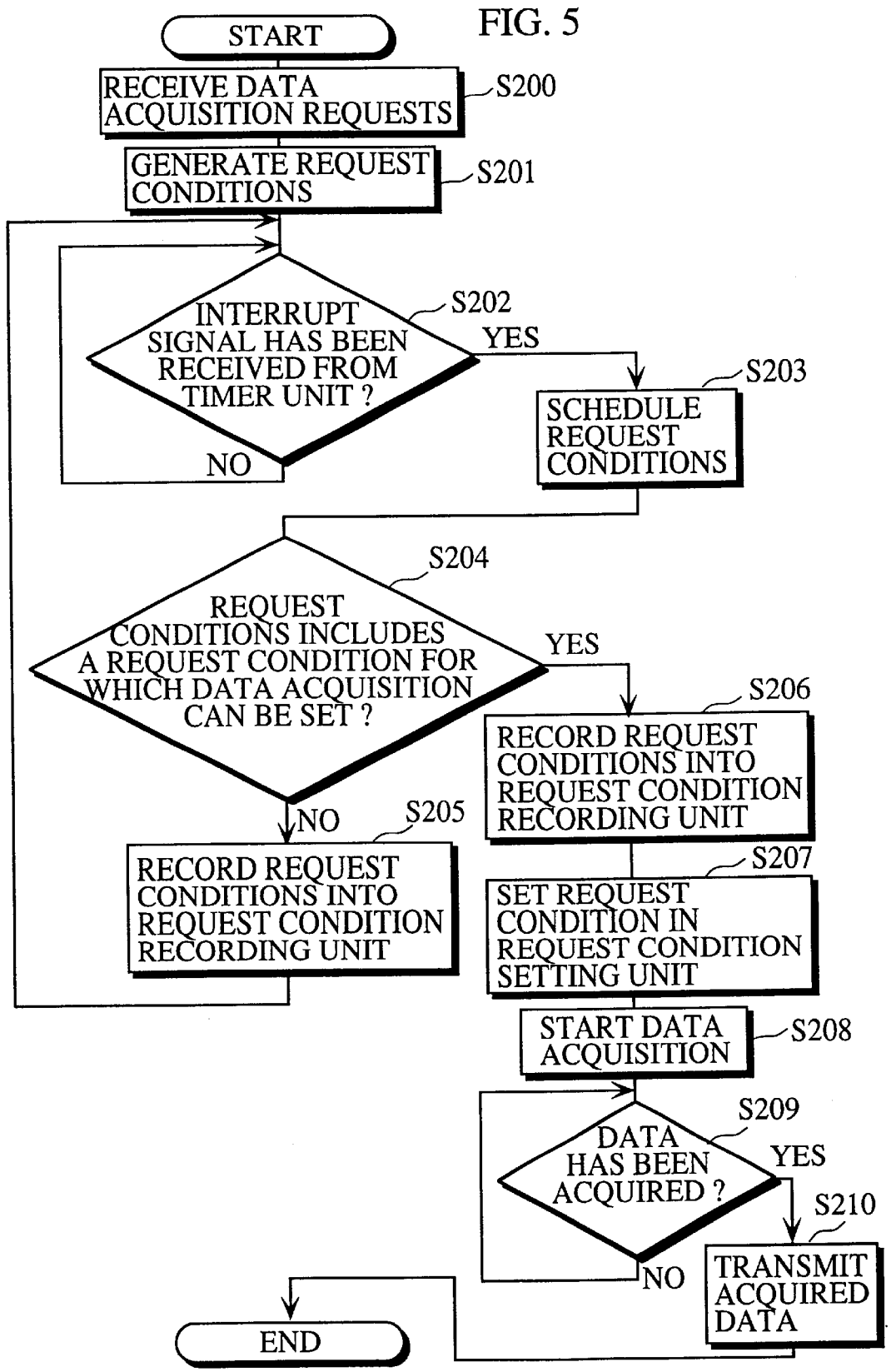
FIG. 5 is a flowchart showing the entire procedure of data acquisition by the data acquisition apparatus.

FIG. 5 is a flowchart showing the entire procedure of data acquisition by the data acquisition apparatus 110.

The data acquisition request receiving unit 501 receives one or more data acquisition requests at a time from the applications (step S200), and sends the received data acquisition requests to the request condition generating unit 112, which generates a request condition for each data acquisition request (step S201).

The request condition setting scheduling unit 113 judges whether an interrupt signal has been received from the timer unit 115 (step S202), where it is preset that the timer unit 115 sends the interrupt signal at regular intervals. When an interrupt signal has not been received (judged as "No" in step S202), the process in step S202 is repeated.

When an interrupt signal has been received (judged as "Yes" in step S202), the request condition setting scheduling unit 113 schedules, in accordance with the priority, the setting of data acquisition for the request conditions generated by the request condition generating unit 112 (step S203), judges whether the request conditions includes a request condition for which the data acquisition can be set (i.e., can be executed immediately) (step S204). When it is judged negatively in step S204, the request condition setting scheduling unit 113 records the request conditions into the request condition recording unit 114 (step S205). When it is judged positively in step S204, the request condition setting scheduling unit 113 records the request condition into the request condition recording unit 114 (step S206), sets the request condition in the request condition setting unit 116 (step S207), and allows the data acquiring unit 507 to start the data acquisition (step S208).

The data acquiring unit 507 judges whether the data has been acquired (step S209). Judging negatively in step S209, the data acquiring unit 507 repeats the process in step S209. Judging positively in step S209, the data acquiring unit 507 sends the acquired data to the data transmitting unit 508. The data transmitting unit 508 sends the acquired data to the requester (step S210).

Figure 6:
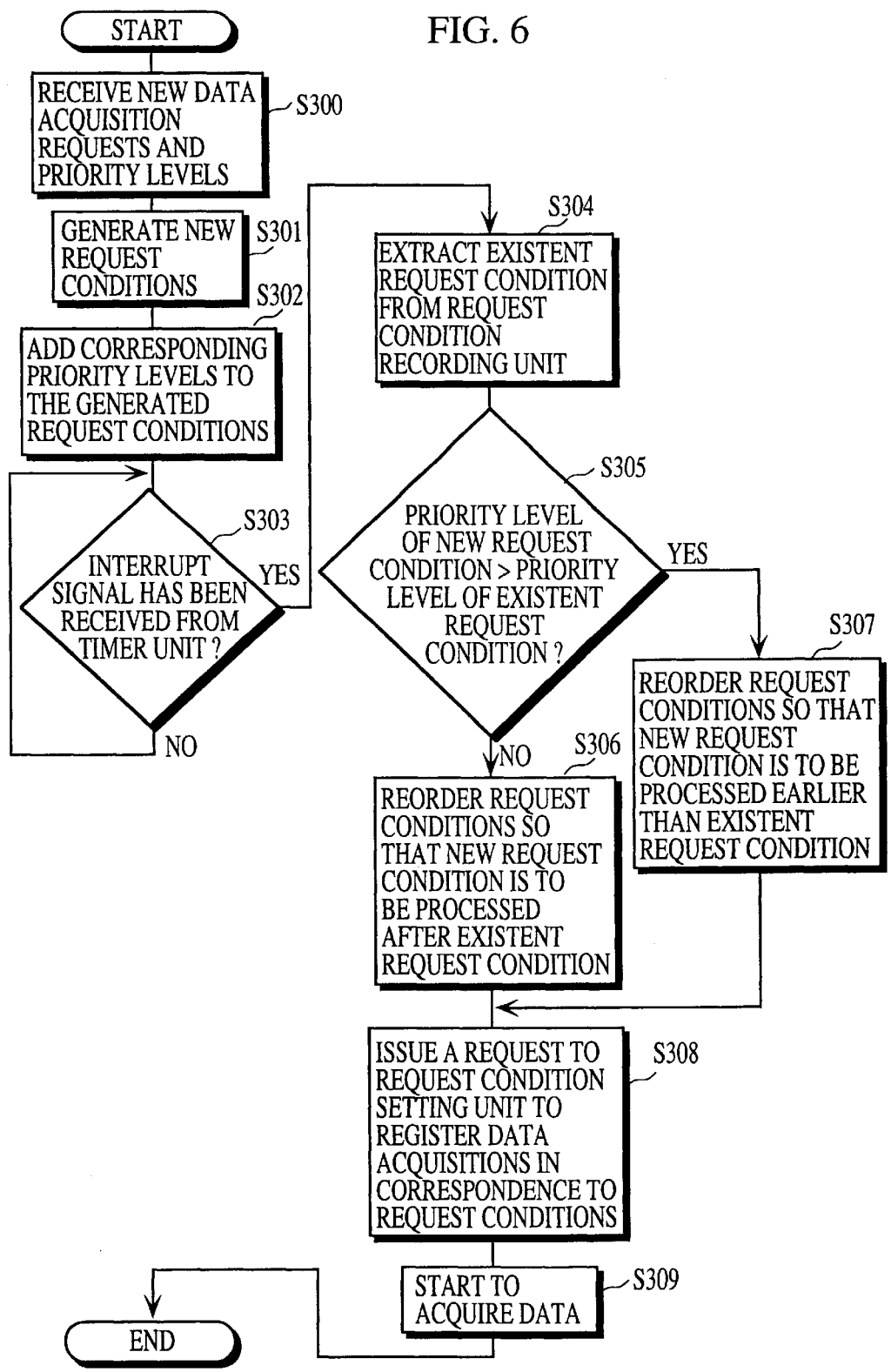
FIG. 6 is a flowchart showing mainly the procedure of scheduling the request conditions in accordance with the priority.

FIG. 6 is a flowchart showing mainly the procedure of scheduling the request conditions in accordance with the priority.

The data acquisition request receiving unit 501 receives new data acquisition requests and the priority levels of the requests, and sends the requests and the priority levels to the request condition generating unit 112 (step S300).

The request condition generating unit 112 generates request conditions corresponding to the received data acquisition requests (step S301), and adds the corresponding priority levels to the generated request conditions, as shown in FIG. 2 (step S302).

The request condition setting scheduling unit 113 judges whether an interrupt signal has been received from the timer unit 115 (step S303). When an interrupt signal has not been received, the process in step S303 is repeated.

When an interrupt signal has been received (judged as "Yes" in step S303), the request condition setting scheduling unit 113 extracts an existent request condition from the request condition recording unit 114 (step S304), and judges whether the priority level of the new request condition is higher than that of the existent request condition (step S305). When it is judged negatively, the request condition setting scheduling unit 113 stores the new request condition into the request condition recording unit 114 and reorders the request conditions so that the new request condition is to be processed after the existent request condition (step S306).

When it is judged positively in step S305, the request condition setting scheduling unit 113 stores the new request condition into the request condition recording unit 114 and reorders the request conditions so that the new request condition is to be processed earlier than the existent request condition (step S307).

Having completed the reordering of the new and existent request conditions, the request condition setting scheduling unit 113 issues a request to the request condition setting unit 116 to register data acquisitions one by one in correspondence to the request conditions stored in the request condition recording unit 114 for which the data acquisition can be set, in the order starting from the top (step S308). More particularly, the request condition setting scheduling unit 113 reads request conditions satisfying the above condition from the request condition recording unit 114 and sends them to the request condition setting unit 116.

Having received the request conditions, the request condition setting unit 116 converts the received request conditions into setting parameters, and sets the setting parameters in the data acquiring unit 507. With this operation, the data acquiring unit 507 starts to acquire data in correspondence to the request conditions (step S309).

As described above, when receiving a plurality of data acquisition requests at a time from the applications, the data acquiring apparatus 110 of the present embodiment allows the request condition setting scheduling unit 113 to schedule the received data acquisition requests so that they are processed systematically, resulting in an efficient data acquisition as a whole.

Also, the data acquiring apparatus 110 of the present embodiment schedule the data acquisition requests so that they are processed in the order of priority. This prevents data acquisitions that should be performed with high emergency or priority from being delayed, resulting in an efficient data acquisition.

The following is a detailed description of a data acquisition control exercised by the data acquisition apparatus 110 so that the data acquisition request execution state changes from "in execution" to "waiting" and further to "executable".

The request condition setting scheduling unit 113 assigns a time-out time for each request condition, and changes a request condition in the "in execution" state to the "waiting" state when the time-out time is reached. Simultaneously, the request condition setting scheduling unit 113 assigns a time-out cancellation time to the request condition in the "waiting" state, and changes the request condition in the "waiting" state to the "executable" state when the time-out cancellation time is reached.

The request condition setting scheduling unit 113 assigns 10 seconds to request conditions with priority level "1" as the time-out time and the time-out cancellation time, for example. More particularly, in this case, when 10 seconds passes after the request condition changes from the "executable" state to the "in execution" state, the request condition changes to the "waiting" state; and when 10 seconds passes after the request condition changes from the "in execution" state to the "waiting" state, the request condition changes to the "executable" state. Similarly, the request condition setting scheduling unit 113 assigns 20 and 30 seconds to request conditions with priority level "2" and "3", respectively, as the time-out time and the time-out cancellation time.

To achieve the above management operation, the request condition setting scheduling unit 113 controls the data acquisition for each request condition by attaching management information, such as the execution state, time-out time, and time-out cancellation time, to each request condition stored in the request condition recording unit 114.

FIG. 7 shows a list of request conditions to which a various types of management information have been attached by the request condition setting scheduling unit 113. As shown in FIG. 7, each request condition 1101 includes execution state information 1104, a time-out time 1105, and a time-out cancellation time 1106.

Figure 8:
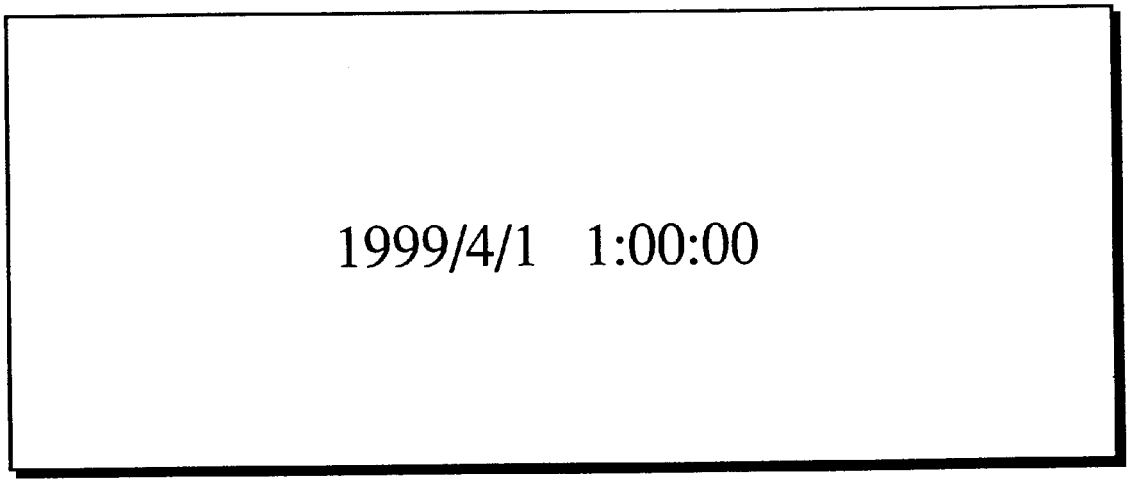
FIG. 8 shows an example of the "current" time read from the timer unit.

FIG. 8 shows an example of the "current" time read from the timer unit 115. In this example, the current time is represented by year, month, day, hour, minute, and second.

Figure 9:
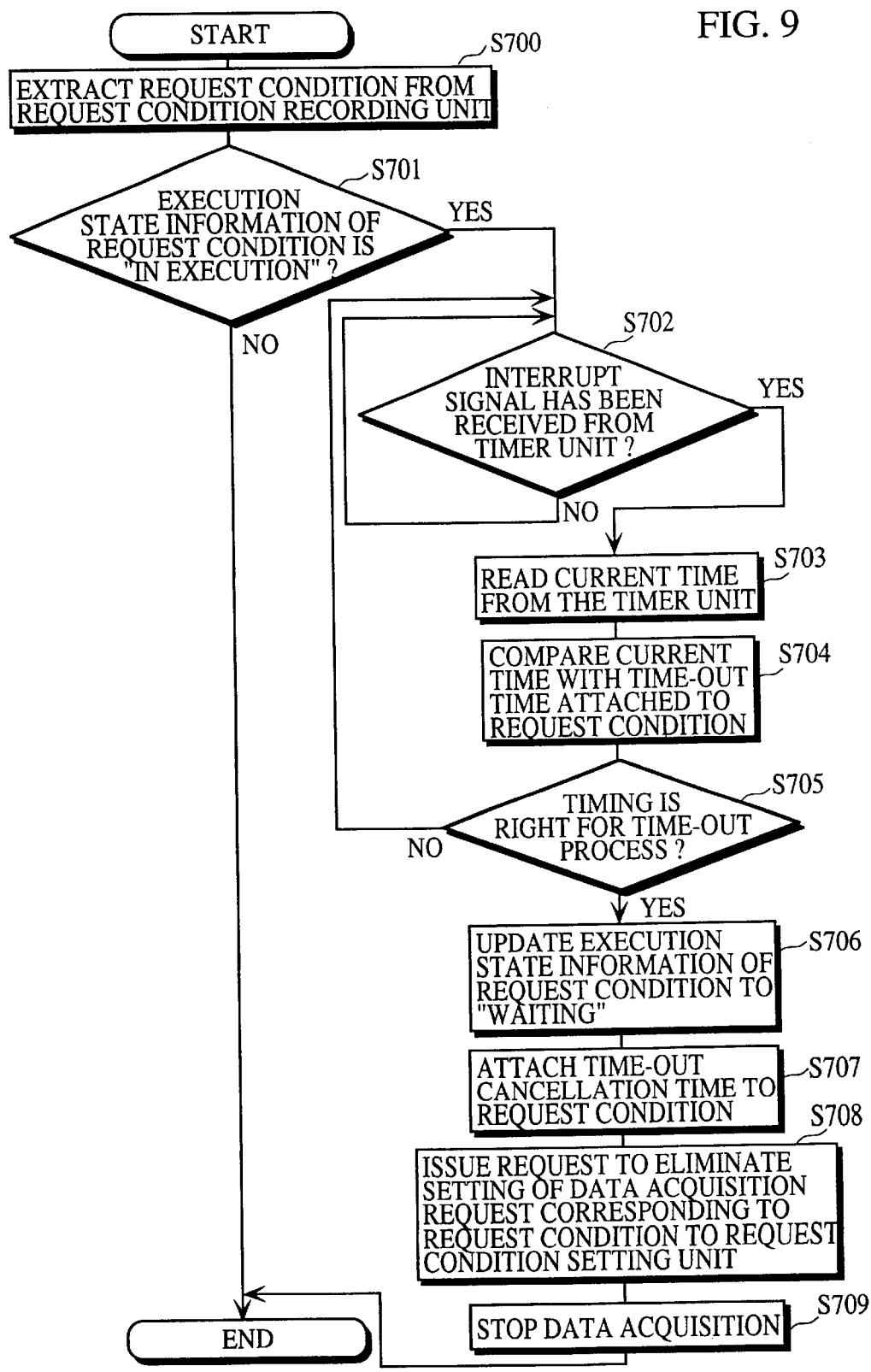
FIG. 9 is a flowchart showing the procedure of changing the data acquisition request execution state from "in execution" to "waiting" and further to "executable"

FIG. 9 is a flowchart showing the procedure of changing the data acquisition request execution state from "in execution" to "waiting" and further to "executable".

The request condition setting scheduling unit 113 extracts a request condition from the request condition recording unit 114 (step S700), and judges whether the execution state information 1104 of the request condition is "in execution" (step S701). When the request condition is not in the "in execution" state, it is not regarded as a target of the time-out control process shown in this flowchart, and the time-out control process ends.

When it is judged that the request condition is in the "in execution" state, the request condition setting scheduling unit 113 judges whether an interrupt signal has been received from the timer unit 115 (step S702), where it is preset that the timer unit 115 sends the interrupt signal at regular intervals. When an interrupt signal has not been received (judged as "No" in step S702), step S702 is repeated.

When an interrupt signal has been received (judged as "Yes" in step S702), the request condition setting scheduling unit 113 reads the current time from the timer unit 115 (step S703), compares the current time with the time-out time 1105 attached to the request condition (step S704), and judges whether the timing is right for the time-out process (whether the time-out time has been reached by the current time) (step S705). When it is judged negatively, the processes in step S702 to S704 are repeated.

When it is judged positively in step S705, the request condition setting scheduling unit 113 updates the execution state information 1104 of the request condition to "waiting" (step S706), attaches the time-out cancellation time 1106 to the request condition (step S707), and issues a request to eliminate the setting of the data acquisition request corresponding to the request condition to the request condition setting unit 116 (step S708). This allows the data acquisition corresponding to the request condition to stop (step S709), and the execution state substantially changes from "in execution" to "waiting".

After this, similarly, the request condition setting scheduling unit 113 changes the request condition from the "waiting" state to the "executable" state when the time-out cancellation time is reached. More particularly, when a request condition read from the request condition recording unit 114 has the execution state information 1104 being "waiting", the request condition setting scheduling unit 113 updates the execution state information 1104 to "executable" when the time-out cancellation time 1106 is reached by the current time, and puts the request condition into the above-described, priority-based queue. This cancels the "waiting" state of the request condition, substantially changing the execution state from "waiting" to "executable".

As described above, according to the data acquiring apparatus 110 of the present embodiment, even if a data acquisition request is in the "in execution" state, the state is changed to "executable" via "waiting" if data for the request is not acquired in a predetermined time period, and is put into the queue. This prevents a hardware resource from being wastefully occupied when broadcast data is not transmitted due to a machine trouble in the broadcasting station or a broadcast program change, achieving efficient data acquisition.

The following is a detailed description of a data acquisition control exercised by the data acquisition apparatus 110 so that the data acquisition request execution state changes from "executable" to "suspended".

The request condition generating unit 112 generates request conditions corresponding to the received data acquisition requests as described earlier. The request condition generating unit 112 also generates a request condition by combining newly generated request conditions with existent request conditions stored in the request condition recording unit 114.

More specifically, the request condition generating unit 112 judges that a plurality of request conditions can be connected if the data acquisition conditions 1102 of them have a condition in common, and newly generates a request condition that is composed of only the common condition (the conditions are connected by the logical sum).

Figure 10:
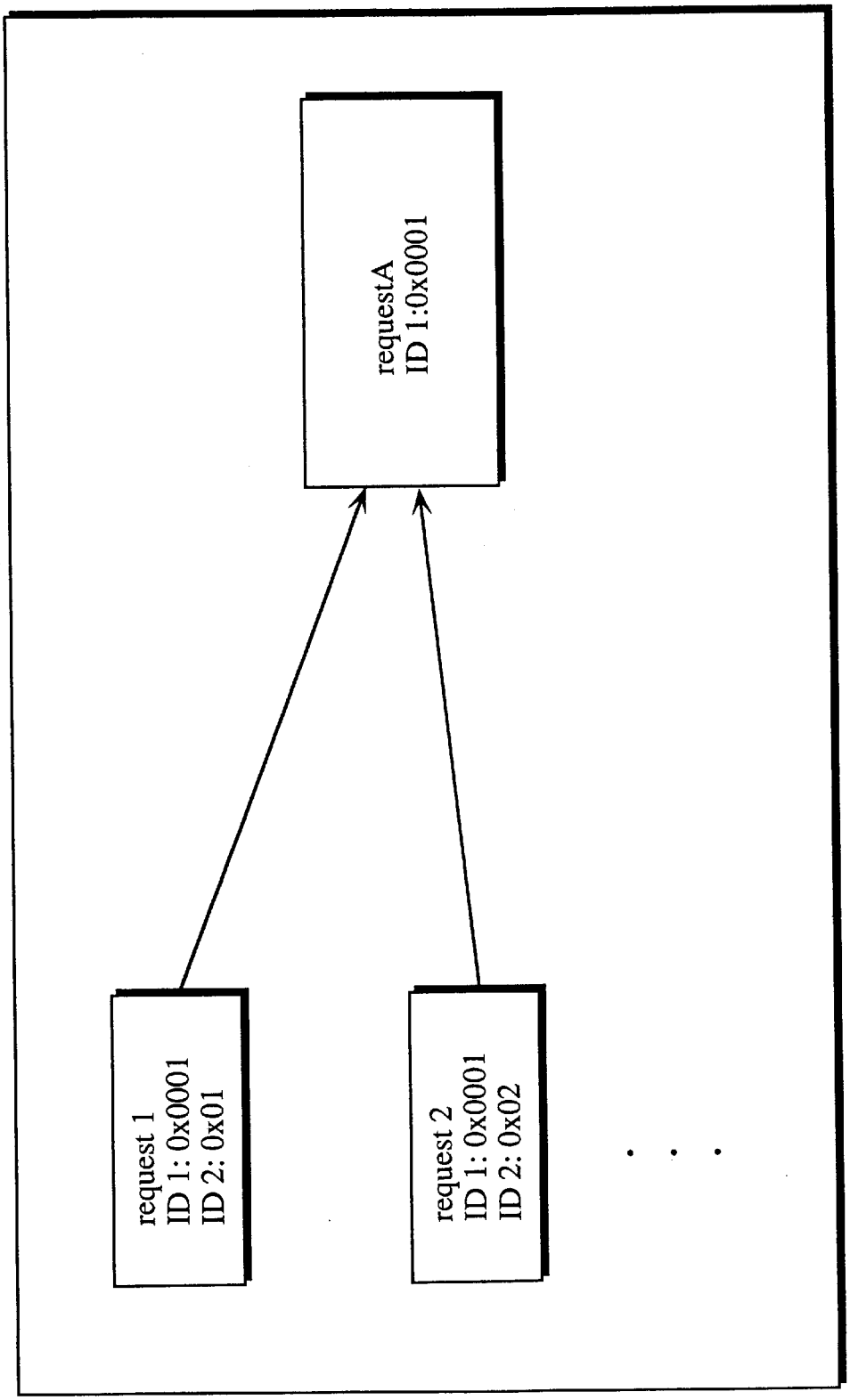
FIG. 10 shows how request conditions are connected by the request condition generating unit.

FIG. 10 shows how request conditions are connected by the request condition generating unit 112. In this example, a request condition "request A" requesting a table with ID1= 0×0001 is newly generated by connecting (a) a request condition "request 1" requesting a table with ID1 (e.g., a table ID)=0×0001 and ID2 (e.g., a section number)=0×01 with (b) a request condition "request 2" requesting a table with ID1=0×0001 and ID2=0×02.

It is presumed here that each table with ID1=0×0001 has one of ID2=0×00–0×09, and that the request condition "request A" generated by connecting a plurality of request conditions having ID1=0×0001 in common is a data acquisition request requesting acquisition of 10 kinds of tables: a table with ID1=0×0001 and ID2=0×00; a table with ID1= 0×0001 and ID2=0×01; . . . a table with ID1=0×0001 and ID2=0×09.

When the request condition generating unit 112 generates a new request condition by connecting request conditions having a condition in common, the request condition setting scheduling unit 113 changes the execution state of each connected request condition to "suspended" via "executable", and changes the execution state of the newly generated request condition to "in execution" via "executable".

FIG. 11 is a flowchart showing the procedure of connecting request conditions;

The request condition generating unit 112 generates a new request condition (step S600), extracts an existent request condition from the request condition recording unit 114 (step S601), compares the data acquisition conditions 1102 of the two request conditions with each other (step S602), and judges whether the two request conditions can be connected (step S603). When the two request conditions have no condition in common, it is judged in step S603 that the two request conditions can not be connected, and the connection process ends.

When the two request conditions have a condition in common, the request condition generating unit 112 judges in step S603 that the two request conditions can be connected, and generates a new request condition by connecting the two request conditions (step S604). The request condition generating unit 112 then stores the newly generated request condition in the request condition recording unit 114, and issues a request to the request condition setting scheduling unit 113 to register the newly generated request condition as a control object (step S605).

The request condition setting scheduling unit 113 issues a request to the data acquiring unit 507 to suspend the execution of the two connected request conditions when the two connected request conditions are in the "in execution" state (step S606), and registers the newly generated request condition, having been requested by the request condition generating unit 112 to be registered as a control object, with the queue of the "executable" state (step S607).

The request condition setting scheduling unit 113 changes the execution state of the two connected request conditions from "executable" to "suspending" (step S608). That is to say, the two connected request conditions are eliminated from data acquisition objects until a division of the request condition (which will be described later) is performed.

As described above, the data acquisition apparatus 110 of the present embodiment generates a request condition by connecting, by logical sum, a plurality of request conditions having a condition in common in their data acquisition conditions 1102, and acquires data using the newly generated request condition instead of the plurality of request conditions. This reduces the number of request conditions set in the data acquiring unit 507, and allows more data acquisitions to be performed simultaneously in an environment of limited hardware resources.

The following is a detailed description of a data acquisition control exercised by the data acquisition apparatus 110 so that the data acquisition request execution state changes from "suspending" to "executable".

The request condition setting scheduling unit 113 judges whether the data corresponding to the request conditions, which have been changed to the "suspending" state after the connection, has been acquired after a predetermined time period. When confirming that the data has not been acquired, the request condition setting scheduling unit 113 cancels the connection and restores the former request conditions. This is because, except for the case where the data corresponding to the connected request conditions is acquired by the newly generated request condition, there is a fear that it may take quite a long time before the data corresponding to the connected request conditions is acquired since the newly generated request condition has the same or less strictness than the connected request conditions.

For achieving the above control, when generating a request condition by connecting request conditions having a condition in common, the request condition generating unit 112 also generates request identification information, request generation time, and post-connection request identification information, attaches these kinds of information to the request conditions, sends the request conditions to the request condition setting scheduling unit 113, and stores the request conditions in the request condition recording unit 114. The request condition setting scheduling unit 113 controls the data acquisition for each request condition stored in the request condition recording unit 114 by attaching management information, such as data acquisition decision information which is made in accordance with the data acquisition information obtained from the data acquiring unit 507, to each request condition.

It should be noted here that the "request identification information" is used to identify a request condition, the "request generation time" shows a time at which a request condition is newly generated, the "post-connection request identification information" is used to identify a request condition that is generated by connecting a plurality of request conditions, and the "data acquisition decision information" shows whether data corresponding to a request condition stored in the request condition recording unit 114 has been acquired or not (shows "data acquired" or "data not acquired").

FIG. 12 shows a list of request conditions to which various kinds of management information are attached by the request condition setting scheduling unit 113. Each request condition 1101 includes request identification information 1110, a data acquisition condition 1102, a request generation time 1111, execution state information 1104, post-connection request identification information 1112, and data acquisition decision information 1113.

The list shows that request conditions identified as "0×0004", "0×0005", and "0×0008" by request identification information 1110 have been connected to generate a request condition identified as "0×0001" and are in the "suspending" state, that the data acquisition corresponding to the request condition identified as "0×0001" is currently in progress, and that the data for the request condition identified as "0x0004" has been acquired, but the data for the request conditions identified as "0x0005" and "0x0008" has not been acquired.

FIG. 13 is a flowchart showing the procedure of dividing a data acquisition request that has been generated by connecting a plurality of data acquisition requests.

The request condition setting scheduling unit 113 extracts from the request condition recording unit 114 a request condition connected to generate a new request condition (step S800), and judges whether the data acquisition decision information 1113 of the connected request condition shows "data not acquired" (step S801). When it is judged negatively, the request condition setting scheduling unit 113 excludes the request condition from the process of this flowchart, ending this process.

When it is judged positively in step S801, the request condition setting scheduling unit 113 judges whether an interrupt signal has been received from the timer unit 115 (step S802), where it is preset that the timer unit 115 sends the interrupt signal at regular intervals. When an interrupt signal has not been received (judged as "No" in step S802), the process in step S802 is repeated.

When an interrupt signal has been received (judged as "Yes" in step S802), the request condition setting scheduling unit 113 reads the current time from the timer unit 115 (step S803), compares the current time with the request generation time 1111 of the request condition (step S804), and judges whether a predetermined time period has elapsed without acquiring the data (step S805). When the predetermined time period has not elapsed (judged as "No" in step S805), the process in steps S802 to 804 is repeated.

When the predetermined time period has elapsed (judged as "Yes" in step S805), the request condition setting scheduling unit 113 updates the execution state information 1104 of the request condition to "suspending" to restore the request condition by dividing the newly generated request condition (step S806), and issues a request to eliminate the setting of the data acquisition request corresponding to the newly generated request condition to the request condition setting unit 116 (step S807). The request condition setting scheduling unit 113 updates the execution state information 1104 of the former request condition to "executable" (step S808), then when this request condition is placed at the top of the queue, issues a request to the request condition setting unit 116 to register the data acquisition for this request condition (step S809), and starts the data acquisition (step S810).

As a result of the above operation, the state of the data acquisition corresponding to the request condition identified as "0x0001" by request identification information 1110 shown in FIG. 12 changes from "in execution" to "waiting" and further to "executable", and the state of the data acquisition corresponding to the request conditions identified as "0x0005" and "0x0008" changes from "suspending" to "executable" and further to "in execution".

As described above, according to the data acquiring apparatus 110 of the present embodiment, when the data corresponding to request conditions which have been connected to generate a new request condition has not been acquired after a predetermined time period from the connection, the connection is canceled and the execution state of the former request conditions is restored. This solves the problem caused by the connection that it may take quite a long time before the data corresponding to the connected request conditions is acquired, achieving an efficient data acquisition.

<Embodiment 2>

The following is a description of the second embodiment of the present invention.

Figure 14:
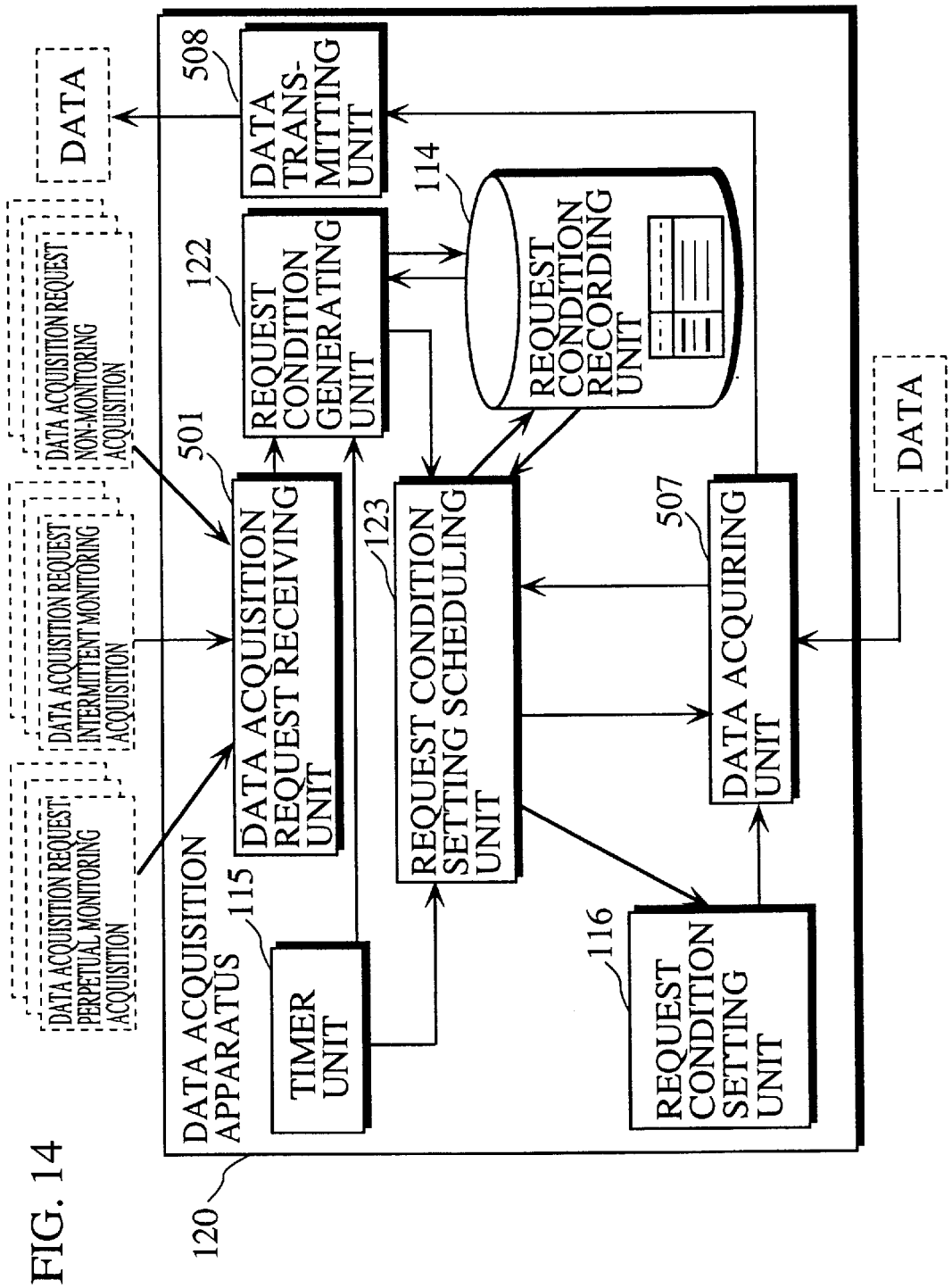
FIG. 14 is a functional block diagram showing the construction of a data acquisition apparatus as Embodiment 2 of the present invention.

FIG. 14 is a functional block diagram showing the construction of a data acquisition apparatus 120 as Embodiment 2 of the present invention. The data acquisition apparatus 120 has a feature of changing the frequency of data acquisition in accordance with instructions from the applications. The data acquisition apparatus 120 includes the data acquisition request receiving unit 501, a request condition generating unit 122, a request condition setting scheduling unit 123, the request condition recording unit 114, the timer unit 115, the request condition setting unit 116, the data acquiring unit 507, and the data transmitting unit 508. Of these, the same units as those included in the data acquisition apparatus 110 in Embodiment 1 are assigned with the same numbers. The following description centers on the differences from Embodiment 1.

It is supposed in the present embodiment that each application requests a data acquisition by issuing a data acquisition request to the data acquisition apparatus 120 accompanied by data acquisition monitoring state information which specifies a type of data acquisition. The data acquisition monitoring state information specifies one of "perpetual monitoring acquisition", "intermittent monitoring acquisition", and "non-monitoring acquisition", where the perpetual monitoring acquisition indicates that data is always acquired, the intermittent monitoring acquisition indicates that data is acquired at regular intervals, and the non-monitoring acquisition indicates that once the requested data is acquired, monitoring (attempt to acquire data) is not performed any more.

The above three types of data acquisitions are used as follows for example, when the applications request data acquisition to the data acquisition apparatus 120 (data acquisition request receiving unit 501). The perpetual monitoring acquisition is specified for NIT that should be received without fail and is transmitted at very close intervals; the intermittent monitoring acquisition is specified for EIT that should not be received always since it has a large data size but should be received at regular intervals; and the non-monitoring acquisition is specified for SDT that is transmitted at regular intervals but is rarely updated.

The request condition generating unit 122 generates, for each pair of a data acquisition request and a piece of data acquisition monitoring state information received from the data acquisition request receiving unit 501, a request condition to which the piece of data acquisition monitoring state information is attached, sends the generated request condition to the request condition setting scheduling unit 123, and stores it in the request condition recording unit 114.

FIG. 15 shows a list of request conditions generated by the request condition generating unit 122. This example shows 8 request conditions generated in the order of generation of data acquisition requests. Each request condition 1201 includes a data acquisition condition 1102 and data acquisition monitoring state information 1202.

The request condition setting scheduling unit 123 communicates with other components and controls the data acquisition in accordance with the request conditions generated by the request condition generating unit 122. For this purpose, the request condition setting scheduling unit 123 (a) monitors and manages the data acquisition states for each request condition using the request condition recording unit 114, and (b) exercises a control so that data corresponding to a newly generated request condition is acquired by the data acquisition type specified by the data acquisition monitoring state information 1202.

FIG. 16 shows how the request condition setting scheduling unit 123 controls the data acquisition corresponding to the request conditions shown in FIG. 15. More particularly, FIG. 16 shows how data is acquired in accordance with the monitoring state specified by the data acquisition monitoring state information 1202. FIG. 16 shows request conditions belonging to the same piece of data acquisition monitoring state information 1202.

Once a request condition specified as "perpetual monitoring acquisition" is set to the "in execution" state, the request condition setting scheduling unit 123 maintains the state unless it receives an explicit elimination instruction from another application. As for a request condition specified as "intermittent monitoring acquisition", the request condition setting scheduling unit 123 cyclically changes its execution state to "in execution", "waiting", "executable", or "in execution" in this order at regular intervals. As for a request condition specified as "non-monitoring acquisition", the request condition setting scheduling unit 123 changes its execution state from "in execution" to "eliminated" once the target data is acquired.

Now, the operation of the data acquisition apparatus 120 with the above-described construction will be described.

Figure 17:
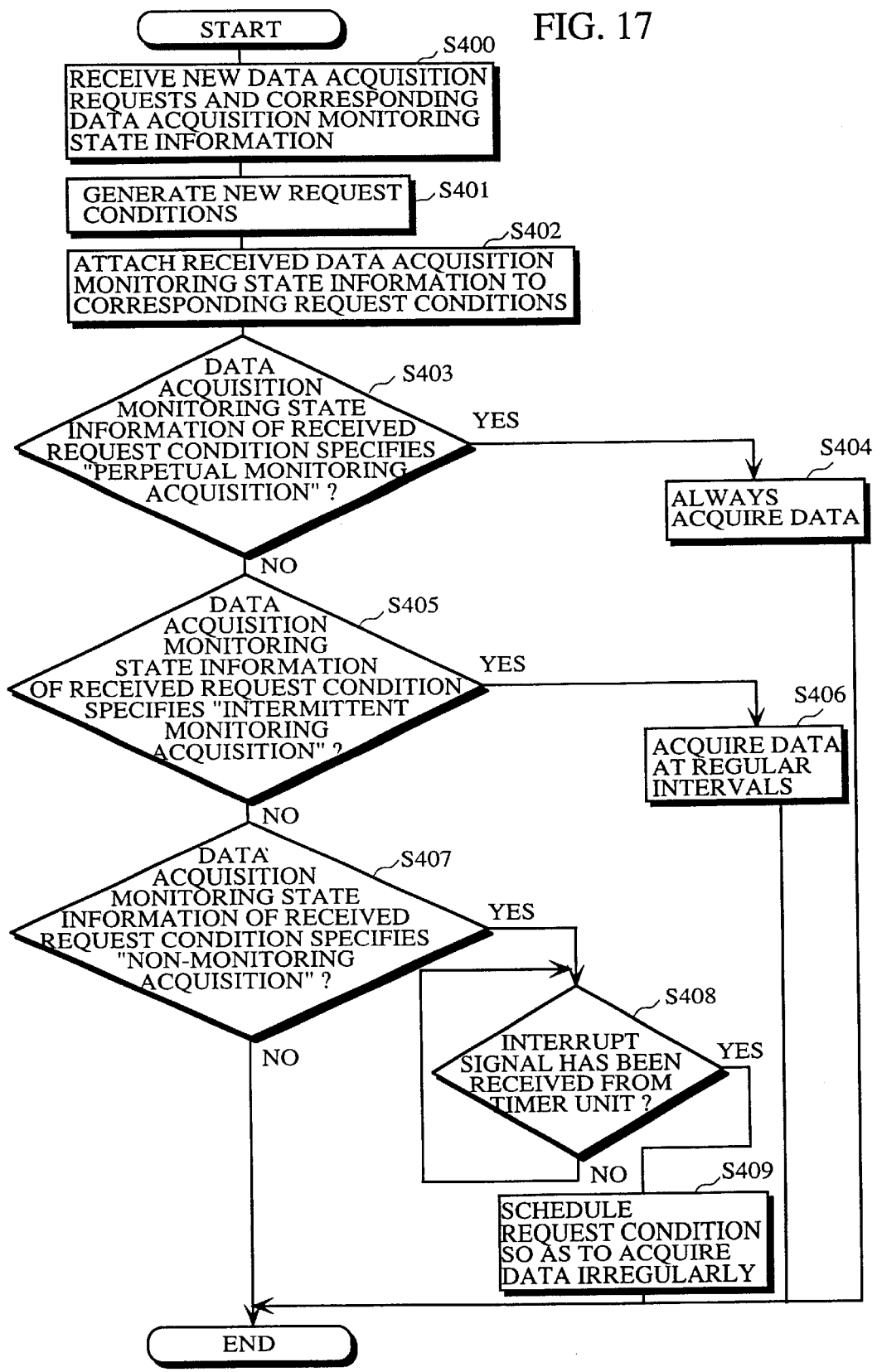
FIG. 17 is a flowchart showing an entire procedure of data acquisition by the data acquisition apparatus.

FIG. 17 is a flowchart showing an entire procedure of data acquisition by the data acquisition apparatus 120.

The acquisition request receiving unit 501 receives new data acquisition requests and corresponding pieces of data acquisition monitoring state information 1202, and sends them to the request condition generating unit 122 (step S400). The request condition generating unit 122 generates request conditions corresponding to the received data acquisition requests (step S401), attaches the received pieces of data acquisition monitoring state information 1202 to the corresponding request conditions, stores the request conditions with the data acquisition monitoring state information 1202 into the request condition recording unit 114, and sends the same to the request condition setting scheduling unit 123 (step S402).

The request condition setting scheduling unit 123 judges whether the data acquisition monitoring state information 1202 of a received request condition specifies "perpetual monitoring acquisition" (step S403). When it is judged positively, the request condition setting scheduling unit 123 exercises a control so as to always acquire data (step S404). More specifically, the request condition setting scheduling unit 123 instructs the data acquiring unit 507, via the request condition setting unit 116, to set the request condition to the "in execution" state, and maintains the "in execution" state unless it receives an explicit elimination instruction.

When it is judged negatively in step S403, the request condition setting scheduling unit 123 judges whether the data acquisition monitoring state information 1202 of the received request condition specifies "intermittent monitoring acquisition" (step S405). When it is judged positively, the request condition setting scheduling unit 123 exercises a control so as to acquire data at regular intervals (step S406). More specifically, the request condition setting scheduling unit 123 instructs the data acquiring unit 507, via the request condition setting unit 116, to set the request condition to the "in execution" state, and cyclically changes its execution state to "in execution", "waiting", "executable", or "in execution" in this order at regular intervals by monitoring the time provided by the timer unit 115.

When it is judged negatively in step S405, the request condition setting scheduling unit 123 judges whether the data acquisition monitoring state information 1202 of the received request condition specifies "non-monitoring acquisition" (step S407). When it is judged positively, the request condition setting scheduling unit 123 exercises a control so as to acquire data only once (steps S408–S409).

More specifically, the request condition setting scheduling unit 123 judges whether an interrupt signal has been received from the timer unit 115 (step S408), where it is preset that the timer unit 115 sends the interrupt signal at regular intervals. When an interrupt signal has been received (judged as "Yes" in step S408), the request condition setting scheduling unit 113 schedules the request condition so as to acquire data irregularly (step S409). More specifically, the request condition setting scheduling unit 123 instructs the data acquiring unit 507, via the request condition setting unit 116, to set the request condition to the "in execution" state, monitors whether the data acquiring unit 507 acquires the data corresponding to the request condition, and when detecting the data acquisition, eliminates the request condition from the request condition recording unit 114.

When it is judged negatively in step S407, the request condition setting scheduling unit 123 judges that none of the monitoring states is specified for the request condition, and ends the process of the flowchart without further acquiring data.

As described above, the data acquisition apparatus 120 of the present embodiment acquires data in accordance with the monitoring states specified by the applications. This eliminates the applications having to adjust the frequency or timing for issuing data acquisition requests in accordance with the types of transmitted data.

This also solves the problem that the same types of data acquisition requests are repeatedly issued, provides data acquisitions which are finely adjusted in accordance with the transmission data size (band), transmission frequency, reception necessity or the like, and increases the amount of data acquired per unit time.

The following is a detailed description of a data acquisition control exercised by the data acquisition apparatus 120 for a request condition for which the data acquisition monitoring state information 1202 specifies "non-monitoring acquisition" (change from "waiting" to "executable").

When confirming that a request condition has the data acquisition monitoring state information 1202 specifying "non-monitoring acquisition" and the execution state information 1104 indicating "waiting", the request condition setting scheduling unit 123 monitors whether the time-out cancellation time has been reached, and when it has been reached, exercises a control so as to change the execution state to "in execution" via "executable". For achieving this, the request condition setting scheduling unit 123 controls the data acquisition for each request condition by attaching management information such as execution state information or time-out cancellation time as well as the data acquisition monitoring state information 1202 to each request condition stored in the request condition recording unit 114, and storing the request conditions with such information and updating them.

FIG. 18 shows a list of request conditions to which various types of management information are attached by the request condition setting scheduling unit 123. Each request condition 1201 includes the data acquisition condition 1102, the data acquisition monitoring state information 1202, the execution state information 1104, and the time-out cancellation time 1106.

It is understood from FIG. 18, for example, that the request condition for which the data acquisition condition 1102 specifies "request 2" includes the data acquisition monitoring state information 1202 specifying "non-monitoring acquisition", that the execution state information 1104 indicates "waiting", and that the time-out cancellation time 1106 is "1999/4/1 1:00:50", which indicates that the "executable" state is restored when the time-out cancellation time is reached.

Figure 19:
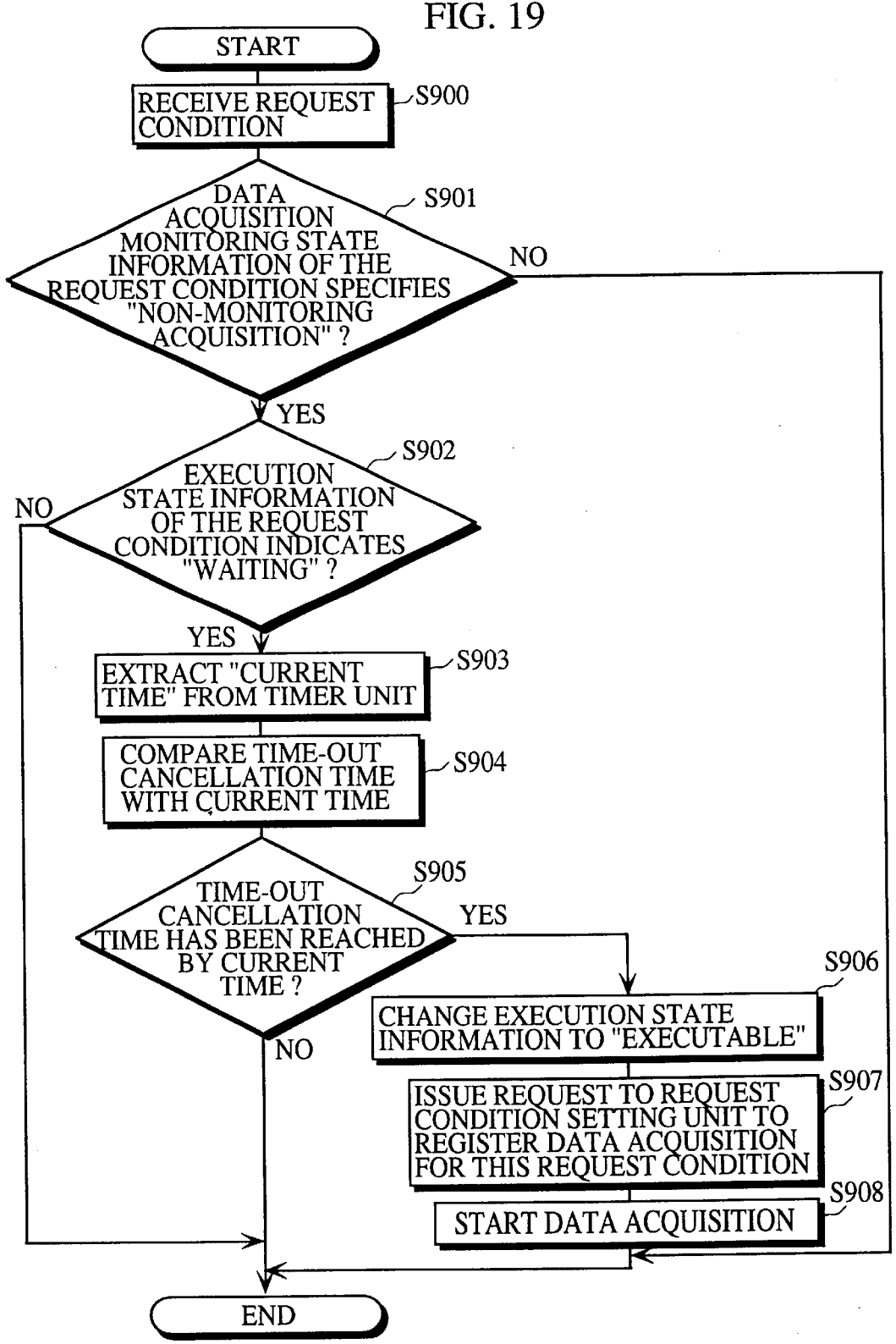
FIG. 19 is a flowchart showing the procedure for a data acquisition control exercised by the data acquisition apparatus for a request condition for which the data acquisition monitoring state information specifies "non-monitoring acquisition" (change from "waiting" to "executable")

FIG. 19 is a flowchart showing the procedure for a data acquisition control exercised by the data acquisition apparatus 120 for a request condition for which the data acquisition monitoring state information 1202 specifies "non-monitoring acquisition" (change from "waiting" to "executable").

The request condition setting scheduling unit 123 receives a notification from the request condition generating unit 122 of having generated a request condition in accordance with a data acquisition request issued by an application (step S900), and judges whether the data acquisition monitoring state information 1202 of the request condition specifies "non-monitoring acquisition" (step S901). When it is judged negatively, the request condition setting scheduling unit 123 does not recognize the request condition as an object of the process of this flowchart, and ends the process.

When it is judged positively in step S901, the request condition setting scheduling unit 123 judges whether the execution state information 1104 indicates "waiting" (step S902). When it is judged negatively, the process of this flowchart ends.

When it is judged positively in step S902, the request condition setting scheduling unit 123 extracts the "current time" from the timer unit 115 (step S903), and compares the time-out cancellation time 1106 with the current time (step S904), and judges whether the time-out cancellation time has been reached by the current time (step S905). When it is judged negatively, the request condition setting scheduling unit 123 does not recognize the request condition as an object of the process of this flowchart, and ends the process.

When it is judged positively in step S905, the request condition setting scheduling unit 123 changes the execution state information 1104 to "executable" (step S906), and when this request condition is placed at the top of the queue, issues a request to the request condition setting unit 116 to register the data acquisition for this request condition (step S907), and starts the data acquisition (step S908).

As described above, when confirming that a request condition has the data acquisition monitoring state information 1202 specifying "non-monitoring acquisition", the data acquisition apparatus 120 in the present embodiment allows the execution state to change from "in execution" to "waiting" when the "time-out" time is reached, and allows the "in execution" state to be restored via the "executable" state when the time-out cancellation time is reached so that data acquisition is attempted repeatedly. This prevents an inefficient data acquisition in which hardware resources are kept occupied wastefully.

The following is a detailed description of a data acquisition control exercised by the data acquisition apparatus 120 for a request condition for which the data acquisition monitoring state information 1202 specifies "non-monitoring acquisition" (change from "executable" to "in execution").

When confirming that a request condition has the data acquisition monitoring state information 1202 specifying "non-monitoring acquisition", is in the "in execution" state, and has the data acquisition decision information indicating "data acquired", the request condition setting scheduling unit 123 searches for a request condition that has a higher priority level than this request condition, is in the "executable" state, and has the data acquisition decision information indicating "data not acquired". When it detects such a request condition, the request condition setting scheduling unit 123 exercises a control so as to replace the execution states of these request conditions with each other.

For achieving this, the request condition setting scheduling unit 123 controls the data acquisition for each request condition by attaching management information such as the data acquisition decision information and priority levels as well as the data acquisition monitoring state information and the execution state information to each request condition stored in the request condition recording unit 114, and storing the request conditions with such information and updating them.

FIG. 20 shows a list of request conditions to which various types of management information are attached by the request condition setting scheduling unit 123. Each request condition 1201 includes the data acquisition condition 1102, the data acquisition monitoring state information 1202, the execution state information 1104, the data acquisition decision information 1113, and the priority level 1103.

FIG. 20 indicates that the execution state "in execution" of the request condition identified as "request 3" by the data acquisition condition 1102 should be replaced with the execution state "executable" of the request condition identified as "request 6".

Figure 21:
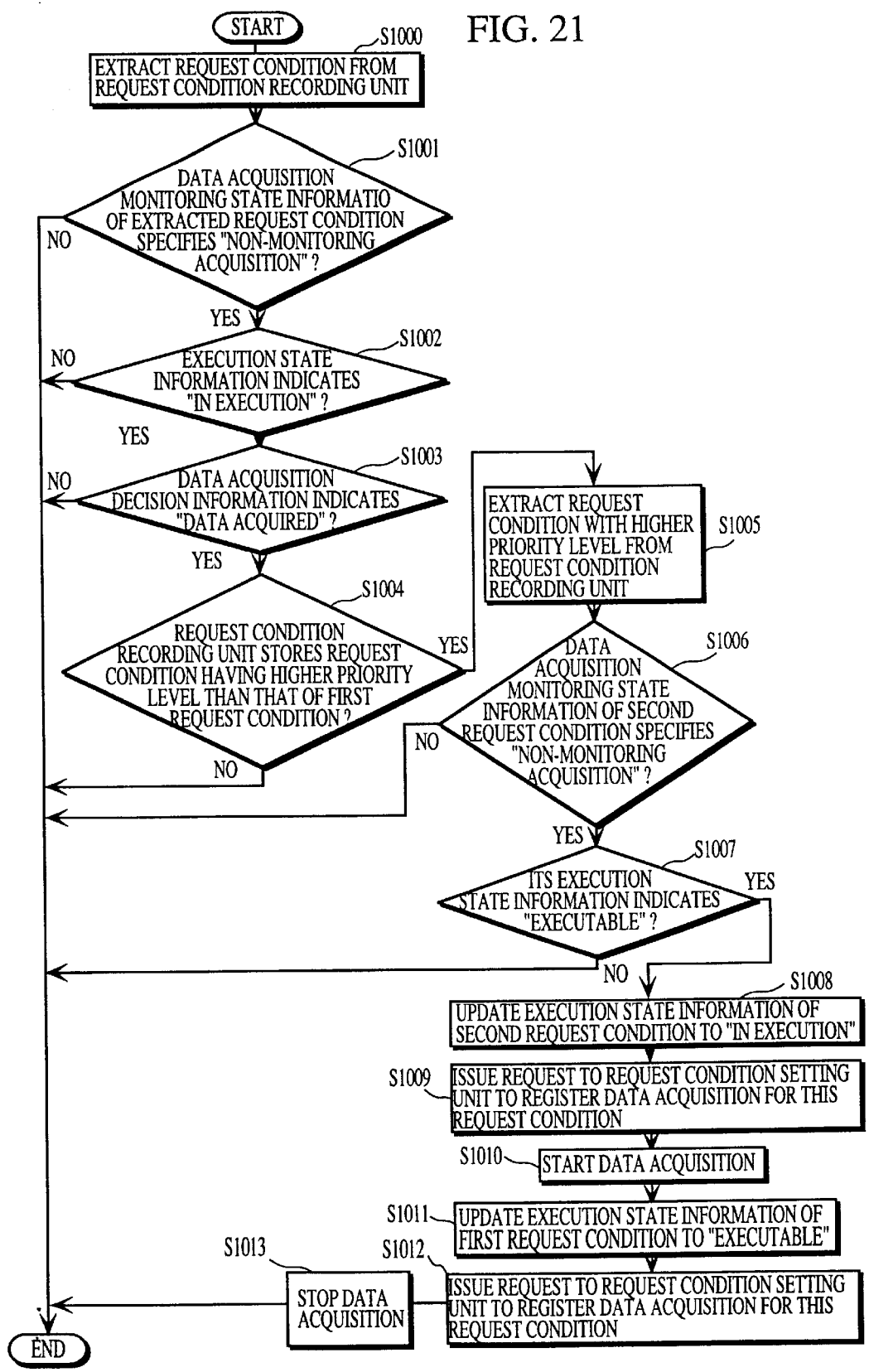
FIG. 21 is a flowchart showing the procedure for a data acquisition control exercised by the data acquisition apparatus for a request condition for which the data acquisition monitoring state information specifies "non-monitoring acquisition" (change from "executable" to "in execution")

FIG. 21 is a flowchart showing the procedure for a data acquisition control exercised by the data acquisition apparatus 120 for a request condition for which the data acquisition monitoring state information 1202 specifies "non-monitoring acquisition" (change from "executable" to "in execution").

The request condition setting scheduling unit 123 extracts a request condition from the request condition recording unit 114 (step S1000), and judges whether the data acquisition monitoring state information 1202 of the request condition specifies "non-monitoring acquisition" (step S1001). When it is judged negatively, the request condition setting scheduling unit 123 does not recognize the request condition as an object of the process of this flowchart, and ends the process.

When it is judged positively in step S1001, the request condition setting scheduling unit 123 judges whether the execution state information 1104 indicates "in execution" (step S1002). When it is judged negatively, the process of this flowchart ends.

When it is judged positively in step S1002, the request condition setting scheduling unit 123 judges whether the data acquisition decision information 1113 indicates "data acquired" (step S1003). When it is judged negatively, the process of this flowchart ends.

When it is judged positively in step S1003, the request condition setting scheduling unit 123 judges whether the request condition recording unit 114 stores a request condition having a higher priority level than the priority level 1103 of the first request condition (step S1004). When it is judged negatively, the process of this flowchart ends since there is no request condition having an execution state to be replaced with that of the first request condition.

When it is judged positively in step S1004, the request condition setting scheduling unit 123 extracts the request condition with a higher priority level from the request condition recording unit 114 (step S1005), and judges whether the data acquisition monitoring state information 1202 of the second request condition specifies "non-monitoring acquisition" (step S1006). When it is judged negatively, the process of this flowchart ends since the second request condition is not the one having an execution state to be replaced with that of the first request condition.

When it is judged positively in step S1006, the request condition setting scheduling unit 123 judges whether the execution state information 1104 indicates "executable" (step S1007). When it is judged negatively, the process of this flowchart ends.

When it is judged positively in step S1007, the request condition setting scheduling unit 123 updates the execution state information 1104 of the second request condition to "in execution" (step S1008), issues a request to the request condition setting unit 116 to register the data acquisition for this request condition (step S1009), and starts the data acquisition (step The request condition setting scheduling unit 123 updates the execution state information 1104 of the first request condition to "executable" (step S1011), issues a request to the request condition setting unit 116 to register the data acquisition for this request condition (step S1010), and stops the data acquisition (step S1013).

As described above, when finding a request condition that is in the "in execution" state though the data acquisition decision information 1113 "data acquired", the data acquisition apparatus 120 in the present embodiment replaces the execution state with that of a request condition having a higher priority level and being in the "executable" state. This solves the problem that a data acquisition with higher priority is prevented from being attempted because a data acquisition with a lower priority is repeatedly attempted, achieving an efficient data acquisition.

<Embodiment 3>

The following is a description of the third embodiment of the present invention.

Figure 22:
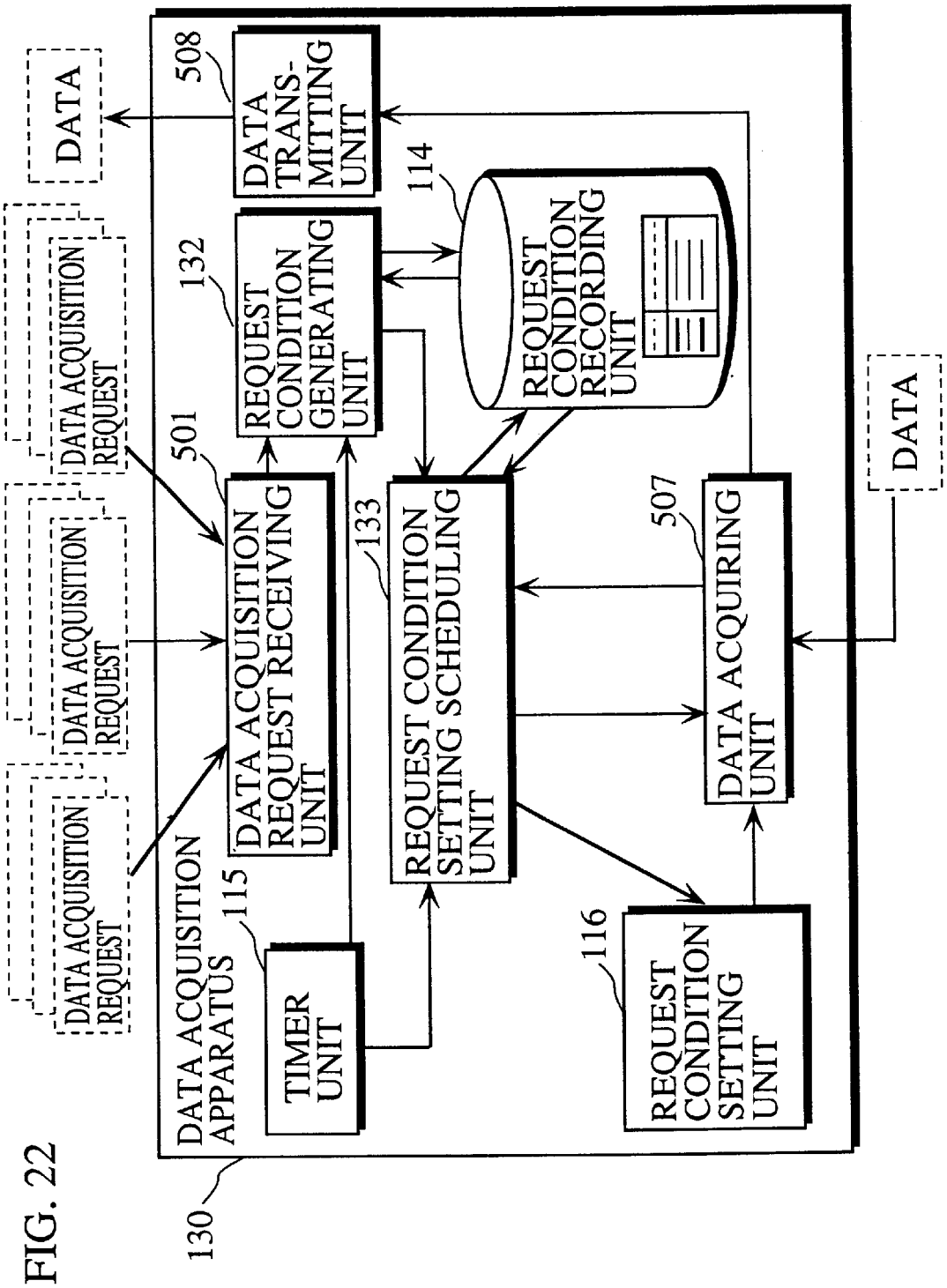
FIG. 22 is a functional block diagram showing the construction of a data acquisition apparatus as Embodiment 3 of the present invention.

FIG. 22 is a functional block diagram showing the construction of a data acquisition apparatus 130 as Embodiment 3 of the present invention. The data acquisition apparatus 130 has a feature of performing the "time-out" process on each data acquisition in accordance with the types of data acquisition requests issued by the applications. The data acquisition apparatus 130 includes the data acquisition request receiving unit 501, a request condition generating unit 132, a request condition setting scheduling unit 133, the request condition recording unit 114, the timer unit 115, the request condition setting unit 116, the data acquiring unit 507, and the data transmitting unit 508. Of these, the same units as those included in the data acquisition apparatus 110 in Embodiment 1 are assigned with the same numbers. The following description centers on the differences from Embodiment 1.

The request condition generating unit 132 generates a request condition, determines a time-out time based on the header information included in a data acquisition request received from the data acquisition request receiving unit 501, and attaches the time-out time to the generated request condition. It should be noted here that in the present embodiment, the time-out time is used to forcibly change a request condition from the "in execution" state to the "waiting" state, then to the "eliminated" state.

Figure 23:
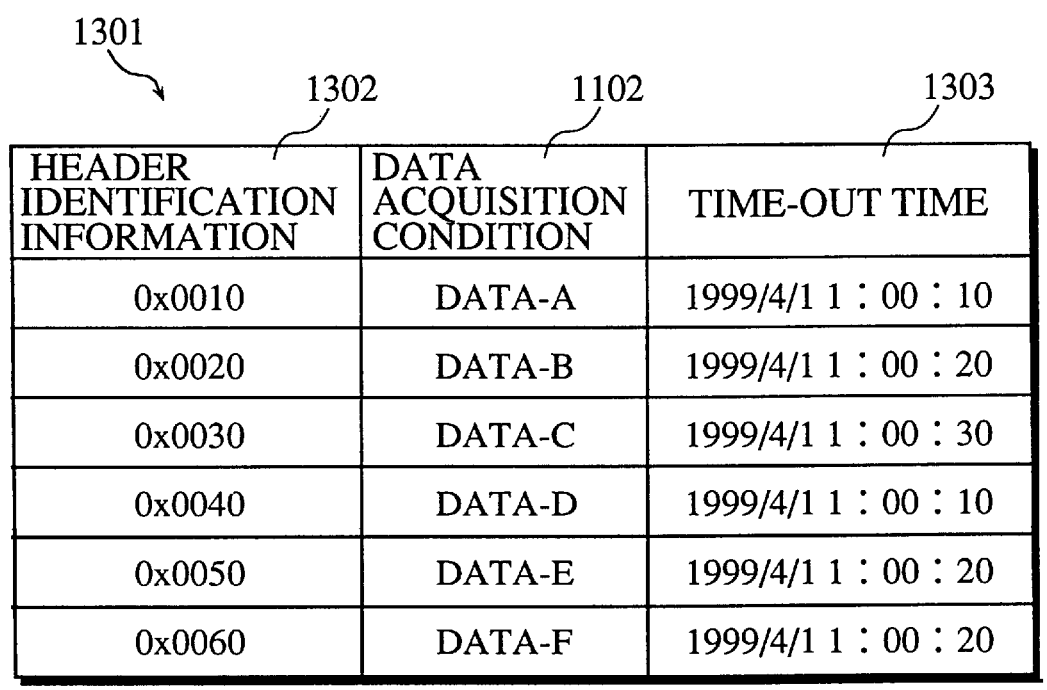
FIG. 23 shows a list of request conditions generated by the request condition generating unit.

FIG. 23 shows a list of request conditions generated by the request condition generating unit 132. This example shows 6 request conditions generated in the order of generation of data acquisition requests. Each request condition 1301 includes: header identification information 1302 which indicates a data acquisition type and is included in the header information; the data acquisition condition 1102; and a time-out time 1303.

The request condition generating unit 132 determines a time-out time by adding a relatively short time period (e.g., 10 seconds) to a time when it generates a request condition when the header identification information 1302 indicates a request to acquire a table with high importance such as NIT; and it determines a time-out time by adding a relatively long time period (e.g., 30 seconds) when the header identification information 1302 indicates a request to acquire a table with low importance such as SDT.

The request condition setting scheduling unit 133 communicates with other components and controls the scheduling of the data acquisition in accordance with the request conditions generated by the request condition generating unit 132. For this purpose, the request condition setting scheduling unit 133 (a) monitors and manages the data acquisition states for each request condition using the request condition recording unit 114, and (b) in terms of a request condition to which a time-out time has been attached by the request condition generating unit 132, monitors whether the time-out time is reached after the data acquisition condition is started to be in the "in execution" state, and when the time-out time is reached, changes the request condition from "in execution" to "waiting" and further to "eliminated".

Now, the operation of the data acquisition apparatus 130 having the above-described construction will be described.

Figure 24:
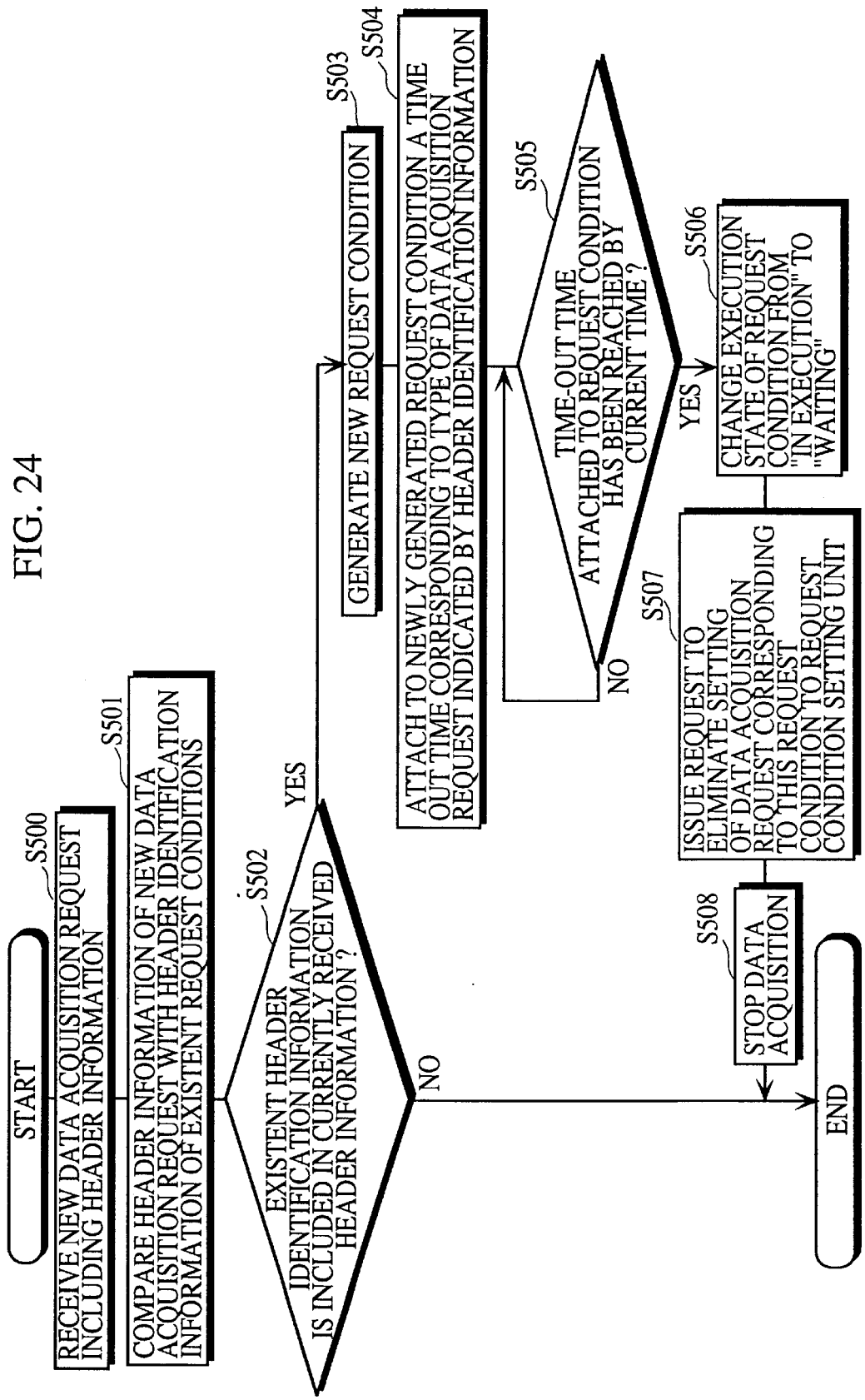
FIG. 24 is a flowchart showing the procedure of generating a time-out time and executing a time-out process by the data acquisition apparatus.

FIG. 24 is a flowchart showing the procedure of generating a time-out time and executing a time-out process in which the data acquisition state is changed from "in execution" to "waiting".

The data acquisition request receiving unit 501 receives a new data acquisition request including the header information, and sends the data acquisition request to the request condition generating unit 132 (step S500).

The request condition generating unit 132 compares the header information of the data acquisition request received from the data acquisition request receiving unit 501 with the header identification information 1302 of all the request conditions stored in the request condition recording unit 114 (step S501), and judges whether the existent pieces of header identification information 1302 is included in the currently received header information (step S502).

When it is judged negatively in step S502, the request condition generating unit 132 processes the received data acquisition request normally, that is, generates a new request condition without attaching a time-out time to it, stores the generated request condition in the request condition recording unit 114, and sends the request condition to the request condition setting scheduling unit 133. The request condition setting scheduling unit 133 puts the received request condition into the queue of the "executable" state, and starts the data acquisition control.

When it is judged positively in step S502, the request condition generating unit 132 recognizes that the same data acquisition request has been issued repeatedly, generates a new request condition, stores the generated request condition in the request condition recording unit 114 (step S503), and attaches to the newly generated request condition a time-out time corresponding to a type of the data acquisition request indicated by the header identification information 1302 (step S504).

The request condition setting scheduling unit 133 changes the execution state of this request condition to "in execution", refers to the request condition recording unit 114 and the timer unit 115 to compare the time-out time attached to the request condition with the current time, and judges whether the time-out time has been reached (step S505).

When it is judged negatively in step S505, the request condition setting scheduling unit 133 repeats the process in step S505. When it is judged positively in step S505, the request condition setting scheduling unit 133 forcibly changes the execution state of the request condition from "in execution" to "waiting" (step S506), then to "eliminated"

(step S507). More particularly, the request condition setting scheduling unit 133 issues a request to eliminate the setting of the data acquisition request corresponding to this request condition to the request condition setting unit 116 (step S507), and eliminates the request condition from the request condition recording unit 114 to stop the data acquisition (step S508).

As described above, the data acquisition apparatus 130 of the present embodiment judges, based on the header information included in a data acquisition request issued by an application, whether the same data acquisition request is issued repeatedly, and when judging it positively, attempts the data acquisition for a predetermined time period. This provides an efficient data acquisition by solving the problem that hardware resources are kept occupied even if the same data acquisition request is issued repeatedly due to a low frequency of transmission of the requested data.

<Embodiment 4>

The following is a description of the fourth embodiment of the present invention.

Figure 25:
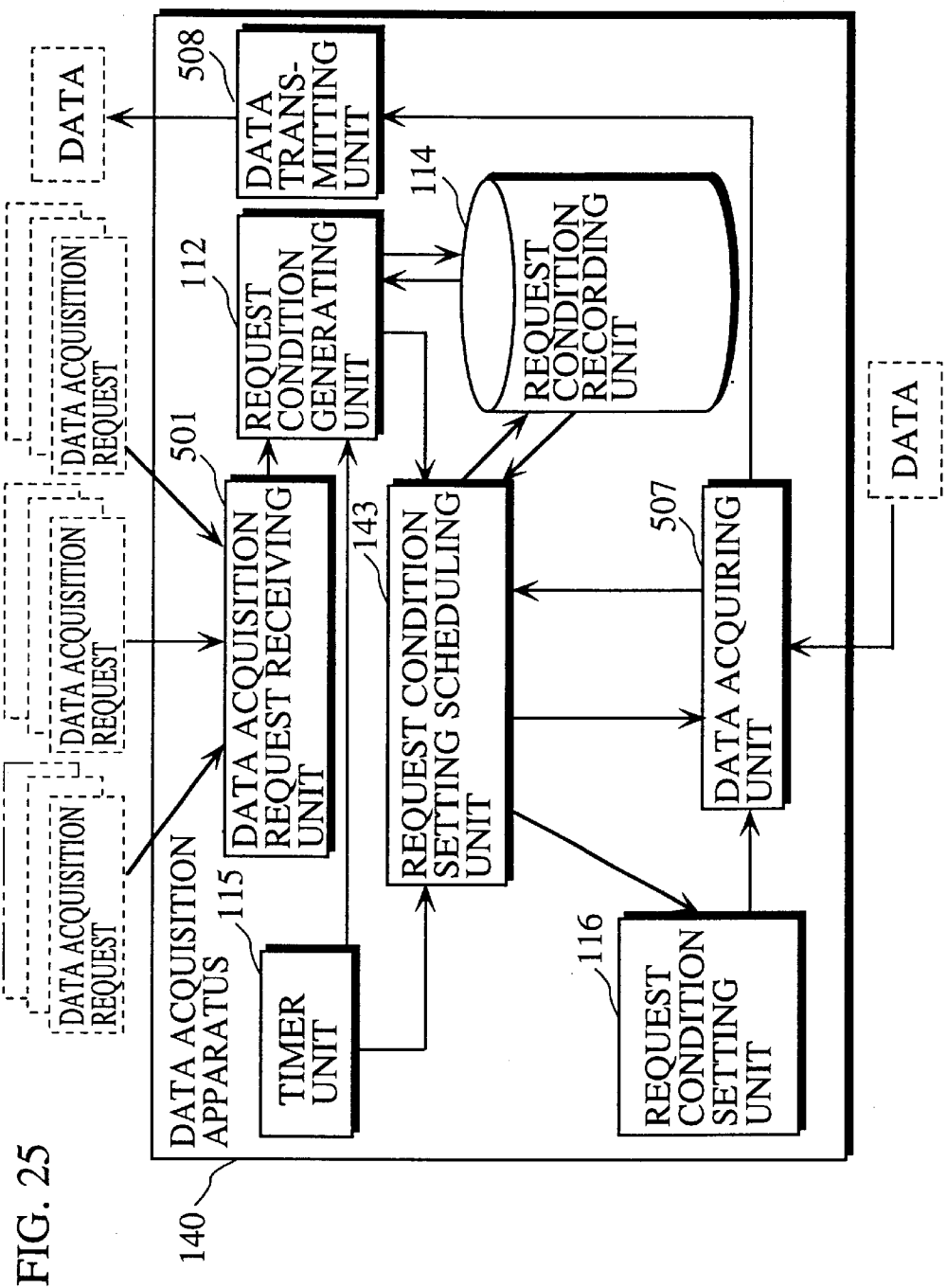
FIG. 25 is a functional block diagram showing the construction of a data acquisition apparatus as Embodiment 4 of the present invention.

FIG. 25 is a functional block diagram showing the construction of a data acquisition apparatus 140 as Embodiment 4 of the present invention. The data acquisition apparatus 140 has a feature of receiving version information, referring to the received version information, and preferentially acquiring a piece of data corresponding to a request condition that has the largest version update number among two or more "executable" request conditions with the same priority level and data acquisition state that the data acquisition apparatus 140 has to process. The data acquisition apparatus 140 includes the data acquisition request receiving unit 501, the request condition generating unit 112, a request condition setting scheduling unit 143, the request condition recording unit 114, the timer unit 115, the request condition setting unit 116, the data acquiring unit 507, and the data transmitting unit 508. Of these, the same units as those included in the data acquisition apparatus 110 in Embodiment 1 are assigned with the same numbers. The following description centers on the differences from Embodiment 1.

It is presumed in the present embodiment that the header information of the data acquired by the data acquiring unit 507 includes the version information. Here, the "version information" is used to identify the version of a unit of data (e.g., a table). Even if two units of data have the same identification information, the contents are different from each other if they have different versions (i.e., the contents change each time the version is updated).

The data acquiring unit 507 receives request conditions set by the request condition setting unit 116, and request identification information used to identify the request conditions. The data acquiring unit 507 manages the data acquisition state or the like using the request identification information. Also, the data acquiring unit 507 externally outputs the data acquisition state or the like.

The request condition setting scheduling unit 143 communicates with other components and controls the scheduling of the data acquisition in accordance with the request conditions generated by the request condition generating unit 112. For this purpose, the request condition setting scheduling unit 143 (a) monitors and manages the data acquisition states for each request condition using the request condition recording unit 114, (b) attaches the version information to request conditions stored in the request condition recording unit 114, (c) updates the version information, and (d) preferentially changes the execution state of a request condition that has the largest version update number among two or more "executable" request conditions with the same priority level and data acquisition state, from "executable" to "in execution".

To achieve this, the request condition setting scheduling unit 143 controls the data acquisition for each request condition by attaching management information such as the version information, version update decision information, and version update number information to each request condition stored in the request condition recording unit 114, as well as the request identification information, data acquisition condition, data acquisition monitoring state information, execution state information, data acquisition decision information, and priority level, and recording and updating these pieces of information.

It should be noted here that the "version update decision information" indicates whether the requested data has been updated at least once ("updated" or "not updated") after the corresponding request condition was generated. Also, the "version update number information" indicates the number of updates.

FIG. 26 shows a list of request conditions to which various kinds of management information have been attached by the request condition setting scheduling unit 143. As shown in FIG. 26, each request condition 1401 includes request identification information 1110, data acquisition condition 1102, data acquisition monitoring state information 1202, execution state information 1104, data acquisition decision information 1113, priority level 1103, version information 1402, version update decision information 1403, and version update number information 1404.

This example shows that two request conditions identified as "0x0006" and "0x0007" by the request identification information 1110 are both "non-monitoring acquisition" according to the data acquisition monitoring state information 1202, "executable" according to the execution state information 1104, and have the same data acquisition decision information 1113 and priority level 1103, but are different from each other in the version update number information 1404.

Now, the operation of the data acquisition apparatus 140 having the above-described construction will be described.

Figure 27:
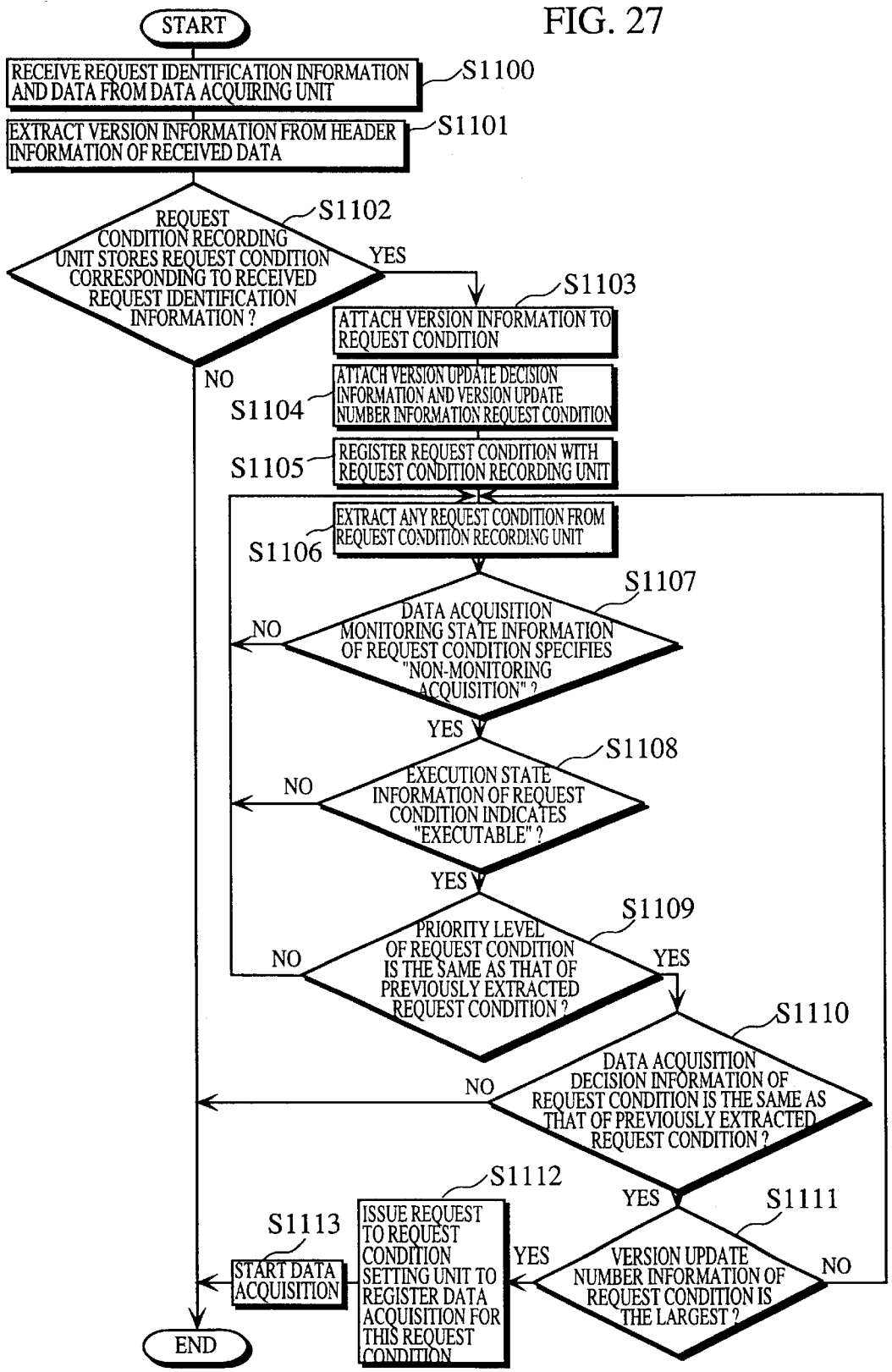
FIG. 27 is a flowchart showing the procedure of a data acquisition control in which the version of the received data is processed.

FIG. 27 is a flowchart showing the procedure of a data acquisition control in which the version of the received data is processed.

The request condition setting scheduling unit 143 receives from the data acquiring unit 507 a piece of request identification information and a piece of data it has acquired (step S1100), extracts version information from header information of the received data (step S1101), and judges whether the request condition recording unit 114 stores a request condition corresponding to the received piece of request identification information (step S1102). When it is judged negatively, the process of this flowchart ends.

When it is judged positively in step S1102, the request condition setting scheduling unit 143 attaches the version information to the request condition as the version information 1402 (step S1103), generates new pieces of version update decision information 1403 and version update number information 1404 or updates the information 1403 and 1404, and attaches the information 1403 and 1404 to the request condition (step S1104), and registers the request condition with the request condition recording unit 114 (step S1105).

The request condition setting scheduling unit 143 extracts any request condition from the request condition recording unit 114 (step S1106), and judges whether the data acquisition monitoring state information 1202 of the request condition specifies "non-monitoring acquisition" (step S1107). When it is judged negatively, the process in step 1106 is repeated.

When it is judged positively in step S1107, the request condition setting scheduling unit 143 judges whether the execution state information 1104 of the request condition indicates "executable" (step S1108). When it is judged negatively, the processes in steps S1106–S1107 are repeated.

When it is judged positively in step S1108, the request condition setting scheduling unit 143 judges whether the priority level 1103 of the request condition is the same as that of a previously extracted request condition (step S1109). When it is judged negatively, the processes in steps S1106–S1108 are repeated.

When it is judged positively in step S1109, the request condition setting scheduling unit 143 judges whether the data acquisition decision information 1113 of the request condition is the same as that of a previously extracted request condition (step S1110). When it is judged negatively, the process for this flowchart ends.

When it is judged positively in step S1110, the request condition setting scheduling unit 143 judges whether the version update number information 1404 of the request condition is the largest (step S1111). When it is judged negatively, the processes in steps S1106–S1110 are repeated.

The request condition setting scheduling unit 143 issues a request to the request condition setting unit 116 to register the data acquisition for this request condition (step S1112), and starts the data acquisition (step S1113). For example, two request conditions identified as "0x0006" and "0x0007" by the request identification information 1110, as shown in FIG. 26, are compared with each other, a data acquisition for the request condition "0x0006" that has a larger value in terms of the version update number information 1404 is started.

As described above, the data acquisition apparatus 140 of the present embodiment receives version information, refers to the received version information, and records the number of version updates for each piece of data requested by the applications. The data acquisition apparatus 140 preferentially acquires a piece of data corresponding to a request condition that has the largest version update number among two or more "executable" request conditions with the same priority level and data acquisition state. That is to say, a piece of data changing most frequently is preferentially acquired. This provides an efficient data acquisition by solving the problem that hardware resources are occupied wastefully when the same piece of data is repeatedly acquired.

<Embodiment 5>

Figure 30:
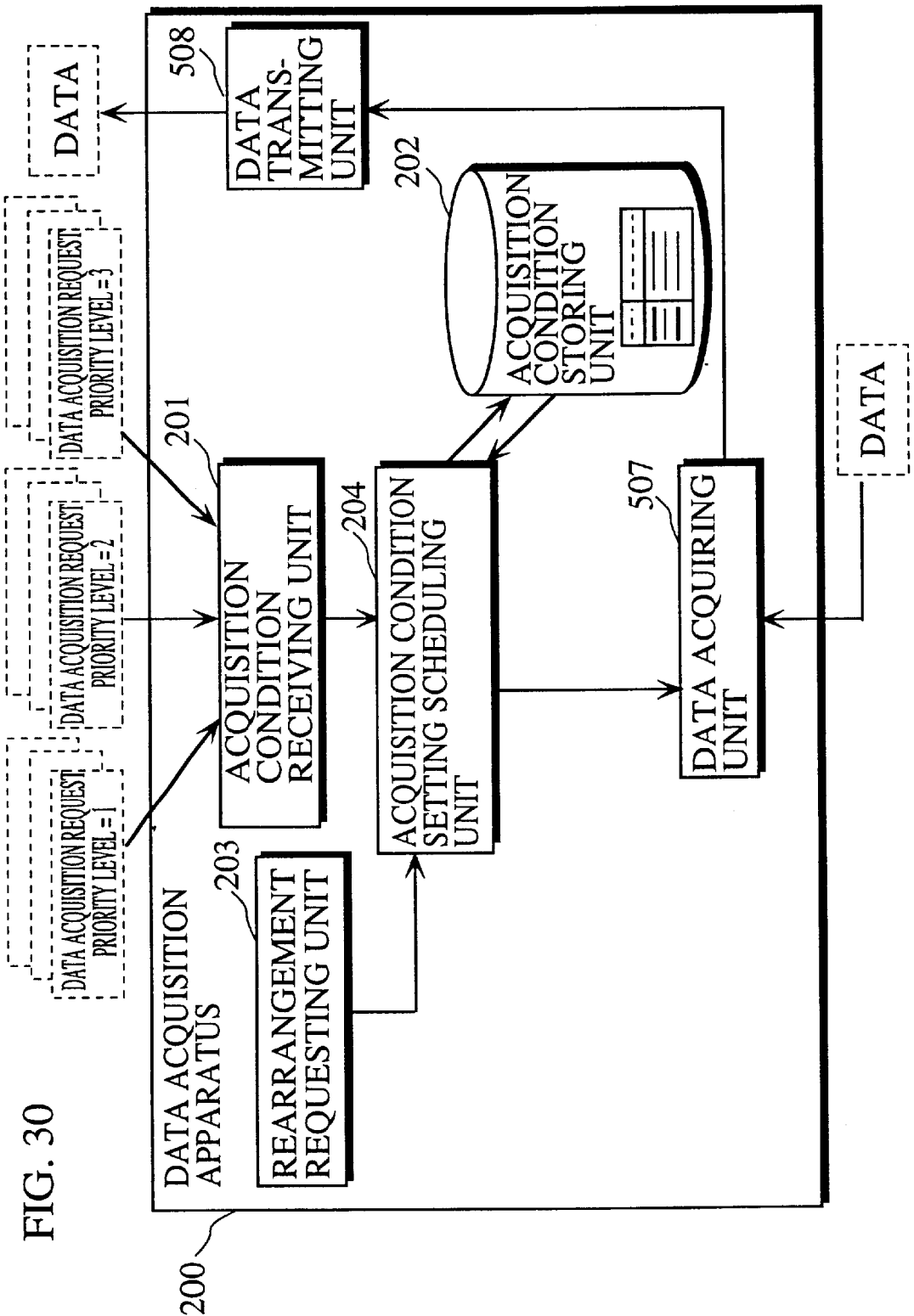
FIG. 30 is a functional block diagram showing the construction of a data acquisition apparatus 200.

FIG. 30 is a functional block diagram showing the construction of a data acquisition apparatus 200 as Embodiment 5 of the present invention. The data acquisition apparatus 200 has a feature of receiving data acquisition requests (hereinafter referred to as acquisition conditions) that are issued from a plurality of applications and specify data to be acquired, managing the received acquisition conditions by storing them in a table in order, rearranging the acquisition conditions in the table in accordance with a rearranging request issued from an application, and acquiring data efficiently in accordance with the rearranged acquisition conditions. More specifically, the data acquisition apparatus 200 corresponds to hardware and software portions of a digital broadcast receiver which perform basic processes concerning data reception, such as broadcast data receiving, demultiplexing, decoding, and filtering. The data acquisition apparatus 200 includes an acquisition condition receiving unit 201, a data acquiring unit 507, a data transmitting unit 508, an acquisition condition storing unit 202, a rearrangement requesting unit 203, and an acquisition condition setting scheduling unit 204. Of these, the same units as those included in the data acquisition apparatus 110 in Embodiment 1 are assigned with the same numbers. The following description centers on the differences from Embodiment 1.

The acquisition condition receiving unit 201 receives acquisition conditions from applications, sends the received acquisition conditions to the acquisition condition setting scheduling unit 204.

The data acquiring unit 507, once the acquisition condition setting scheduling unit 204 sets an acquisition condition, continues to monitor whether a piece of data satisfying the acquisition condition has been received unless the acquisition condition is eliminated by the acquisition condition setting scheduling unit 204, and after the piece of data is received, extracts the piece of data.

The data transmitting unit 508 receives from the data acquiring unit 507 the data it acquires, identifies an application that has issued a request to acquire the data by referring to the acquisition conditions stored in the acquisition condition storing unit 202, and sends the data to the identified application.

The acquisition condition storing unit 202 stores sets of an acquisition condition, setting information, and an order value. It should be noted here that each piece of "setting information" shows "valid" or "invalid" to indicate whether the acquisition condition in the same set is set in the data acquiring unit 507. The "valid" indicates that the acquisition condition is set in the data acquiring unit 507; and the "invalid" indicates that the acquisition condition is not set in the data acquiring unit 507. Also, each "order value" corresponds to an order in which the acquisition conditions are received by the acquisition condition receiving unit 201. When a newly received acquisition condition is newly stored in a table by the acquisition condition setting scheduling unit 204, initial value "0" indicating that the acquisition condition is most recently received is attached to the acquisition condition. The initial value is incremented by "1" each time another acquisition condition is stored in the same table or each time the rearrangement requesting unit 203 issues a request to rearrange the order of the acquisition conditions in the table or each time it is found that the acquisition condition storing unit 202 stores a set including a piece of setting information showing "invalid" when an acquisition condition for which a data acquisition has succeeded (this will be described in Embodiment 6) is received. This value is reset to the initial value "0" when the setting of the acquisition condition is eliminated from the data acquiring unit 507.

The rearrangement requesting unit 203 provides the timing for rearranging the acquisition conditions set in the data acquiring unit 507, and issues a request to rearrange the acquisition conditions to the acquisition condition setting scheduling unit 204 in accordance with a request from an application. It should be noted here that the rearrangement requesting unit 203 may issue the acquisition condition rearrangement request in accordance with a notification that is sent at regular intervals by a timer or the like.

The acquisition condition setting scheduling unit 204, achieved by a CPU or a ROM storing a control program, schedules the setting of each acquisition condition in the data acquiring unit 507 by monitoring the setting information and order value in each set stored in the table in the acquisition condition storing unit 202, and controls the rearrangement of the acquisition conditions set in the data acquiring unit 507 in accordance with the acquisition condition rearrangement request sent from the rearrangement requesting unit 203.

When receiving an acquisition condition from the acquisition condition receiving unit 201, the acquisition condition setting scheduling unit 204 adds "1" to each order value stored in the table in the acquisition condition storing unit 202. The acquisition condition setting scheduling unit 204 then judges whether the received acquisition condition can be set in the data acquiring unit 507 by checking whether the total number of sets that include the setting information showing "valid" (indicating that the acquisition condition in the same set is set in the data acquiring unit 507) is less than an upper limit to the number of acquisition conditions that can be set in the data acquiring unit 507 (it is presumed in this embodiment that the upper limit is "3" for the sake of convenience). When the total number of sets that include the setting information showing "valid" is less than 3, the acquisition condition setting scheduling unit 204 stores the received acquisition condition in the table in the acquisition condition storing unit 202, allows the setting information included together with the acquisition condition in a set to show "valid", sets the order value in the same set to the initial value "0", and registers the acquisition condition with the data acquiring unit 507. When the total number of sets that include the setting information showing "valid" is 3, the acquisition condition setting scheduling unit 204 stores the received acquisition condition in the table in the acquisition condition storing unit 202, allows the setting information included together with the acquisition condition in a set to show "invalid", sets the order value in the same set to the initial value "0".

The acquisition condition setting scheduling unit 204 also adds "1" to each order value stored in the table in the acquisition condition storing unit 202 in accordance with the acquisition condition rearrangement request, then rearranges the acquisition conditions registered with the data acquiring unit 507.

Now, how the acquisition condition setting scheduling unit 204 schedules the setting of an acquisition condition received from an application in the data acquiring unit 507 will be described with reference to the flowcharts shown in FIGS. 31 and 32.

Figure 31:
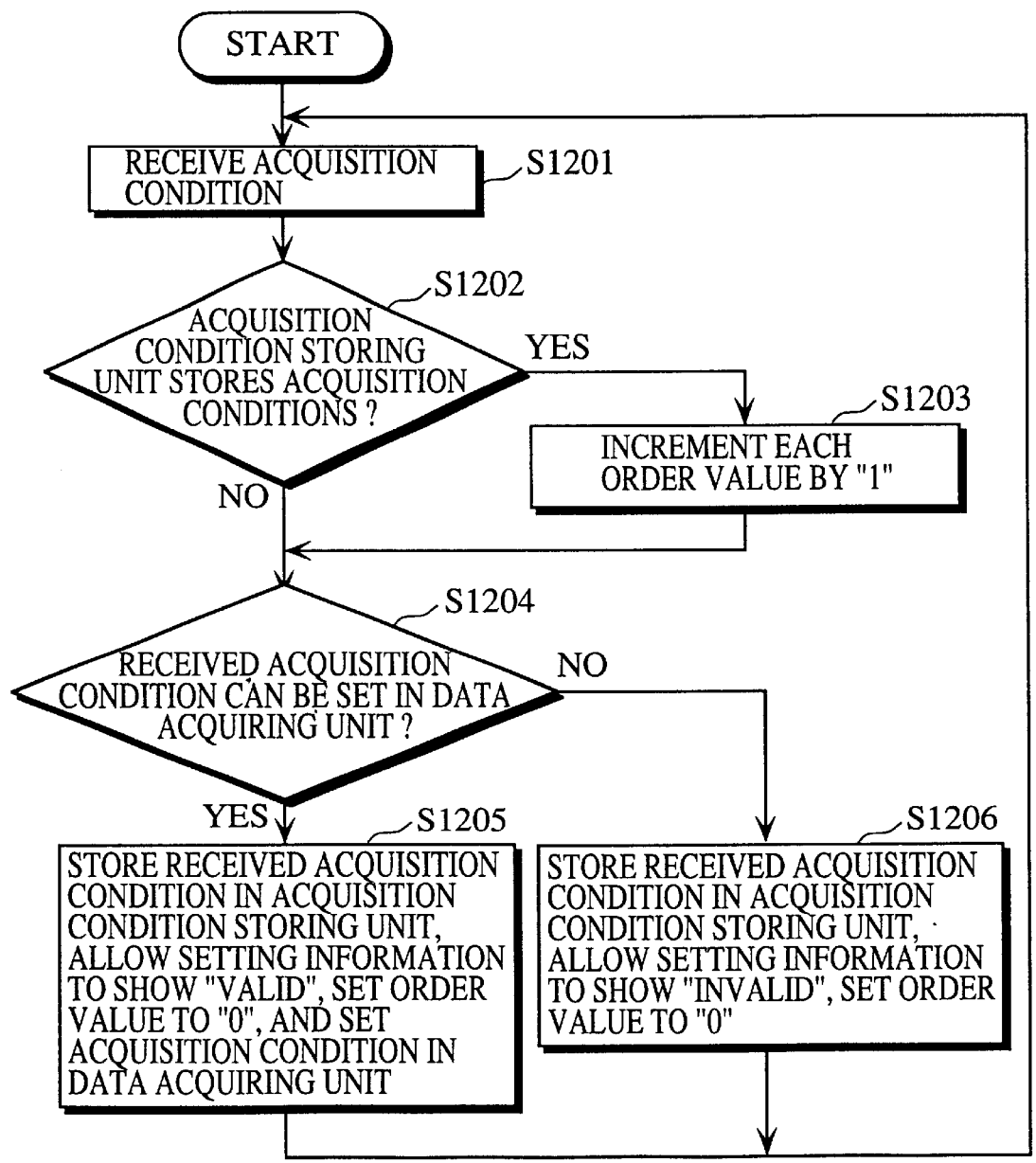
FIG. 31 is a flowchart showing the procedure of storing an acquisition condition received from an application into the table in the acquisition condition storing unit 202.

FIG. 31 is a flowchart showing the procedure of storing an acquisition condition received from an application into the table in the acquisition condition storing unit 202. The acquisition condition setting scheduling unit 204 receives an acquisition condition from the acquisition condition receiving unit 201 (step S1201), and judges whether the table in the acquisition condition storing unit 202 stores one or more acquisition conditions (step S1202). When it is judged positively, the acquisition condition setting scheduling unit 204 increments each order value by "1" (step S1203).

When it is judged negatively in step S1202, the acquisition condition setting scheduling unit 204 judges whether the received acquisition condition can be set in the data acquiring unit 507 by checking whether the total number of sets that include the setting information showing "valid" is less than "3" (step S1204). When it is judged positively, the acquisition condition setting scheduling unit 204 stores the received acquisition condition in the table in the acquisition condition storing unit 202, allows the setting information included together with the acquisition condition in a set to show "valid", sets the order value in the same set to the initial value "0", and sets the acquisition condition in the data acquiring unit 507 (step S1205). When it is judged negatively in step 1204, the acquisition condition setting scheduling unit 204 stores the received acquisition condition in the table in the acquisition condition storing unit 202, allows the setting information included together with the acquisition condition in a set to show "invalid", sets the order value in the same set to the initial value "0" (step S1206), then waits until it receives the next acquisition condition, and when receiving the next acquisition condition, repeats the above steps.

Figure 32:
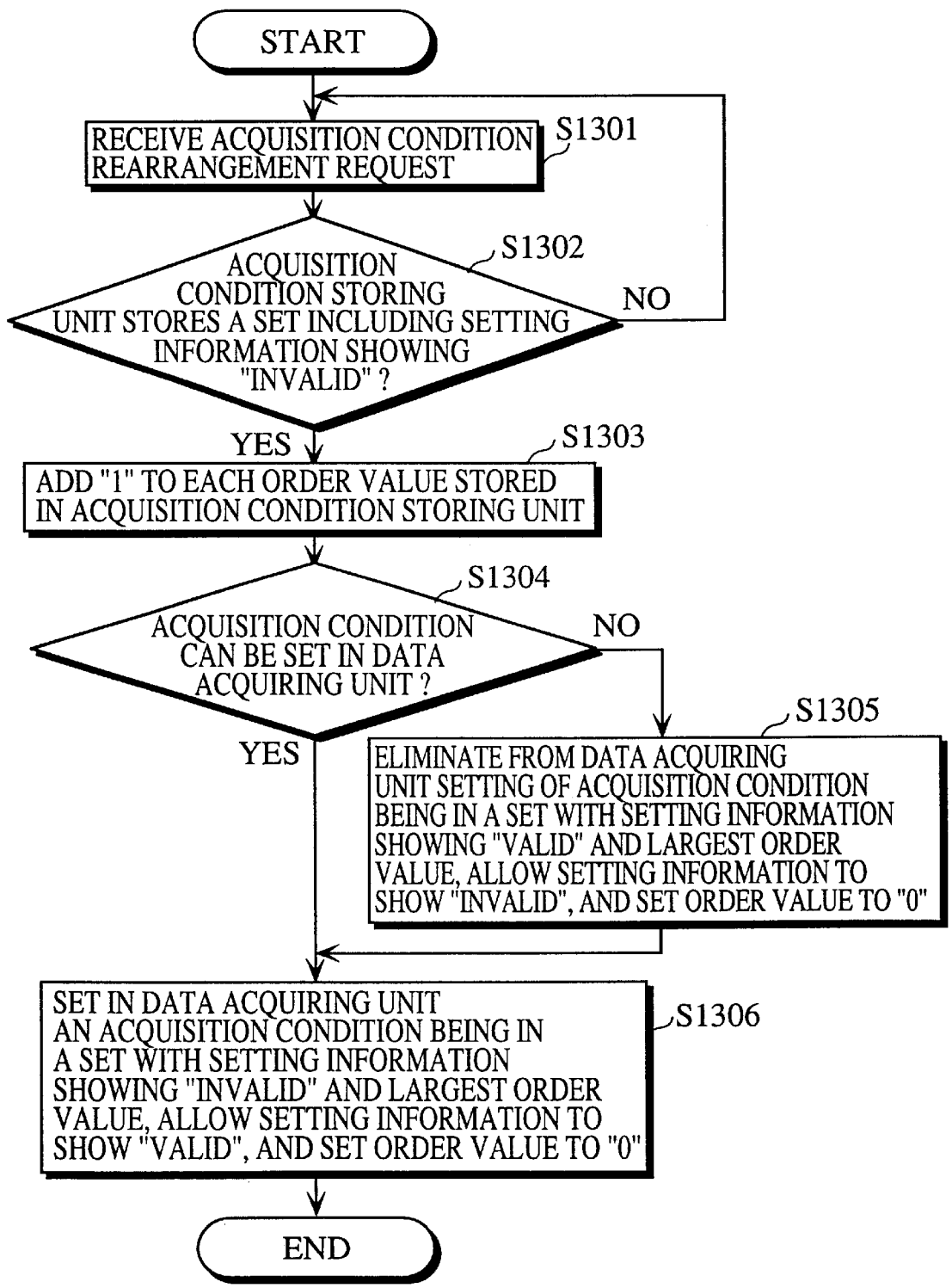
FIG. 32 is a flowchart showing the procedure in which the acquisition condition setting scheduling unit 204 sets in the data acquiring unit 507 an acquisition condition stored in the table in the acquisition condition storing unit 202.

FIG. 32 is a flowchart showing the procedure in which the acquisition condition setting scheduling unit 204 sets in the data acquiring unit 507 an acquisition condition stored in the table in the acquisition condition storing unit 202.

The acquisition condition setting scheduling unit 204 receives an acquisition condition rearrangement request sent from the rearrangement requesting unit 203 (step S1301), then judges whether the table in the acquisition condition storing unit 202 stores a set including setting information showing "invalid" (step S1302). When it is judged negatively, the acquisition condition setting scheduling unit 204 waits for another acquisition condition rearrangement request since it is not necessary to rearrange acquisition conditions, and repeats the above steps until it is found that the table in the acquisition condition storing unit 202 stores a set including setting information showing "invalid".

When it is judged positively in step S1302, the acquisition condition setting scheduling unit 204 adds "1" to each order value stored in the table in the acquisition condition storing unit 202 (step S1303), and judges whether an acquisition condition can be newly set in the data acquiring unit 507 by checking whether the total number of sets that include the setting information showing "valid" is less than "3" (step S1304).

When it is judged negatively in step S1304, the acquisition condition setting scheduling unit 204 selects, from the table in the acquisition condition storing unit 202, an acquisition condition which is included in a set together with setting information showing "valid" and the largest order value, eliminates the setting of the selected acquisition condition from the data acquiring unit 507, allows the setting information stored in the set together with selected acquisition condition to show "invalid", and sets the order value in the same set to the initial value "0" (step S1305), then selects, from the table, an acquisition condition which is included in a set together with setting information showing "invalid" and the largest order value, then allows the setting information in the same set to show "valid" and sets the order value in the same set to the initial value "0" (step S1306), then sets the selected acquisition condition in the data acquiring unit 507.

When it is judged positively in step S1304, the acquisition condition setting scheduling unit 204 selects, from the table in the acquisition condition storing unit 202, an acquisition condition which is included in a set together with setting information showing "invalid" and the largest order value, allows this setting information to show "valid" and sets this order value to the initial value "0" (step S1306), and sets the selected acquisition condition in the data acquiring unit 507. Among these steps, steps S1301 to S1306 will be explained in detail using an example.

FIG. 33 shows an example of the table stored in the acquisition condition storing unit 202 that stores a plurality of sets of an acquisition condition, setting information, and an order value. In this example, the table stores six acquisition conditions 1 to 6. Of these, acquisition conditions 1 to 3 are set in the data acquiring unit 507.

FIG. 34 shows the contents of the table shown in FIG. 33 after it is updated due to the execution of the above steps by the acquisition condition setting scheduling unit 204. The table shown in FIG. 33 stores acquisition conditions 4 to 6 that are each included in a set together with setting information showing "invalid" (positively judged in step S1302). Therefore, the acquisition condition setting scheduling unit 204 adds "1" to each order value stored in the table. Also, since the total number of sets that include the setting information showing "valid" is "3", the acquisition condition setting scheduling unit 204 judges that an acquisition condition cannot be newly set in the data acquiring unit 507 (judged as "No" in step S1304), selects, from the table shown in FIG. 33, acquisition condition 1 which is included in a set together with setting information showing "valid" and the largest order value, eliminates the setting of acquisition condition 1 from the data acquiring unit 507, allows the setting information stored in the set together with acquisition condition 1 to show "invalid", and sets the order value in the same set to the initial value "0" (step S1305), then selects, from the table, acquisition condition 4 which is included in a set together with setting information showing "invalid" and the largest order value, then allows the setting information in the same set to show "valid" and sets the order value in the same set to the initial value "0" (step S1306), then sets the selected acquisition condition 4 in the data acquiring unit 507. As a result of this process, the table shown in FIG. 33 is updated as shown in FIG. 34.

Now, a process performed by the data acquisition apparatus 20 after an acquisition condition is set in the data acquiring unit 507 by the acquisition condition setting scheduling unit 204 will be described.

Figure 35:
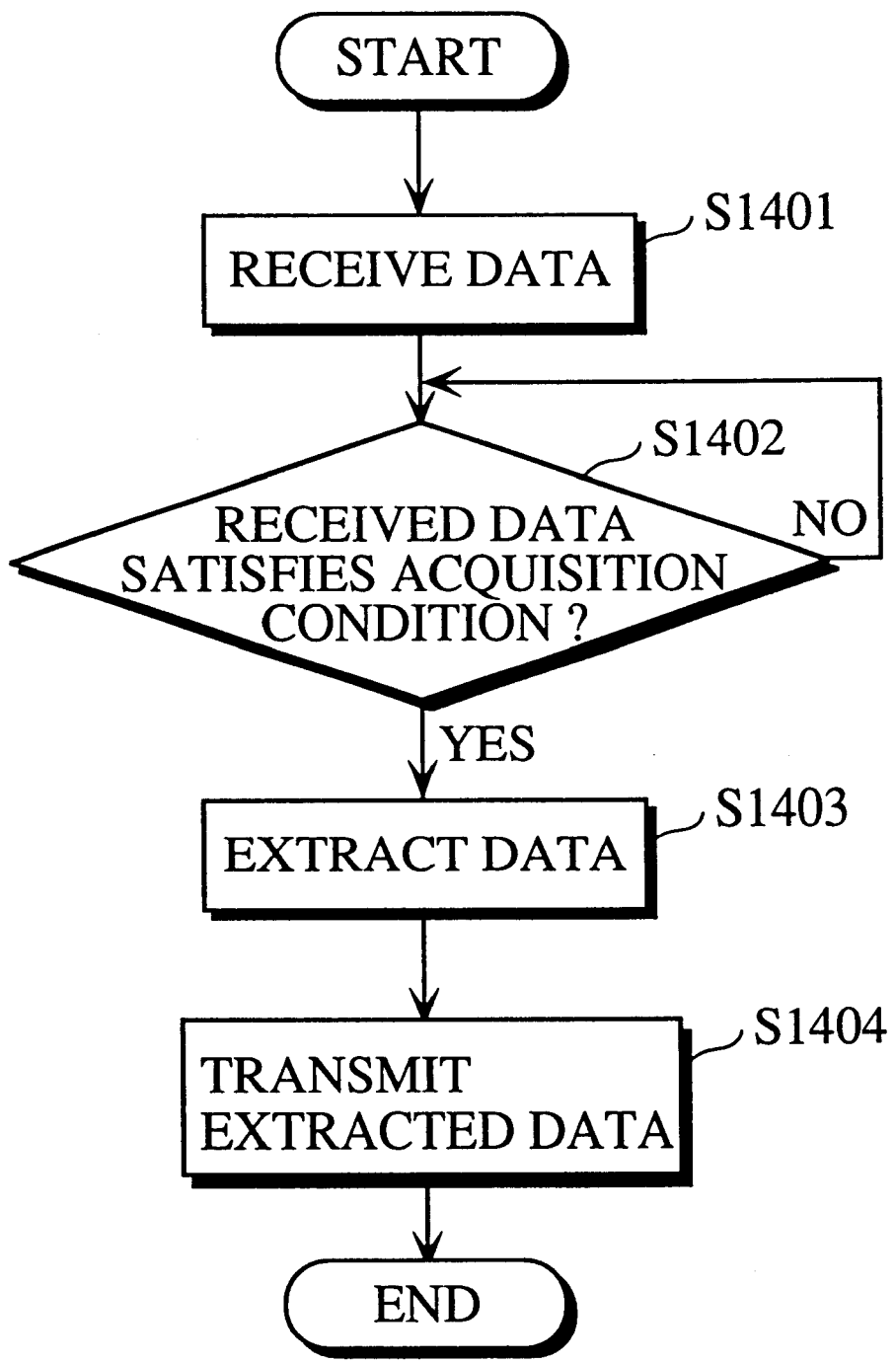
FIG. 35 is a flowchart showing the process performed by the data acquisition apparatus 20 after an acquisition condition is set in the data acquiring unit 507.

FIG. 35 is a flowchart showing the process performed by the data acquisition apparatus 20 after an acquisition condition is set in the data acquiring unit 507 by the acquisition condition setting scheduling unit 204. The data acquiring unit 507 receives data (step S1401), then judges whether the received data satisfies an acquisition condition that has been set (step S1402). When it is judged positively, the data acquiring unit 507 extracts data (step S1403). The extracted data is sent to the data transmitting unit 508. The data transmitting unit 508 transmits the data to an application that has requested the data (step S1404). When it is judged negatively in step S1402, the data acquiring unit 507 repeats the above judgement until data that satisfies the acquisition condition is received.

Figure 36:
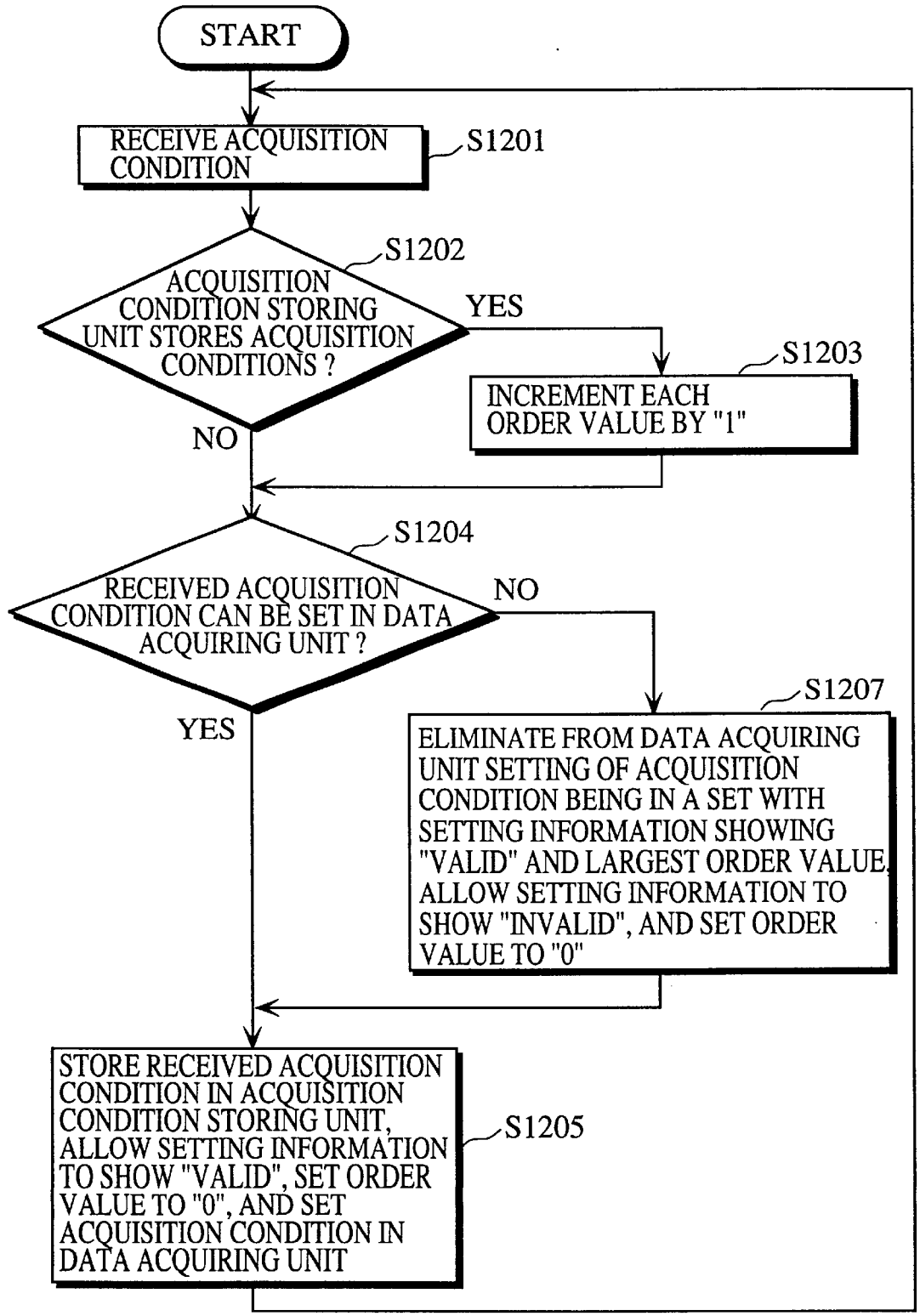
FIG. 36 is a flowchart showing the procedure of storing an acquisition condition received from an application into the table in the acquisition condition storing unit 202 which is the same as FIG. 31 except that step S1206 has been replaced with step S1207 in which the acquisition condition setting scheduling unit 204 selects, from the table in the acquisition condition storing unit 202, an acquisition condition which is included in a set together with setting information showing "valid" and the largest order value, eliminates the setting of the selected acquisition condition from the data acquiring unit 507, allows the setting information stored in the set together with the selected acquisition condition to show "invalid", and sets the order value in the same set to the initial value "0"

In the present embodiment, in the flowchart shown in FIG. 31, when it is judged that the received acquisition condition cannot be set in the data acquiring unit 507, the acquisition condition setting scheduling unit 204 does not set the acquisition condition in the data acquiring unit 507, but stores the received acquisition condition in the table in the acquisition condition storing unit 202, allows the setting information included together with the acquisition condition in a set to show "invalid", and sets the order value in the same set to the initial value "0", in step S1206. However, the step S1206 may be replaced with step S1207 in which the acquisition condition setting scheduling unit 204 selects, from the table in the acquisition condition storing unit 202, an acquisition condition which is included in a set together with setting information showing "valid" and the largest order value, eliminates the setting of the selected acquisition condition from the data acquiring unit 507, allows the setting information stored in the set together with the selected acquisition condition to show "invalid", and sets the order value in the same set to the initial value "0". The step S1207 is followed by the step S1205 in which the acquisition condition setting scheduling unit 204 stores the received acquisition condition in the table in the acquisition condition storing unit 202, allows the setting information included together with the acquisition condition in a set to show "valid", sets the order value in the same set to the initial value "0", and sets the acquisition condition in the data acquiring unit 507. This flowchart is shown in FIG. 36. Note that the steps S1201–S1205 in this flowchart are the same as those shown in FIG. 31, and the explanation of these steps are omitted here.

With such a construction, a data acquisition is preferentially executed as soon as an acquisition condition is received from an application. This increases the speed of responding to requests issued from the applications.

As described above, according to the data acquisition apparatus in the present embodiment, it is possible to receive more acquisition conditions than the number of acquisition conditions for which data can actually be extracted or monitored simultaneously. It is also possible to automatically adjust the schedule of the data acquisition and monitoring.

<Embodiment 6>

Figure 37:
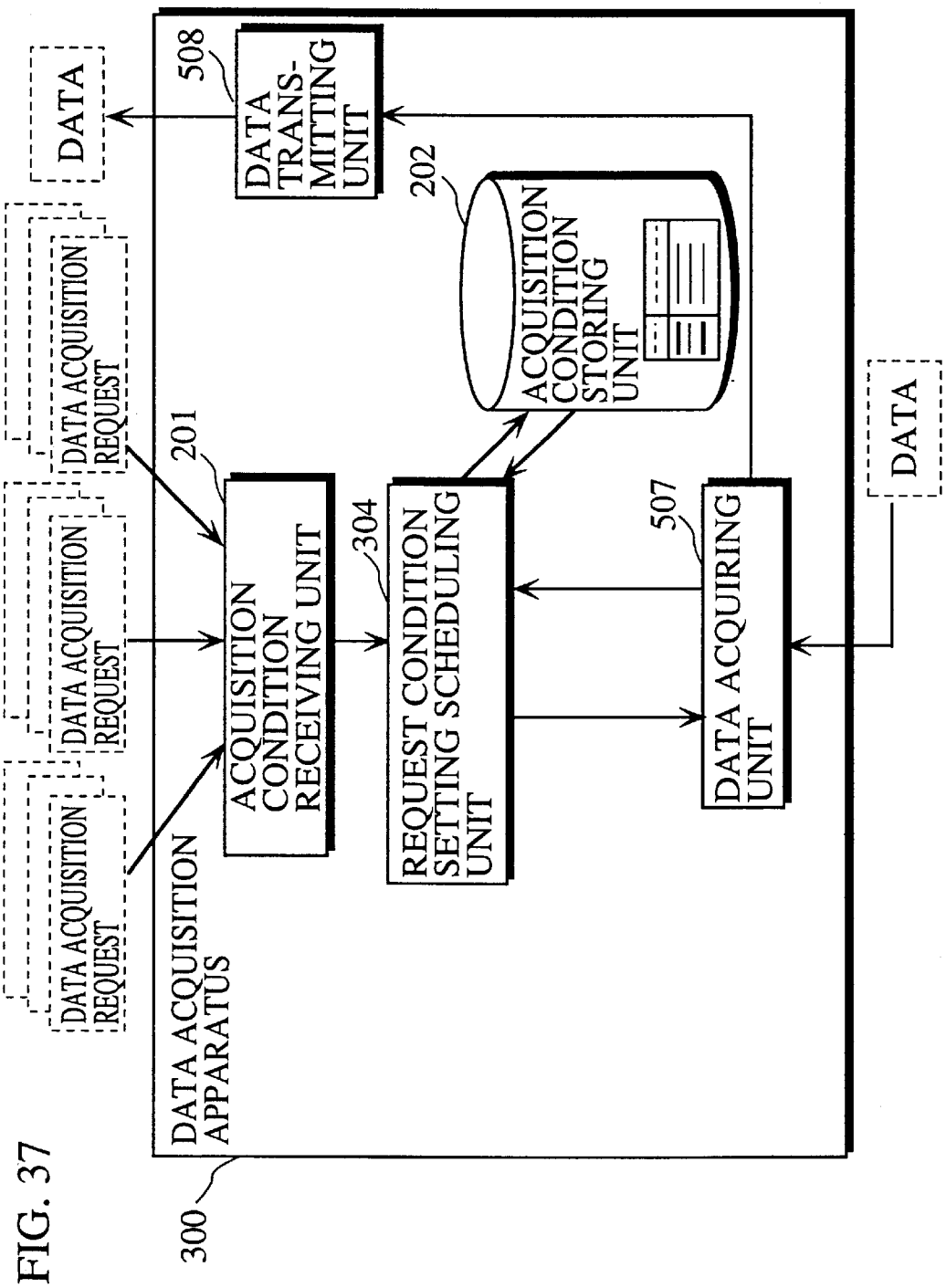
FIG. 37 is a functional block diagram showing the construction of a data acquisition apparatus 300.

FIG. 37 is a functional block diagram showing the construction of a data acquisition apparatus 300 as Embodiment 6 of the present invention. The data acquisition apparatus 300 has a feature of receiving acquisition conditions that are issued from a plurality of applications, managing the received acquisition conditions by storing them in a table in order, rearranging the acquisition conditions in the table in accordance with the timing with which data acquisition has succeeded, and acquiring data efficiently in accordance with the rearranged acquisition conditions. More specifically, the data acquisition apparatus 200 corresponds to hardware and software portions of a digital broadcast receiver which perform basic processes concerning data reception, such as broadcast data receiving, demultiplexing, decoding, and filtering. The data acquisition apparatus 300 includes the acquisition condition receiving unit 201, the data acquiring unit 507, the data transmitting unit 508, the acquisition condition storing unit 202, and the acquisition condition setting scheduling unit 204. Of these, the same units as those included in the data acquisition apparatus 200 in Embodiment 5 are assigned with the same numbers. The following description centers on the differences from Embodiment 5.

When receiving a notification from the data acquiring unit 507 of an acquisition condition for which data has been successfully extracted, the acquisition condition setting scheduling unit 204 judges whether the table in the acquisition condition storing unit 202 stores a set including a piece of setting information showing "invalid", and when judging this positively, increases each order value in this table by "1", and judges whether an acquisition condition can be newly set in the data acquiring unit 507. When it is judged positively, the acquisition condition setting scheduling unit 204 newly sets an acquisition condition in the data acquiring unit 507; and when it is judged negatively, the acquisition condition setting scheduling unit 204 rearranges acquisition conditions that have been set.

Now, how the acquisition condition setting scheduling unit 204 schedules the setting of an acquisition condition received from an application in the data acquiring unit 507 will be described with reference to the flowcharts shown in FIGS. 31 and 38.

FIG. 31 has already been described in Embodiment 5 and therefore is not described here.

Figure 38:
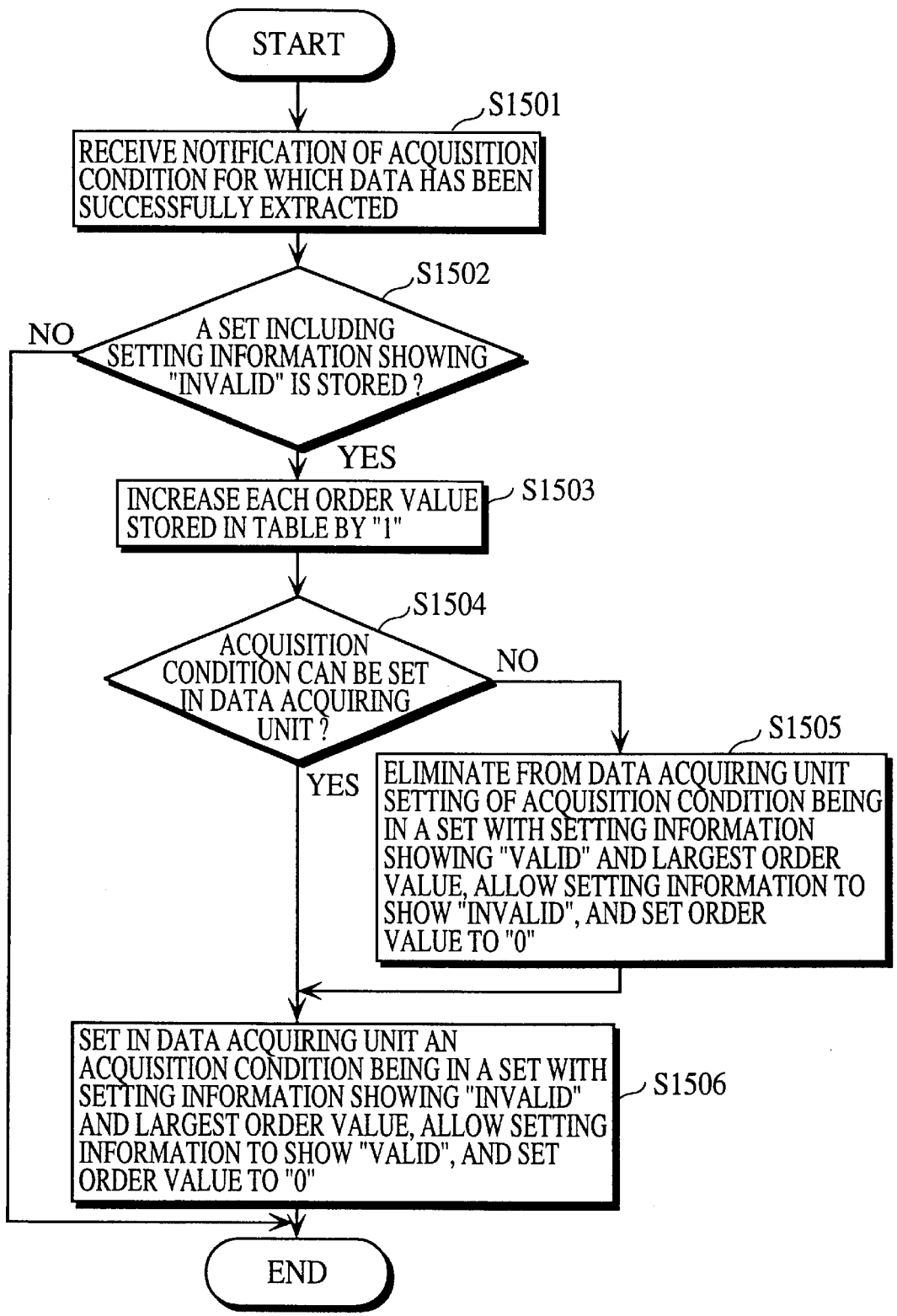
FIG. 38 is a flowchart showing the procedure in which the acquisition condition setting scheduling unit 204 sets in the data acquiring unit 507 an acquisition condition stored in the table in the acquisition condition storing unit 202.

FIG. 38 is a flowchart showing the procedure in which the acquisition condition setting scheduling unit 204 sets in the data acquiring unit 507 an acquisition condition stored in the table in the acquisition condition storing unit 202. The acquisition condition setting scheduling unit 204 receives from the data acquiring unit 507 a notification of an acquisition condition for which data has been successfully extracted (step S1501), then judges whether the table in the acquisition condition storing unit 202 stores a set including a piece of setting information showing "invalid" (step S1502). When it is judged negatively, the acquisition condition setting scheduling unit 204 waits for another notification since it is not necessary to rearrange acquisition conditions, and repeats the above steps until it is found that the table stores a set including a piece of setting information showing "invalid".

When it is judged positively in step S1502, the acquisition condition setting scheduling unit 204 increases each order value stored in the table by "1" (step S1503), and judges whether an acquisition condition can be newly set in the data acquiring unit 507 by checking whether the total number of sets that include the setting information showing "valid" is less than "3" (step S1504).

When it is judged negatively in step S1504, the acquisition condition setting scheduling unit 204 selects, from the table in the acquisition condition storing unit 202, an acquisition condition which is included in a set together with setting information showing "valid" and the largest order value, eliminates the setting of the selected acquisition condition from the data acquiring unit 507, allows the setting information stored in the set together with selected acquisition condition to show "invalid", and sets the order value in the same set to the initial value "0" (step S1505), then selects, from the table, an acquisition condition which is included in a set together with setting information showing "invalid" and the largest order value, then allows the setting information in the same set to show "valid" and sets the order value in the same set to the initial value "0" (step S1506), then sets the selected acquisition condition in the data acquiring unit 507.

When it is judged positively in step S1504, the acquisition condition setting scheduling unit 204 selects, from the table in the acquisition condition storing unit 202, an acquisition condition which is included in a set together with setting information showing "invalid" and the largest order value, allows this setting information to show "valid" and sets this order value to the initial value "0" (step S1506), and sets the selected acquisition condition in the data acquiring unit 507.

The processes performed by the data acquiring unit 507 after the acquisition condition setting scheduling unit 204 sets an acquisition condition in the data acquiring unit 507 are the same as those shown in the flowchart of FIG. 35 in Embodiment 5, and therefore are not described here.

In the present embodiment, in the flowchart shown in FIG. 31, when it is judged that the received acquisition condition cannot be set in the data acquiring unit 507, the acquisition condition setting scheduling unit 204 does not set the acquisition condition in the data acquiring unit 507, but stores the received acquisition condition in the table in the acquisition condition storing unit 202, allows the setting information included together with the acquisition condition in a set to show "invalid", and sets the order value in the same set to the initial value "0", in step S1206. However, the step S1206 may be replaced with step S1207 in which the acquisition condition setting scheduling unit 204 selects, from the table in the acquisition condition storing unit 202, an acquisition condition which is included in a set together with setting information showing "valid" and the largest order value, eliminates the setting of the selected acquisition condition from the data acquiring unit 507, allows the setting information stored in the set together with the selected acquisition condition to show "invalid", and sets the order value in the same set to the initial value "0". This flowchart is shown in FIG. 36. Note that the steps S1201–S1205 in this flowchart are the same as those shown in FIG. 31, and the explanation of these steps are omitted here.

With such a construction, a data acquisition is preferentially executed as soon as an acquisition condition is received from an application. This increases the speed of responding to requests issued from the applications.

Figure 39:
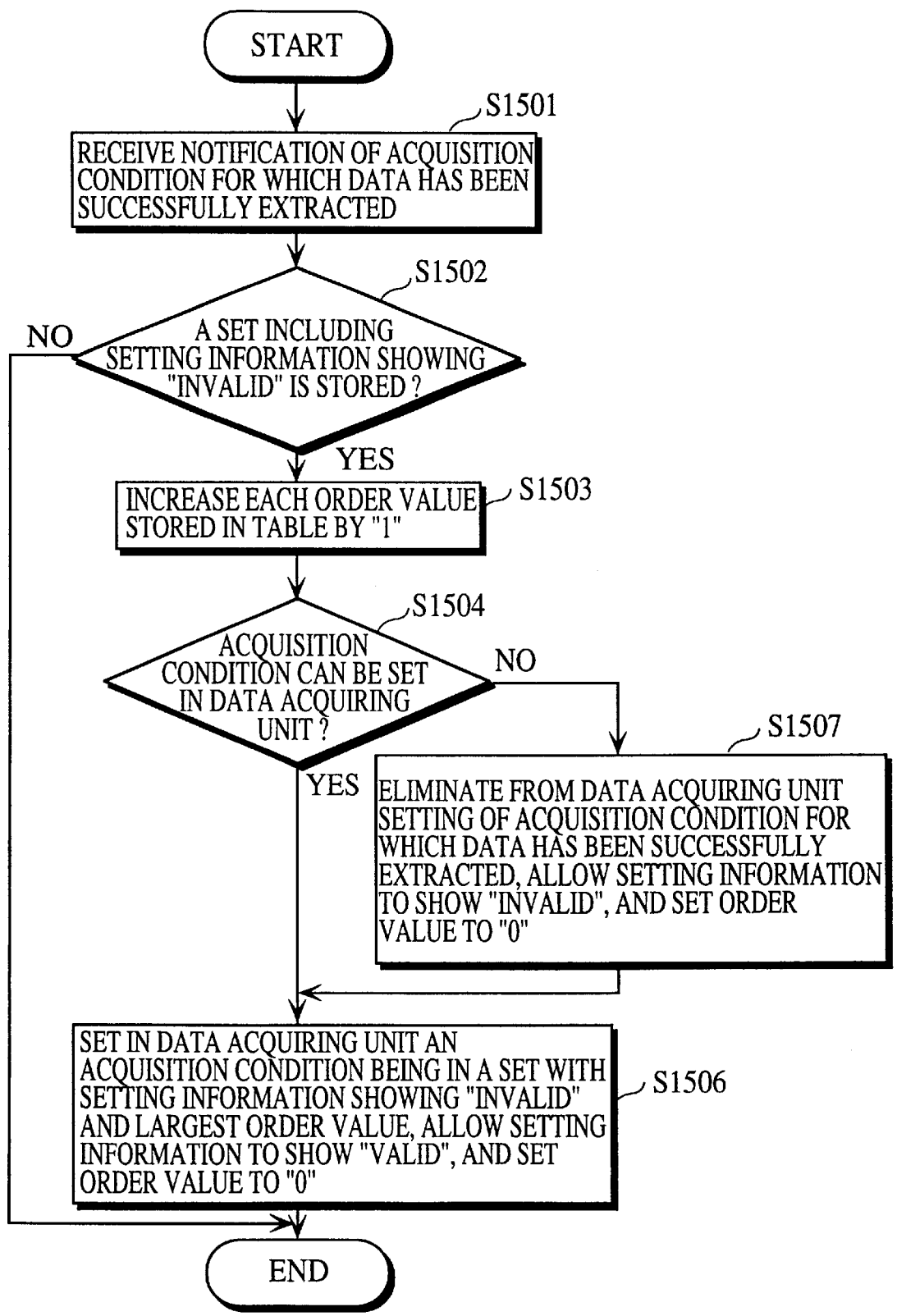
FIG. 39 is a flowchart showing the procedure in which the acquisition condition setting scheduling unit 204 sets in the data acquiring unit 507 an acquisition condition stored in the table in the acquisition condition storing unit 202 which is the same as FIG. 38 except that step S1505 has been replaced with S1507 in which the acquisition condition setting scheduling unit 204 eliminates from the data acquiring unit 507 the setting of the acquisition condition for which data has been successfully extracted, allows the setting information stored in the set together with this acquisition condition to show "invalid", and sets the order value in the same set to the initial value "0"

In the present embodiment, in the flowchart shown in FIG. 38, when it is judged that the received acquisition condition cannot be set in the data acquiring unit 507, the acquisition condition setting scheduling unit 204 selects, from the table in the acquisition condition storing unit 202, an acquisition condition which is included in a set together with setting information showing "valid" and the largest order value, eliminates the setting of the selected acquisition condition from the data acquiring unit 507, allows the setting information stored in the set together with selected acquisition condition to show "invalid", and sets the order value in the same set to the initial value "0", in step S1505. However, the step S1505 may be replaced with S1507 in which the acquisition condition setting scheduling unit 204 eliminates from the data acquiring unit 507 the setting of the acquisition condition for which data has been successfully extracted, allows the setting information stored in the set together with this acquisition condition to show "invalid", and sets the order value in the same set to the initial value "0". This flowchart is shown in FIG. 39. Note that the steps S1501–S1505 in this flowchart are the same as those shown in FIG. 38, and the explanation of these steps are omitted here.

With such a construction, an acquisition condition for which data has been successfully extracted is preferentially eliminated from the objects of the data monitoring and extraction by the data acquiring unit 507. This efficiently provides an opportunity of data acquisition to the other acquisition conditions for which data has not been acquired.

Figure 40:
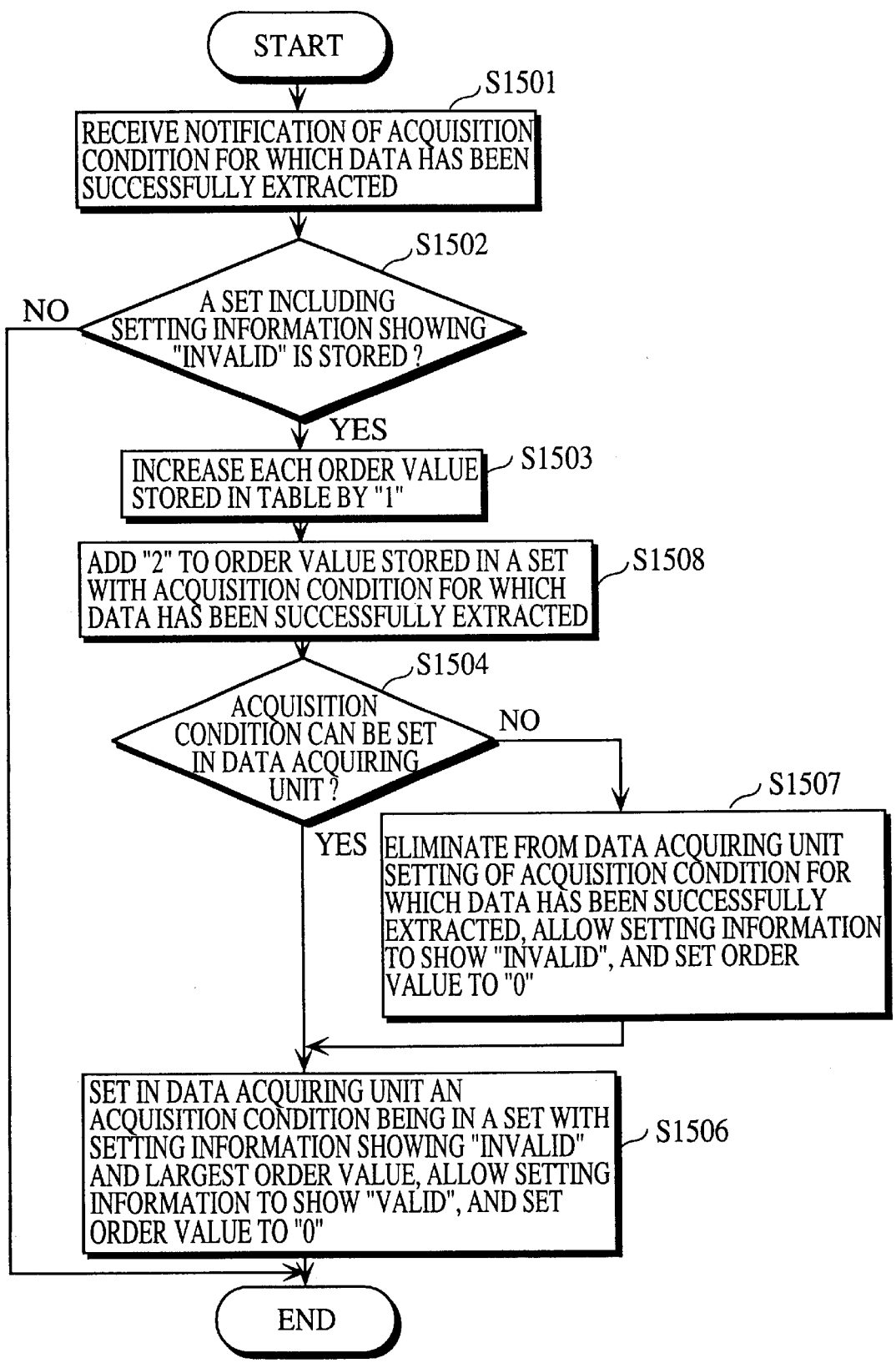
FIG. 40 is a flowchart showing the procedure in which the acquisition condition setting scheduling unit 204 sets in the data acquiring unit 507 an acquisition condition stored in the table in the acquisition condition storing unit 202 which is the same as FIG. 39 except that step S1508 has been inserted between steps S1503 and S1504, where in step S1508, the acquisition condition setting scheduling unit 204 adds "2" to the order value stored in a set together with the acquisition condition for which data has been successfully extracted.

When the process of the flowchart shown in FIG. 36 is executed in combination with the process of the flowchart shown in FIG. 39 for scheduling the setting of acquisition conditions received from the applications in the data acquiring unit 507, it is possible to insert between steps S1503 and S1504 in the flowchart of FIG. 39 step S1508 in which the acquisition condition setting scheduling unit 204 adds "2" to the order value stored in a set together with the acquisition condition for which data has been successfully extracted. This flowchart is shown in FIG. 40. Note that the steps S1501–S1504, S1506–S1507 in this flowchart are the same as those shown in FIG. 39, and the explanation of these steps are omitted here.

With such a construction, even if the setting of the acquisition condition for which data has been successfully extracted is not eliminated from the data acquiring unit 507 in step 1507, the acquisition condition for which data has been successfully extracted is eliminated from the objects of the data monitoring and extraction by the data acquiring unit 507 more quickly (step S1504: "Yes").

Up to now, the data acquisition apparatus of the present invention has been described with reference to a plurality of embodiments. It is however needless to say that the present invention is not limited to these embodiments.

In the above embodiments, it is presumed that the data acquisition apparatus is applied to a digital broadcast receiver. Not limited to this, however, the present invention may be applied to a computer connected to a communication network such as the Internet, CATV, or a receiver used in a video distribution system.

In Embodiment 1, a request condition generated by the request condition generating unit 112 is scheduled by the request condition setting scheduling unit 113, and stored in the request condition recording unit 114. This flow may be changed so that a request condition generated by the request condition generating unit 112 is sent to the request condition setting scheduling unit 113 via the request condition recording unit 114. That is to say, the request condition recording unit 114 may be used as a storage unit for storing the request condition before and after the scheduling performed in the data acquisition apparatus.

In the above embodiments, the request condition generating unit 112 judges that two request conditions can be connected if the two request conditions have a condition in common, and newly generates a request condition by connecting the conditions by the logical sum. However, three or more request conditions may be connected in the same way to generate a request condition, connecting the conditions by the logical sum. This is because when a plurality of independent applications issues requests to acquire a plurality of pieces of data that include a part in common, to preferentially acquire the common part contributes to an efficient data acquisition as a whole.

In the connection of request conditions, it is desirable that as many request conditions as possible are connected together. For this purpose, the connection of request conditions may be optimized by studying the possibility of connection in terms of all the request conditions recorded in the request condition recording unit 114.

In the above embodiments, when generating a request condition by connecting request conditions having a condition in common, the request condition generating unit generates additional information such as request identification information, request generation time, and post-connection request identification information. However, the request condition setting scheduling unit, instead of the request condition generating unit, may generate and store such additional information.

In the above embodiments, the request condition setting scheduling unit performs the scheduling based on the absolute times such as the request generation time, time-out time, and time-out cancellation time. However, the request condition setting scheduling unit may perform the scheduling based on relative times (elapse times) by generating time information such as the time-out time and time-out cancellation time and attaching the time information to request conditions.

It is possible to provide a data acquisition apparatus that performs various, higher-performance types of scheduling by combining the functions of the request condition generating unit and request condition setting scheduling unit described in Embodiments 1–4. For example, the request condition setting scheduling unit may be able to provide all combinations of the above functions described in Embodiment 1–4, and dynamically select an optimum function as necessary.

The request condition setting scheduling unit may not eliminate a request condition for which data has been acquired, but may place it at the last position in the queue. For example, when acquiring data for a request condition whose data acquisition monitoring state information specifies "non-monitoring acquisition", the data acquisition apparatus may not attempt the data acquisition only once as described in the above embodiments, but may repeats the attempt to acquire data at irregular intervals.

The data acquisition apparatus may switch at high speed between data acquisitions for which the data acquisition monitoring state information specifies "perpetual monitoring acquisition".

The request condition setting scheduling unit may change the data acquisition monitoring state information attached to each request condition when it is required due to a data acquisition state transition or a retention time in a certain state. With such a construction, the monitoring state is dynamically determined in accordance with the data acquisition state or the like. This achieves a data acquisition apparatus that can respond to changes in the contents of transmitted data, transmission frequencies or the like.

The components unique to the present invention (e.g., the request condition generating unit and the request condition setting scheduling unit) may be achieved by hardware such as dedicated electronic circuits or achieved as programs that are executed by general-purpose CPUs.

In Embodiments 5–6, up to 3 acquisition conditions can be set in the data acquiring unit 507. However, the upper limit of the above number is not limited to "3". In the example shown in Embodiment 5 (FIGS. 33, 34), acquisition conditions are stored in table in the acquisition condition storing unit 202. However, this number is not limited to "6".

In Embodiments 5–6, the initial value for the order value is "0". However, any value other than "0" may be used as the initial value. In these embodiments, "1" is added to the order value (a) when another acquisition condition is stored in the table, or (b) when a set including setting information showing "invalid" is stored in the table in the acquisition condition storing unit 202 (b-1) when the acquisition condition rearrangement request is sent from the rearrangement requesting unit 203 or (b-2) when a notification of an acquisition condition for which data has successfully been extracted is received. However, the number to be added to the order value is not limited to "1". Also, the order value may be decreased instead of being increased.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data acquisition apparatus for acquiring data from a transmitted data stream in accordance with requests received from a plurality of data processing apparatuses, the data acquisition apparatus comprising:

a request receiving means for receiving a plurality of requests to acquire data, from the plurality of data processing apparatuses;

a condition generating means for generating a plurality of conditions corresponding to the received requests;

a scheduling means for generating a queue of the plurality of conditions and setting, according to the generated queue, one or more conditions in a data extracting means and/or eliminating the one or more conditions from the data extracting means;

the data extracting means starts to acquire from the data stream one or more pieces of data that satisfy the one or more conditions when these conditions have been set by the scheduling means, and ending the acquiring of the one or more pieces of data that satisfy the one or more conditions when these conditions have been eliminated by the scheduling means; and an outputting means for outputting the one or more pieces of data extracted by the data extracting means to data processing apparatuses that have sent requests to acquire the one or more pieces of data, among the plurality of data processing apparatuses;

wherein the request receiving means further receives together with each request a piece of monitoring state information that specifies a data acquisition state; and the scheduling means (a) continuously sets a condition corresponding to a request in the data extracting means when the scheduling means receives the request with a piece of monitoring state information that specifies a perpetual monitoring acquisition, (b) repeatedly sets and eliminates a condition corresponding to a request in/from the data extracting means at predetermined intervals when the scheduling means receives the request with a piece of monitoring state information that specifies an intermittent monitoring acquisition, and (c) sets a condition corresponding to a request in the data extracting means and eliminates the condition from the data extracting means once one piece of data that satisfies the condition has been acquired by the data extracting means when the scheduling means receives a request with a piece of monitoring state information that specifies a non-monitoring acquisition.

2. A data acquisition apparatus for acquiring data from a transmitted data stream in accordance with requests received from a plurality of data processing apparatuses, the data acquisition apparatus comprising:

a request receiving means for receiving a plurality of requests to acquire data, from the plurality of data processing apparatuses;

a condition generating means for generating a plurality of conditions corresponding to the received requests;

a scheduling means for generating a queue of the plurality of conditions and setting, according to the generated queue, one or more conditions in a data extracting means and eliminating the one or more conditions from the data extracting means;

the data extracting means starts acquiring from the data stream the one or more pieces of data that satisfy the one or more conditions when these conditions have been set by the scheduling means and ending the acquiring of the one or more data that satisfy the one or more conditions when these conditions have been eliminated by the scheduling means;

an outputting means for outputting the one or more pieces of data extracted by the data extracting means to data processing apparatuses that have sent requests to acquire the one or more pieces of data, among the plurality of data processing apparatuses;

a recording means for temporarily recording the plurality of conditions, wherein the condition generating means records the generated conditions in the recording means, and the scheduling means generates the queue by reading the generated conditions from the recording means, rearranging the read conditions, and recording the rearranged conditions in the recording means, the request receiving means further receives together with each request a piece of header information that indicates a request type, the condition generating means receives from the request receiving means the piece of header information together with each request, generates a condition corresponding to each received request, records each generated condition and each received piece of header information in the recording means in correspondence with each other, and the scheduling means allows data acquisitions to end by eliminating conditions corresponding to the data acquisitions from the data extracting means in accordance with pieces of header information corresponding to the conditions which are recorded in the recording means.

3. A data acquisition apparatus for acquiring data from a transmitted data stream in accordance with requests received from a plurality of data processing apparatuses, the data acquisition apparatus comprising:

a request receiving means for receiving a plurality of requests to acquire data, from the plurality of data processing apparatuses;

a condition generating means for generating a plurality of conditions corresponding to the received requests;

a scheduling means for generating a queue of the plurality of conditions and setting, according to the generated queue, one or more conditions in a data extracting means and eliminating the one or more conditions from the data extracting means;

the data extracting means starts acquiring from the data stream the one or more pieces of data that satisfy the one or more conditions when these conditions have been set by the scheduling means and ending the acquiring of the one or more data that satisfy the one or more conditions when these conditions have been eliminated by the scheduling means;

an outputting means for outputting the one or more pieces of data extracted by the data extracting means to data processing apparatuses that have sent requests to acquire the one or more pieces of data, among the plurality of data processing apparatuses;

a recording means for temporarily recording the plurality of conditions, wherein the condition generating means records the generated conditions in the recording means, and the scheduling means generates the queue by reading the generated conditions from the recording means, rearranging the read conditions, and recording the rearranged conditions in the recording means, the data acquisition apparatus further comprising, a timer means for providing a current time, wherein the request receiving means further receives together with each request a piece of header information that indicates a request type, the condition generating means receives from the request receiving means the piece of header information together with each request, generates a condition corresponding to each received request, generates a time-out time when a data acquisition should be stopped, in accordance with each received piece of header information, records each generated condition and each generated time-out time in the recording means in correspondence with each other, and the scheduling means allows data acquisitions to end by eliminating conditions corresponding to the data acquisitions from the data extracting means when time-out times corresponding to the conditions are reached by the current time.

4. A data acquisition apparatus for acquiring data from a transmitted data stream in accordance with requests received from a plurality of data processing apparatuses, the data acquisition apparatus comprising:

a request receiving means for receiving a plurality of requests to acquire data, from the plurality of data processing apparatuses;

a condition generating means for generating a plurality of conditions corresponding to the received requests;

a scheduling means for generating a queue of the plurality of conditions and setting, according to the generated queue, one or more conditions in a data extracting means and eliminating the one or more conditions from the data extracting means;

the data extracting means starts acquiring from the data stream the one or more pieces of data that satisfy the one or more conditions when these conditions have been set by the scheduling means and ending the acquiring of the one or more data that satisfy the one or more conditions when these conditions have been eliminated by the scheduling means;

an outputting means for outputting the one or more pieces of data extracted by the data extracting means to data processing apparatuses that have sent requests to acquire the one or more pieces of data, among the plurality of data processing apparatuses;

a recording means for temporarily recording the plurality of conditions, wherein the condition generating means records the generated conditions in the recording means, and the scheduling means generates the queue by reading the generated conditions from the recording means, rearranging the read conditions, and recording the rearranged conditions in the recording means, the data acquisition apparatus further comprising a timer means for providing a current time, wherein the condition generating means generates, after receiving a request from the request receiving means, (a) a condition corresponding to the received request and (b) a piece of condition generation time information which indicates a time when the condition is generated, records each generated condition and each generated piece of condition generation time information in the recording means in correspondence with each other, and the scheduling means calculates an elapse time for each condition by comparing the current time with the time indicated by each piece of condition generation time information recorded in the recording means, and allows data acquisitions to end by eliminating each condition from the data extracting means when the elapse time for the condition reaches a predetermined time.

5. A data acquisition apparatus for acquiring data from a transmitted data stream in accordance with requests received from a plurality of data processing apparatuses, the data acquisition apparatus comprising:

a request receiving means for receiving a plurality of requests to acquire data, from the plurality of data processing apparatuses;

a condition generating means for generating a plurality of conditions corresponding to the received requests;

a scheduling means for generating a queue of the plurality of conditions and setting, according to the generated queue, one or more conditions in a data extracting means and eliminating the one or more conditions from the data extracting means;

the data extracting means starts acquiring from the data stream the one or more pieces of data that satisfy the one or more conditions when these conditions have been set by the scheduling means and ending the acquiring of one or more data that satisfy the one or more conditions when these conditions have been eliminated by the scheduling means;

an outputting means for outputting the one or more pieces of data extracted by the data extracting means to data processing apparatuses that have sent requests to acquire the one or more pieces of data, among the plurality of data processing apparatuses;

a recording means for temporarily recording the plurality of conditions, wherein the condition generating means records the generated conditions in the recording means, and the scheduling means generates the queue by reading the generated conditions from the recording means, rearranging the read conditions, and recording the rearranged conditions in the recording means, the condition generating means generates, after receiving a request from the request receiving means, a condition corresponding to the received request, compares the newly generated condition with an existent condition that has been recorded in the recording means to judge whether the two conditions can be connected, and when judging that the two conditions can be connected, generates a new condition by connecting the two conditions and records the newly generated condition in the recording means, and the scheduling means reads the newly generated condition from the recording means and puts the newly generated condition into the queue, then allows a data acquisition to start by setting the newly generated condition in the data extracting means, and allows a data acquisition for the existent condition to end by eliminating the existent condition from the data extracting means.

6. The data acquisition apparatus of claim 5, wherein the condition generating means generates, after receiving a request from the request receiving means, (a) a condition corresponding to the received request and (b) a piece of identification information used for identifying the generated condition, and after generating a new condition by connection generates, using the piece of identification information, a piece of connection information that shows correspondence between the newly generated condition and the two conditions connected to generated the new condition, and records the piece of connection information and the condition corresponding to the piece of identification information and the received request in the recording means in correspondence with each other; and the scheduling means identifies the newly generated condition and the two conditions connected to generate the new condition, by referring to the identification information and the connection information, and controls the start and end of each data acquisition corresponding to the identified conditions.

7. The data acquisition apparatus of claim 6, wherein the condition generating means, when the two conditions have a portion in common, judges that the two conditions can be connected, and generates a new condition that is composed of the common portion.

8. A data acquisition apparatus for acquiring data from a transmitted data stream in accordance with requests received from a plurality of data processing apparatuses, the data acquisition apparatus comprising:

a request receiving means for receiving a plurality of requests to acquire data, from the plurality of data processing apparatuses;

a condition generating means for generating a plurality of conditions corresponding to the received requests;

a scheduling means for generating a queue of the plurality of conditions and setting, according to the generated queue, one or more conditions in a data extracting means and eliminating the one or more conditions from the data extracting means;

the data extracting means starts acquiring from the data stream the one or more pieces of data that satisfy the one or more conditions when these conditions have been set by the scheduling means and ending the acquiring of the one or more data that satisfy the one or more conditions when these conditions have been eliminated by the scheduling means;

an outputting means for outputting the one or more pieces of data extracted by the data extracting means to data processing apparatuses that have sent requests to acquire the one or more pieces of data, among the plurality of data processing apparatuses;

a recording means for temporarily recording the plurality of conditions, wherein the condition generating means records the generated conditions in the recording means, and the scheduling means generates the queue by reading the generated conditions from the recording means, rearranging the read conditions, and recording the rearranged conditions in the recording means, the data acquisition apparatus further comprising a timer means for providing a current time, wherein the scheduling means, after starting a data acquisition, generates a time-out time by adding a predetermined time period to a time when the scheduling means allowed the data acquisition to start, and records the time-out time and a condition corresponding to the data acquisition in the recording means in correspondence with each other, and when the time-out time is reached by the current time, allows the data acquisition to end by eliminating the corresponding condition from the data extracting means, and at the same time, generates a time-out cancellation time by adding another predetermined time period to a time when the data acquisition ended, records the time-out cancellation time and the condition in the recording means in correspondence with each other, and when the time-out cancellation time is reached by the current time, puts the condition into the queue, and allows the data acquisition to start by setting the condition in the data extracting means.

9. A data acquisition apparatus for acquiring data from a transmitted data stream in accordance with requests received from a plurality of data processing apparatuses, the data acquisition apparatus comprising:

a request receiving means for receiving a plurality of requests to acquire data, from the plurality of data processing apparatuses;

a condition generating means for generating a plurality of conditions corresponding to the received requests;

a scheduling means for generating a queue of the plurality of conditions and setting, according to the generated queue, one or more conditions in a data extracting means and eliminating the one or more conditions from the data extracting means;

the data extracting means starts acquiring from the data stream the one or more pieces of data that satisfy the one or more conditions when these conditions have been set by the scheduling means and ending the acquiring of the one or more data that satisfy the one or more conditions when these conditions have been eliminated by the scheduling means;

an outputting means for outputting the one or more pieces of data extracted by the data extracting means to data processing apparatuses that have sent requests to acquire the one or more pieces of data, among the plurality of data processing apparatuses;

a recording means for temporarily recording the plurality of conditions, wherein the condition generating means records the generated conditions in the recording means, and the scheduling means generates the queue by reading the generated conditions from the recording means, rearranging the read conditions, and recording the rearranged conditions in the recording means, the data extracting means outputs, for each condition that is set in the data extracting means, a piece of data acquisition information that shows whether data has been acquired or not, and the scheduling means generates for each condition recorded in the recording means a piece of data acquisition decision information that shows whether data has been acquired, in accordance with the piece of data acquisition information, and records each generated piece of data acquisition decision information and the condition corresponding to the piece of data acquisition decision information in the recording means in correspondence with each other, and controls the start and end of each data acquisition in accordance with generated pieces of data acquisition decision information.

10. The data acquisition apparatus of claim 9 further comprising a timer means for providing a current time, wherein the condition generating means generates, after receiving a request from the request receiving means, (a) a condition corresponding to the received request and (b) a piece of condition generation time information which indicates a time when the condition is generated, records each generated condition and each generated piece of condition generation time information in the recording means in correspondence with each other; and the scheduling means judges whether the recording means stores conditions for which data has not been acquired after expiration of a predetermined time interval since generation of the conditions by comparing the current time with the time indicated by each piece of condition generation time information recorded in the recording means and referring to each piece of data acquisition decision information recorded in the recording means, and allows data acquisitions to end by eliminating the conditions from the data extracting means when a result of the judgment shows that the recording means stores the conditions for which data has not been acquired after expiration of a predetermined time interval.

11. The data acquisition apparatus of claim 10, wherein the condition generating means generates, after receiving a request from the request receiving means, a condition corresponding to the received request, compares the newly generated condition with an existent condition that has been recorded in the recording means to judge whether the two conditions can be connected, and when judging that the two conditions can be connected, generates a new condition by connecting the two conditions and records the newly generated condition in the recording means; and the scheduling means reads the newly generated condition from the recording means and puts the newly generated condition into the queue, then allows a data acquisition to start by setting the newly generated condition in the data extracting means, allows a data acquisition for the existent condition to end by eliminating the existent condition from the data extracting means, allows the data acquisition for the newly generated condition to end by eliminating the newly generated condition from the data extracting means when it is judged that data has not been acquired for the newly generated condition after expiration of a predetermined time interval since reception of the request, and reads the existent condition from the recording means, puts the newly generated condition and the existent condition into the queue, then allows a data acquisition to start by setting the existent condition in the data extracting means.

12. A data acquisition apparatus for acquiring data from a transmitted data stream in accordance with requests received from a plurality of data processing apparatuses, the data acquisition apparatus comprising:

a request receiving means for receiving a plurality of requests to acquire data, from the plurality of data processing apparatuses;

a condition generating means for generating a plurality of conditions corresponding to the received requests;

a scheduling means for generating a queue of the plurality of conditions and setting, according to the generated queue, one or more conditions in a data extracting means and eliminating the one or more conditions from the dataextracting means;

the data extracting means starts acquiring from the data stream the one or more pieces of data that satisfy the one or more conditions when these conditions have been set by the scheduling means and ending the acquiring of the one or more data that satisfy the one or more conditions when these conditions have been eliminated by the scheduling means; and an outputting means for outputting the one or more pieces of data extracted by the data extracting means to data processing apparatuses that have sent requests to acquire the one or more pieces of data, among the plurality of data processing apparatuses;

a timer means for providing a current time, wherein the request receiving means further receives together with each request a piece of monitoring the state information that specifies a data acquisition state, and the scheduling means, when a piece of monitoring state information, which corresponds to a request for which a data acquisition has been ended because a time-out time was reached, specifies a non-monitoring acquisition, generates a time-out cancellation time by adding a predetermined time period to a time when the data acquisition ended, and when the time-out cancellation time is reached by the current time, puts the condition into the queue, and allows the data acquisition to start by setting the condition in the data extracting means.

13. A data acquisition apparatus for acquiring data from a transmitted data stream in accordance with requests received from a plurality of data processing apparatuses, the data acquisition apparatus comprising:

a request receiving means for receiving a plurality of requests to acquire data, from the plurality of data processing apparatuses;

a condition generating means for generating a plurality of conditions corresponding to the received requests;

a scheduling means for generating a queue of the plurality of conditions and setting, according to the generated queue, one or more conditions in a data extracting means and eliminating the one or more conditions from the data extracting means;

the data extracting means starts acquiring from the data stream the one or more pieces of data that satisfy the one or more conditions when these conditions have been set by the scheduling means and ending the acquiring of the one or more data that satisfy the one or more conditions when these conditions have been eliminated by the scheduling means; and an outputting means for outputting the one or more pieces of data extracted by the data extracting means to data processing apparatuses that have sent requests to acquire the one or more pieces of data, among the plurality of data processing apparatuses, wherein the request receiving means further receives together with each request (a) a piece of monitoring state information that specifies a data acquisition state and (b) a priority level for data acquisition, and the scheduling means allows a data acquisition for a request to end by eliminating a condition corresponding to the request from the data extracting means when (i) a piece of monitoring state information corresponding to the condition specifies a non-monitoring acquisition, (ii) data for the request has not been acquired, and (iii) a condition with a higher priority level than that of the condition has been put into the queue, and allows a data acquisition to start by setting the condition with a higher priority level in the data extracting means.

14. A data acquisition apparatus for acquiring data from a transmitted data stream in accordance with requests received from a plurality of data processing apparatuses, the data acquisition apparatus comprising:

a request receiving means for receiving a plurality of requests to acquire data, from the plurality of data processing apparatuses;

a condition generating means for generating a plurality of conditions corresponding to the received requests;

a scheduling means for generating a queue of the plurality of conditions and setting, according to the generated queue, one or more conditions in a data extracting means and eliminating the one or more conditions from the data extracting means;

the data extracting means starts acquiring from the data stream the one or more pieces of data that satisfy the one or more conditions when these conditions have been set by the scheduling means and ending the acquiring of the one or more data that satisfy the one or more conditions when these conditions have been eliminated by the scheduling means;

an outputting means for outputting the one or more pieces of data extracted by the data extracting means to data processing apparatuses that have sent requests to acquire the one or more pieces of data, among the plurality of data processing apparatuses;

a recording means for temporarily recording the plurality of conditions, wherein the condition generating means records the generated conditions in the recording means, and the scheduling means generates the queue by reading the generated conditions from the recording means, rearranging the read conditions, and recording the rearranged conditions in the recording means, the request receiving means further receives together with each request (a) a piece of monitoring state information that specifies a data acquisition state, (b) a priority level for data acquisition, and (c) a piece of identification information used for identifying the request, the condition generating means receives from the request receiving means the piece of monitoring state information and the piece of identification information together with each request, generates a condition corresponding to each received request, records each generated condition and each received piece of monitoring state information and identification information in the recording means in correspondence with each other, the data extracting means refers to header information included in the data stream and extracts and outputs (a1) a piece of identification information corresponding to a piece of data included in the data stream and (b1) a piece of version information that indicates a version of the piece of data, the scheduling means refers to the pieces of identification information and version information output by the data extracting means and generates for each condition recorded in the recording means (a2) a piece of data acquisition decision information that indicates whether a corresponding piece of data has been acquired or not, (b2) a piece of version update number information that indicates the number of version updates of a corresponding piece of data, and records the generated pieces of data acquisition decision information and version update number information in the recording means, and when the queue includes a plurality of conditions for each of which (i) the piece of monitoring state information specifies a non-monitoring acquisition, (ii) the same priority level is assigned, and (iii) the piece of data acquisition decision information has the same contents, allows a data acquisition to start by preferentially setting in the data extracting means a condition among the plurality of conditions in the queue that corresponds to a piece of version update number information recorded in the recording means indicating the largest number of version updates.

15. A data acquisition apparatus for acquiring data from a transmitted data stream in accordance with requests received from a plurality of data processing apparatuses, the data acquisition apparatus comprising:

a condition acquiring means for acquiring a plurality of conditions corresponding to the requests from the plurality of data processing apparatuses;

a table storing means for storing a table that shows relationships between (a) the plurality of conditions, (b) pieces of setting information which each show whether a condition is "set" or "not set" in a data extracting means, and (c) order values which show an order in which the plurality of conditions have been acquired and are each initialized to a value indicating that a corresponding condition was most recently acquired when the corresponding condition is eliminated from the data extracting means;

a scheduling means for, each time the condition acquiring means acquires a new condition, writing a set of (a1) the new condition, (b1) a piece of setting information corresponding to the new condition, which each show whether a condition is "set" or "not set" in the data extracting means, and (c1) an order value indicating that the new condition was most recently acquired, and controlling setting of conditions in the data extracting means by referring to the setting information and the order values recorded in the table;

the data extracting means extracts from the data stream one or more pieces of data that satisfy any of the plurality of conditions; and an outputting means for outputting the one or more pieces of data extracted by the data extracting means to data processing apparatuses that have sent requests to acquire the one or more pieces of data, among the plurality of data processing apparatuses.

16. The data acquisition apparatus of claim 15, wherein the scheduling means includes:

a condition detecting means for detecting from the table one or more conditions that correspond to pieces of setting information showing "not set"; and a determining means for determining a condition to be newly set in the data extracting means, among the detected one or more conditions, by referring to order values corresponding to the detected one or more conditions.

17. The data acquisition apparatus of claim 16, wherein the scheduling means further includes:

a setting judging means for judging whether a condition can newly be set in the data extracting means by judging whether the number of conditions that correspond to pieces of setting information showing "set" is less than an upper limit of the number of conditions that can be set in the data extracting means; and a setting controlling means for, when the setting judging means judges that a condition can newly be set, setting the determined condition in the data extracting means, and when the setting judging means judges that a condition can not newly be set, selecting among conditions that correspond to pieces of setting information showing "set" a condition to be deleted from the data extracting means, deleting the selected condition from the data extracting means, and setting the determined condition in the data extracting means.

18. The data acquisition apparatus of claim 17, wherein the determining means determines, among conditions that correspond to pieces of setting information showing "not set", a condition that is indicated by a corresponding order value in the table to have been least recently acquired, as a condition to be newly set in the data extracting means, and when the setting judging means judges that a condition can not newly be set, the setting controlling means selects, among conditions that correspond to pieces of setting information showing "set", a condition that is indicated by a corresponding order value in the table to have been least recently acquired, and deletes the selected condition from the data extracting means.

19. The data acquisition apparatus of claim 17, wherein the determining means determines, among conditions that correspond to pieces of setting information showing "not set", a condition that is indicated by a corresponding order value in the table to have been most recently acquired, as a condition to be newly set in the data extracting means, and when the setting judging means judges that a condition can not newly be set, the setting controlling means selects, among conditions that correspond to pieces of setting information showing "set", a condition that is indicated by a corresponding order value in the table to have been least recently acquired, and deletes the selected condition from the data extracting means.

20. The data acquisition apparatus of claim 15, further comprising a rearrangement requesting means for sending a rearrangement request that requests the scheduling means to rearrange conditions set in the data extracting means in accordance with an instruction from any of the plurality of data processing apparatuses, wherein the scheduling means, when receiving the rearrangement request from the rearrangement requesting means, controls rearrangement of the conditions set in the data extracting means by referring to the setting information and the order values recorded in the table.

21. The data acquisition apparatus of claim 20, wherein the scheduling means includes:

a condition detecting means for, when receiving the rearrangement request from the rearrangement requesting means, detecting from the table one or more conditions that correspond to pieces of setting information showing "not set"; and a determining means for determining a condition to be newly set in the data extracting means, among the detected one or more conditions, by referring to order values corresponding to the detected one or more conditions.

22. The data acquisition apparatus of claim 21, wherein the scheduling means further includes:

a setting judging means for judging whether a condition can newly be set in the data extracting means by judging whether the number of conditions that correspond to pieces of setting information showing "set" is less than an upper limit of the number of conditions that can be set in the data extracting means; and a setting controlling means for, when the setting judging means judges that a condition can newly be set, setting the determined condition in the data extracting means, and when the setting judging means judges that a condition can not newly be set, selecting among conditions that correspond to pieces of setting information showing "set" a condition to be deleted from the data extracting means, deleting the selected condition from the data extracting means, and setting the determined condition in the data extracting means.

23. The data acquisition apparatus of claim 22, wherein the determining means determines, among conditions that correspond to pieces of setting information showing "not set", a condition that is indicated by a corresponding order value in the table to have been least recently acquired, as a condition to be newly set in the data extracting means, and when the setting judging means judges that a condition can not newly be set, the setting controlling means selects, among conditions that correspond to pieces of setting information showing "set", a condition that is indicated by a corresponding order value in the table to have been least recently acquired, and deletes the selected condition from the data extracting means.

24. The data acquisition apparatus of claim 15, wherein the data extracting means, when successfully extracting a piece of data that satisfies one of the plurality of conditions, notifies the scheduling means of the condition satisfied by the successfully extracted piece of data, and the scheduling means, when receiving the notification, controls rearrangement of the conditions set in the data extracting means by referring to the setting information and the order values recorded in the table.

25. The data acquisition apparatus of claim 24, wherein the scheduling means includes:

a condition detecting means for, when receiving the notification, detecting from the table one or more conditions that correspond to pieces of setting information showing "not set"; and a determining means for determining a condition to be newly set in the data extracting means, among the detected one or more conditions, by referring to order values corresponding to the detected one or more conditions.

26. The data acquisition apparatus of claim 25, wherein the scheduling means further includes:

a setting judging means for judging whether a condition can newly be set in the data extracting means by judging whether the number of conditions that correspond to pieces of setting information showing "set" is less than an upper limit of the number of conditions that can be set in the data extracting means; and a setting controlling means for, when the setting judging means judges that a condition can newly be set, setting the determined condition in the data extracting means, and when the setting judging means judges that a condition can not newly be set, selecting among conditions that correspond to pieces of setting information showing "set" a condition to be deleted from the data extracting means, deleting the selected condition from the data extracting means, and setting the determined condition in the data extracting means.

27. The data acquisition apparatus of claim 26, wherein the determining means determines, among conditions that correspond to pieces of setting information showing "not set", a condition that is indicated by a corresponding order value in the table to have been least recently acquired, as a condition to be newly set in the data extracting means, and when the setting judging means judges that a condition can not newly be set, the setting controlling means selects, among conditions that correspond to pieces of setting information showing "set", a condition that is indicated by a corresponding order value in the table to have been least recently acquired, and deletes the selected condition from the data extracting means.

28. The data acquisition apparatus of claim 26, wherein the determining means determines, among conditions that correspond to pieces of setting information showing "not set", a condition that is indicated by a corresponding order value in the table to have been most recently acquired, as a condition to be newly set in the data extracting means, and when the setting judging means judges that a condition can not newly be set, the setting controlling means selects, among conditions that correspond to pieces of setting information showing "set", a condition that is indicated by a corresponding order value in the table to have been least recently acquired, and deletes the selected condition from the data extracting means.

29. The data acquisition apparatus of claim 26, wherein the determining means determines, among conditions that correspond to pieces of setting information showing "not set", a condition that is indicated by a corresponding order value in the table to have been least recently acquired, as a condition to be newly set in the data extracting means, and when the setting judging means judges that a condition can not newly be set, the setting controlling means selects, among conditions that correspond to pieces of setting information showing "set", the condition notified by the data extracting means, and deletes the selected condition from the data extracting means.

30. The data acquisition apparatus of claim 26, wherein the determining means determines, among conditions that correspond to pieces of setting information showing "not set", a condition that is indicated by a corresponding order value in the table to have been most recently acquired, as a condition to be newly set in the data extracting means, and when the setting judging means judges that a condition can not newly be set, the setting controlling means selects, among conditions that correspond to pieces of setting information showing "set", the condition notified by the data extracting means, and deletes means the selected condition from the data extracting means.

* * * * *

UNITED STATES PATENT AND TRADEMARK OFFICE
CERTIFICATE OF CORRECTION

PATENT NO. : 6,876,994 B2
DATED : April 5, 2005
INVENTOR(S) : Yoshiaki Ishikawa et al.

It is certified that error appears in the above-identified patent and that said Letters Patent is hereby corrected as shown below:

Column 45,
Line 33, delete "dataextracting" and insert -- data extracting --.

Signed and Sealed this

Tenth Day of January, 2006

JON W. DUDAS
*Director of the United States Patent and Trademark Office*